US012756224B2

(12) United States Patent
Forssell et al.

(10) Patent No.: US 12,756,224 B2
(45) Date of Patent: Oct. 6, 2026

(54) TECHNIQUES FOR MANAGING ENERGY FORECASTS

(71) Applicant: Apple Inc., Cupertino, CA (US)

(72) Inventors: Lisa K. Forssell, Palo Alto, CA (US); Mischa K. McLachlan, San Francisco, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 240 days.

(21) Appl. No.: 18/632,648

(22) Filed: Apr. 11, 2024

(65) Prior Publication Data

US 2024/0405600 A1 Dec. 5, 2024

Related U.S. Application Data

(60) Provisional application No. 63/470,984, filed on Jun. 5, 2023.

(51) Int. Cl.

| | |
|---|---|
| ***H02J 13/10*** | (2026.01) |
| ***G06F 3/04842*** | (2022.01) |
| ***H02J 3/00*** | (2006.01) |
| ***H04M 15/00*** | (2006.01) |
| ***H04W 68/00*** | (2009.01) |
| *G06F 119/06* | (2020.01) |

(52) U.S. Cl.

CPC .......... *H02J 13/10* (2026.01); *G06F 3/04842* (2013.01); *H02J 3/004* (2020.01); *H04M 15/83* (2013.01); *H04W 68/00* (2013.01); *G06F 2119/06* (2020.01); *H02J 3/003* (2020.01); *H04M 2242/15* (2013.01); *Y04S 10/12* (2013.01); *Y04S 10/123* (2013.01); *Y04S 10/40* (2013.01); *Y04S 10/50* (2013.01); *Y04S 10/52* (2013.01)

(58) Field of Classification Search

CPC . H04M 15/83; H04M 2242/15; H04W 68/00; Y04S 10/12; Y04S 10/123; Y04S 10/40; Y04S 10/50; Y04S 10/52; H02J 3/004; H02J 3/003; H02J 13/10; G06F 2119/06; G06F 3/04842

See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |

(Continued)

FOREIGN PATENT DOCUMENTS

| | | | |
|---|---|---|---|
| CN | 117092921 | A | 11/2023 |
| EP | 3410263 | A1 | 12/2018 |

(Continued)

OTHER PUBLICATIONS

National Grid, "The WhenToPlugin app", Dec. 4, 2021, https://www.facebook.com/watch/?v=327718855526535, (Year: 2021).*

(Continued)

*Primary Examiner* — Patrick F Riegler

(74) *Attorney, Agent, or Firm* — Mark I. Bentley; Kyle B. Morse; BAKERHOSTETLER

(57) ABSTRACT

The present disclosure generally relates to managing the display of different types of energy forecast, managing the display of one or more energy forecasts, and outputting an energy notification.

60 Claims, 27 Drawing Sheets

(56) References Cited

U.S. PATENT DOCUMENTS

| | | | | |
|---|---|---|---|---|
| 7,614,008 | B2 | 11/2009 | Ording | |
| 7,633,076 | B2 | 12/2009 | Huppi et al. | |
| 7,653,883 | B2 | 1/2010 | Hotelling et al. | |
| 7,657,849 | B2 | 2/2010 | Chaudhri et al. | |
| 7,663,607 | B2 | 2/2010 | Hotelling et al. | |
| 7,844,914 | B2 | 11/2010 | Andre et al. | |
| 7,953,519 | B2 * | 5/2011 | Hamilton | G01D 4/004 700/297 |
| 7,957,762 | B2 | 6/2011 | Herz et al. | |
| 8,006,002 | B2 | 8/2011 | Kalayjian et al. | |
| 8,239,784 | B2 | 8/2012 | Hotelling et al. | |
| 8,279,180 | B2 | 10/2012 | Hotelling et al. | |
| 8,381,135 | B2 | 2/2013 | Hotelling et al. | |
| 8,479,122 | B2 | 7/2013 | Hotelling et al. | |
| 8,509,954 | B2 * | 8/2013 | Imes | G05F 1/66 700/286 |
| 9,118,153 | B2 * | 8/2015 | Doms | G08B 5/36 |
| 9,154,001 | B2 * | 10/2015 | Dharwada | H02J 13/10 |
| 9,348,458 | B2 | 5/2016 | Hotelling et al. | |
| 9,933,937 | B2 | 4/2018 | Lemay et al. | |
| 11,036,192 | B2 * | 6/2021 | Berrien | F24F 11/64 |
| 11,275,405 | B2 | 3/2022 | Hotelling | |
| 11,431,169 | B1 * | 8/2022 | Buttgenbach | H02J 3/003 |
| 11,764,578 | B1 * | 9/2023 | Huang | G01W 1/10 361/601 |
| 12,072,193 | B2 * | 8/2024 | Schumacher | B60H 1/00428 |
| 2002/0015024 | A1 | 2/2002 | Westerman et al. | |
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2010/0236253 | A1 * | 9/2010 | Adam | G06Q 10/04 60/39.12 |
| 2011/0144921 | A1 * | 6/2011 | Ishibashi | H02J 3/32 702/24 |
| 2012/0185414 | A1 * | 7/2012 | Pyle | G01W 1/10 703/2 |
| 2013/0054758 | A1 * | 2/2013 | Imes | H04L 12/2827 709/219 |
| 2013/0063272 | A1 * | 3/2013 | Bhageria | H02J 13/10 340/650 |
| 2013/0073105 | A1 * | 3/2013 | Schmid | H02J 3/381 709/204 |
| 2014/0052306 | A1 * | 2/2014 | Motobayashi | H02J 9/06 307/23 |
| 2014/0118107 | A1 | 5/2014 | Almomani | |
| 2014/0148960 | A1 * | 5/2014 | Bhageria | G05B 17/02 700/286 |
| 2014/0207282 | A1 | 7/2014 | Angle et al. | |
| 2017/0132863 | A1 | 5/2017 | Ahearn et al. | |
| 2019/0034043 | A1 | 1/2019 | Zolotykh et al. | |
| 2019/0369699 | A1 | 12/2019 | Pathak et al. | |
| 2019/0372345 | A1 | 12/2019 | Bain et al. | |
| 2020/0348822 | A1 | 11/2020 | Dascola et al. | |
| 2021/0081559 | A1 * | 3/2021 | Gratton | G06F 21/604 |
| 2022/0297568 | A1 * | 9/2022 | Kinomura | B60L 58/10 |
| 2023/0018372 | A1 | 1/2023 | Ackmann et al. | |
| 2023/0148149 | A1 | 5/2023 | Davis et al. | |
| 2023/0160941 | A1 * | 5/2023 | Sloop | G01R 31/086 324/512 |
| 2023/0163629 | A1 * | 5/2023 | Endo | H02J 13/36 700/286 |
| 2023/0251701 | A1 * | 8/2023 | Chamberlin | G06F 1/3203 713/320 |
| 2023/0266730 | A1 * | 8/2023 | Lu | G05B 19/042 700/295 |
| 2023/0299580 | A1 * | 9/2023 | Keerthisinghe | G05B 23/0221 700/286 |
| 2024/0087383 | A1 | 3/2024 | McLachlan et al. | |
| 2024/0140238 | A1 * | 5/2024 | Villarreal | B60L 53/62 |
| 2024/0232769 | A1 * | 7/2024 | Krivonosova | G06Q 10/06375 |
| 2025/0200678 | A1 * | 6/2025 | Kim | G06Q 50/06 |
| 2025/0202233 | A1 * | 6/2025 | Yonezawa | H02J 3/004 |
| 2025/0266680 | A1 * | 8/2025 | O'Gorman | H02J 3/003 |
| 2025/0285199 | A1 * | 9/2025 | Falcon | G06Q 30/0206 |

FOREIGN PATENT DOCUMENTS

| | | | |
|---|---|---|---|
| EP | 4290858 | A2 | 12/2023 |
| EP | 4492166 | A1 | 1/2025 |
| WO | WO 2013/169849 | A2 | 11/2013 |
| WO | WO 2014/105276 | A1 | 7/2014 |
| WO | WO 2020/243691 | A1 | 12/2020 |

OTHER PUBLICATIONS

International Patent Application No. PCT/US2024/032192; Int'l Search Report and the Written Opinion; dated Sep. 27, 2024; 19 pages.

Chadoulos et al.; "Mobile Apps Meet the Smart Energy Grid: A Survey on Consumer Engagement and Machine Learning Applications"; IEEE Access; vol. 8; 2020; p. 219632-219655.

J. Clover; "iOS 17 includes 'Grid Forecast' Feature to Let You Know When 'Cleaner' Energy is Available"; MacRumors; Sep. 2013; 2 pages.

"Apps that helps save the planet"; https://www.youtube.com/shorts/yZpLKAo1Bxo; YouTube; Sep. 2021; accessed Oct. 14, 2024; 2 pages.

Ruff et al.; "Carbon Intensity API"; https://web.archive.org/web/20230522021535/https:/www.carbonintensity.org.uk/; May 2023; accessed Sep. 2024; 5 pages.

Papaioannou et al.; "An IoT-Based Gamified Approach for Reducing Occupants' Energy Wastage in Public Buildings"; Sensors; vol. 18; 2018; 24 pages.

International Patent Application No. PCT/US2025/025991; Pay Add'l Fees; dated Jul. 22, 2025; 13 pages.

International Patent Application No. PCT/US2025/032479; Pay Add'l Fees; dated Sep. 11, 2025; 15 pages.

International Patent Application No. PCT/US2025/025991; Int'l Search Report and the Written Opinion; dated Sep. 12, 2025; 19 pages.

S. Writtenhouse; "How to set up and check the status of your HomeKit hubs"; https://www.idownloadblog.com/2020/02/17/set-up-check-status-homekit-hubs/; iDownloadBlog; May 2024; accessed Sep. 3, 2025; 10 pages.

International Patent Application No. PCT/US2025/032487; Invitation to Pay Add'l Fees; Sep. 18, 2025; 12 pages.

International Patent Application No. PCT/US2025/032883; Int'l Search Report and the Written Opinion; dated Oct. 13, 2025; 12 pages.

International Patent Application No. PCT/US2025/032479; Int'l Search Report and the Written Opinion; dated Nov. 3, 2025; 22 pages.

U.S. Appl. No. 18/895,597; Final Office Action; dated Nov. 3, 2025; 28 pages.

International Patent Application No. PCT/US2025/032899; Invitation to Pay Add'l Fees; dated Nov. 3, 2025; 12 pages.

International Patent Application No. PCT/US2025/032487; Int'l Search Report and the Written Opinion; dated Nov. 10, 2025; 8 pages.

U.S. Appl. No. 60/936,562, filed Jun. 20, 2007.

* cited by examiner

TECHNIQUES FOR MANAGING ENERGY FORECASTS

CROSS-REFERENCE TO RELATED APPLICATIONS

The present application claims priority to U.S. Provisional Patent Application Ser. No. 63/470,984 entitled "TECHNIQUES FOR MANAGING ENERGY FORECASTS" filed Jun. 5, 2023, which is hereby incorporated by reference in its entirety for all purposes.

FIELD

The present disclosure relates generally to computer user interfaces, and more specifically to techniques for managing energy forecasts.

BACKGROUND

Electronic devices often provide information regarding the status of events in the general vicinity of the electronic device. Such information can indicate the occurrence of certain events.

SUMMARY

Some techniques for managing energy forecasts using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing energy forecasts. Such methods and interfaces optionally complement or replace other methods for managing energy forecasts. Such methods and interfaces reduce the cognitive burden on a user and produce a more efficient human-machine interface. For battery-operated computing devices, such methods and interfaces conserve power and increase the time between battery charges.

In some examples, a method that is performed at a computer system that is in communication with a display generation component and one or more input devices is described. In some examples, the method comprises: detecting, via the one or more input devices, a first request to display a first energy forecast user interface object; and in response to detecting the first request to display the first energy forecast user interface object, displaying, via the display generation component, the first energy forecast user interface object, wherein: in accordance with a determination that a first set of one or more criteria is satisfied: the first energy forecast user interface object corresponds to a first electrical grid; and the first energy forecast user interface object includes a first set of one or more energy indicators that indicate one or more time periods when the first electrical grid is identified to output a first type of energy; and in accordance with a determination that a second set of one or more criteria is satisfied: the first energy forecast user interface object corresponds to a second electrical grid different from the first electrical grid; and the first energy forecast user interface object includes a second set of one or more energy indicators that indicate one or more time periods when the second electrical grid is identified to output the first type of energy.

In some examples, a non-transitory computer-readable storage medium storing one or more programs configured to be executed by one or more processors of a computer system that is in communication with a display generation component and one or more input devices is described. In some examples, the one or more programs includes instructions for: detecting, via the one or more input devices, a first request to display a first energy forecast user interface object; and in response to detecting the first request to display the first energy forecast user interface object, displaying, via the display generation component, the first energy forecast user interface object, wherein: in accordance with a determination that a first set of one or more criteria is satisfied: the first energy forecast user interface object corresponds to a first electrical grid; and the first energy forecast user interface object includes a first set of one or more energy indicators that indicate one or more time periods when the first electrical grid is identified to output a first type of energy; and in accordance with a determination that a second set of one or more criteria is satisfied: the first energy forecast user interface object corresponds to a second electrical grid different from the first electrical grid; and the first energy forecast user interface object includes a second set of one or more energy indicators that indicate one or more time periods when the second electrical grid is identified to output the first type of energy.

In some examples, a transitory computer-readable storage medium storing one or more programs configured to be executed by one or more processors of a computer system that is in communication with a display generation component and one or more input devices is described. In some examples, the one or more programs includes instructions for: detecting, via the one or more input devices, a first request to display a first energy forecast user interface object; and in response to detecting the first request to display the first energy forecast user interface object, displaying, via the display generation component, the first energy forecast user interface object, wherein: in accordance with a determination that a first set of one or more criteria is satisfied: the first energy forecast user interface object corresponds to a first electrical grid; and the first energy forecast user interface object includes a first set of one or more energy indicators that indicate one or more time periods when the first electrical grid is identified to output a first type of energy; and in accordance with a determination that a second set of one or more criteria is satisfied: the first energy forecast user interface object corresponds to a second electrical grid different from the first electrical grid; and the first energy forecast user interface object includes a second set of one or more energy indicators that indicate one or more time periods when the second electrical grid is identified to output the first type of energy.

In some examples, a computer system that is in communication with a display generation component and one or more input devices is described. In some examples, the computer system comprises one or more processors and memory storing one or more programs configured to be executed by the one or more processors. In some examples, the one or more programs includes instructions for: detecting, via the one or more input devices, a first request to display a first energy forecast user interface object; and in response to detecting the first request to display the first energy forecast user interface object, displaying, via the display generation component, the first energy forecast user interface object, wherein: in accordance with a determination that a first set of one or more criteria is satisfied: the first energy forecast user interface object corresponds to a first electrical grid; and the first energy forecast user interface object includes a first set of one or more energy indicators that indicate one or more time periods when the first electrical grid is identified to output a first type of energy; and in accordance with a determination that a second set of one or more criteria is satisfied: the first energy forecast user interface object corresponds to a second electrical grid different from the first electrical grid; and the first energy forecast user interface object includes a second set of one or more energy indicators that indicate one or more time periods when the second electrical grid is identified to output the first type of energy.

In some examples, a computer system that is in communication with a display generation component and one or more input devices is described. In some examples, the computer system comprises means for performing each of the following steps: detecting, via the one or more input devices, a first request to display a first energy forecast user interface object; and in response to detecting the first request to display the first energy forecast user interface object, displaying, via the display generation component, the first energy forecast user interface object, wherein: in accordance with a determination that a first set of one or more criteria is satisfied: the first energy forecast user interface object corresponds to a first electrical grid; and the first energy forecast user interface object includes a first set of one or more energy indicators that indicate one or more time periods when the first electrical grid is identified to output a first type of energy; and in accordance with a determination that a second set of one or more criteria is satisfied: the first energy forecast user interface object corresponds to a second electrical grid different from the first electrical grid; and the first energy forecast user interface object includes a second set of one or more energy indicators that indicate one or more time periods when the second electrical grid is identified to output the first type of energy.

In some examples, a computer program product is described. In some examples, the computer program product comprises one or more programs configured to be executed by one or more processors of a computer system that is in communication with a display generation component and one or more input devices. In some examples, the one or more programs include instructions for: detecting, via the one or more input devices, a first request to display a first energy forecast user interface object; and in response to detecting the first request to display the first energy forecast user interface object, displaying, via the display generation component, the first energy forecast user interface object, wherein: in accordance with a determination that a first set of one or more criteria is satisfied: the first energy forecast user interface object corresponds to a first electrical grid; and the first energy forecast user interface object includes a first set of one or more energy indicators that indicate one or more time periods when the first electrical grid is identified to output a first type of energy; and in accordance with a determination that a second set of one or more criteria is satisfied: the first energy forecast user interface object corresponds to a second electrical grid different from the first electrical grid; and the first energy forecast user interface object includes a second set of one or more energy indicators that indicate one or more time periods when the second electrical grid is identified to output the first type of energy.

In some examples, a method that is performed at a computer system that is in communication with a display generation component and one or more input devices is described. In some examples, the method comprises: detecting, via the one or more input devices, a first input that corresponds to a selection of a user interface object; and in response to detecting the first input: displaying, via the display generation component, an energy user interface, wherein: in accordance with a determination that the computer system is positioned at a first location that corresponds to a first type of location of the computer system, the energy user interface includes a first energy forecast user interface object and does not include a second energy forecast user interface object; and in accordance with a determination that the computer system is positioned at a second location that does not correspond to the first type of location of the computer system, the energy user interface includes: the first energy forecast user interface object; and the second energy forecast user interface object.

In some examples, a non-transitory computer-readable storage medium storing one or more programs configured to be executed by one or more processors of a computer system that is in communication with a display generation component and one or more input devices is described. In some examples, the one or more programs includes instructions for: detecting, via the one or more input devices, a first input that corresponds to a selection of a user interface object; and in response to detecting the first input: displaying, via the display generation component, an energy user interface, wherein: in accordance with a determination that the computer system is positioned at a first location that corresponds to a first type of location of the computer system, the energy user interface includes a first energy forecast user interface object and does not include a second energy forecast user interface object; and in accordance with a determination that the computer system is positioned at a second location that does not correspond to the first type of location of the computer system, the energy user interface includes: the first energy forecast user interface object; and the second energy forecast user interface object.

In some examples, a transitory computer-readable storage medium storing one or more programs configured to be executed by one or more processors of a computer system that is in communication with a display generation component and one or more input devices is described. In some examples, the one or more programs includes instructions for: detecting, via the one or more input devices, a first input that corresponds to a selection of a user interface object; and in response to detecting the first input: displaying, via the display generation component, an energy user interface, wherein: in accordance with a determination that the computer system is positioned at a first location that corresponds to a first type of location of the computer system, the energy user interface includes a first energy forecast user interface object and does not include a second energy forecast user interface object; and in accordance with a determination that the computer system is positioned at a second location that does not correspond to the first type of location of the computer system, the energy user interface includes: the first energy forecast user interface object; and the second energy forecast user interface object.

In some examples, a computer system that is in communication with a display generation component and one or more input devices is described. In some examples, the computer system comprises one or more processors and memory storing one or more programs configured to be executed by the one or more processors. In some examples, the one or more programs includes instructions for: detecting, via the one or more input devices, a first input that corresponds to a selection of a user interface object; and in response to detecting the first input: displaying, via the display generation component, an energy user interface, wherein: in accordance with a determination that the computer system is positioned at a first location that corresponds to a first type of location of the computer system, the energy user interface includes a first energy forecast user interface object and does not include a second energy forecast user interface object; and in accordance with a determination that the computer system is positioned at a second location that does not correspond to the first type of location of the computer system, the energy user interface includes: the first energy forecast user interface object; and the second energy forecast user interface object.

In some examples, a computer system that is in communication with a display generation component and one or more input devices is described. In some examples, the computer system comprises means for performing each of the following steps: detecting, via the one or more input devices, a first input that corresponds to a selection of a user interface object; and in response to detecting the first input: displaying, via the display generation component, an energy user interface, wherein: in accordance with a determination that the computer system is positioned at a first location that corresponds to a first type of location of the computer system, the energy user interface includes a first energy forecast user interface object and does not include a second energy forecast user interface object; and in accordance with a determination that the computer system is positioned at a second location that does not correspond to the first type of location of the computer system, the energy user interface includes: the first energy forecast user interface object; and the second energy forecast user interface object.

In some examples, a computer program product is described. In some examples, the computer program product comprises one or more programs configured to be executed by one or more processors of a computer system that is in communication with a display generation component and one or more input devices. In some examples, the one or more programs include instructions for: detecting, via the one or more input devices, a first input that corresponds to a selection of a user interface object; and in response to detecting the first input: displaying, via the display generation component, an energy user interface, wherein: in accordance with a determination that the computer system is positioned at a first location that corresponds to a first type of location of the computer system, the energy user interface includes a first energy forecast user interface object and does not include a second energy forecast user interface object; and in accordance with a determination that the computer system is positioned at a second location that does not correspond to the first type of location of the computer system, the energy user interface includes: the first energy forecast user interface object; and the second energy forecast user interface object.

In some examples, a method that is performed at a computer system that is in communication with an output component and one or more input devices is described. In some examples, the method comprises: detecting, via the one or more input devices, a first set of one or more inputs including an input that corresponds to selection of a user interface object; in response to detecting the first set of one or more inputs, configuring the computer system to output a first energy notification that corresponds to a respective location; and while the computer system is configured to output the first energy notification and in accordance with a determination that a first set of one or more criteria is satisfied, outputting, via the output component, the first energy notification indicating a beginning of an energy window for the respective location, wherein the energy window corresponds to a first type of energy.

In some examples, a non-transitory computer-readable storage medium storing one or more programs configured to be executed by one or more processors of a computer system that is in communication with an output component and one or more input devices is described. In some examples, the one or more programs includes instructions for: detecting, via the one or more input devices, a first set of one or more inputs including an input that corresponds to selection of a user interface object; in response to detecting the first set of one or more inputs, configuring the computer system to output a first energy notification that corresponds to a respective location; and while the computer system is configured to output the first energy notification and in accordance with a determination that a first set of one or more criteria is satisfied, outputting, via the output component, the first energy notification indicating a beginning of an energy window for the respective location, wherein the energy window corresponds to a first type of energy.

In some examples, a transitory computer-readable storage medium storing one or more programs configured to be executed by one or more processors of a computer system that is in communication with an output component and one or more input devices is described. In some examples, the one or more programs includes instructions for: detecting, via the one or more input devices, a first set of one or more inputs including an input that corresponds to selection of a user interface object; in response to detecting the first set of one or more inputs, configuring the computer system to output a first energy notification that corresponds to a respective location; and while the computer system is configured to output the first energy notification and in accordance with a determination that a first set of one or more criteria is satisfied, outputting, via the output component, the first energy notification indicating a beginning of an energy window for the respective location, wherein the energy window corresponds to a first type of energy.

In some examples, a computer system that is in communication with an output component and one or more input devices is described. In some examples, the computer system t comprises one or more processors and memory storing one or more programs configured to be executed by the one or more processors. In some examples, the one or more programs includes instructions for: detecting, via the one or more input devices, a first set of one or more inputs including an input that corresponds to selection of a user interface object; in response to detecting the first set of one or more inputs, configuring the computer system to output a first energy notification that corresponds to a respective location; and while the computer system is configured to output the first energy notification and in accordance with a determination that a first set of one or more criteria is satisfied, outputting, via the output component, the first energy notification indicating a beginning of an energy window for the respective location, wherein the energy window corresponds to a first type of energy.

In some examples, a computer system that is in communication with an output component and one or more input devices is described. In some examples, the computer system comprises means for performing each of the following steps: detecting, via the one or more input devices, a first set of one or more inputs including an input that corresponds to selection of a user interface object; in response to detecting the first set of one or more inputs, configuring the computer system to output a first energy notification that corresponds to a respective location; and while the computer system is configured to output the first energy notification and in accordance with a determination that a first set of one or more criteria is satisfied, outputting, via the output component, the first energy notification indicating a beginning of an energy window for the respective location, wherein the energy window corresponds to a first type of energy.

In some examples, a computer program product is described. In some examples, the computer program product comprises one or more programs configured to be executed by one or more processors of a computer system that is in communication with an output component and one or more input devices. In some examples, the one or more programs include instructions for: detecting, via the one or more input devices, a first set of one or more inputs including an input that corresponds to selection of a user interface object; in response to detecting the first set of one or more inputs, configuring the computer system to output a first energy notification that corresponds to a respective location; and while the computer system is configured to output the first energy notification and in accordance with a determination that a first set of one or more criteria is satisfied, outputting, via the output component, the first energy notification indicating a beginning of an energy window for the respective location, wherein the energy window corresponds to a first type of energy.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing energy forecasts, thereby increasing the effectiveness, efficiency, and user satisfaction with such devices. Such methods and interfaces may complement or replace other methods for managing energy forecasts.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing energy forecasts. For example, different types and/or different number of energy forecasts can be displayed based on a location of a computer system. Further, energy forecast notifications can be output to indicate a status of an electrical grid. Such techniques can reduce the cognitive burden on a user who manages energy forecast, thereby enhancing productivity. Further, such techniques can reduce processor and battery power otherwise wasted on redundant user inputs.

Figure 8:
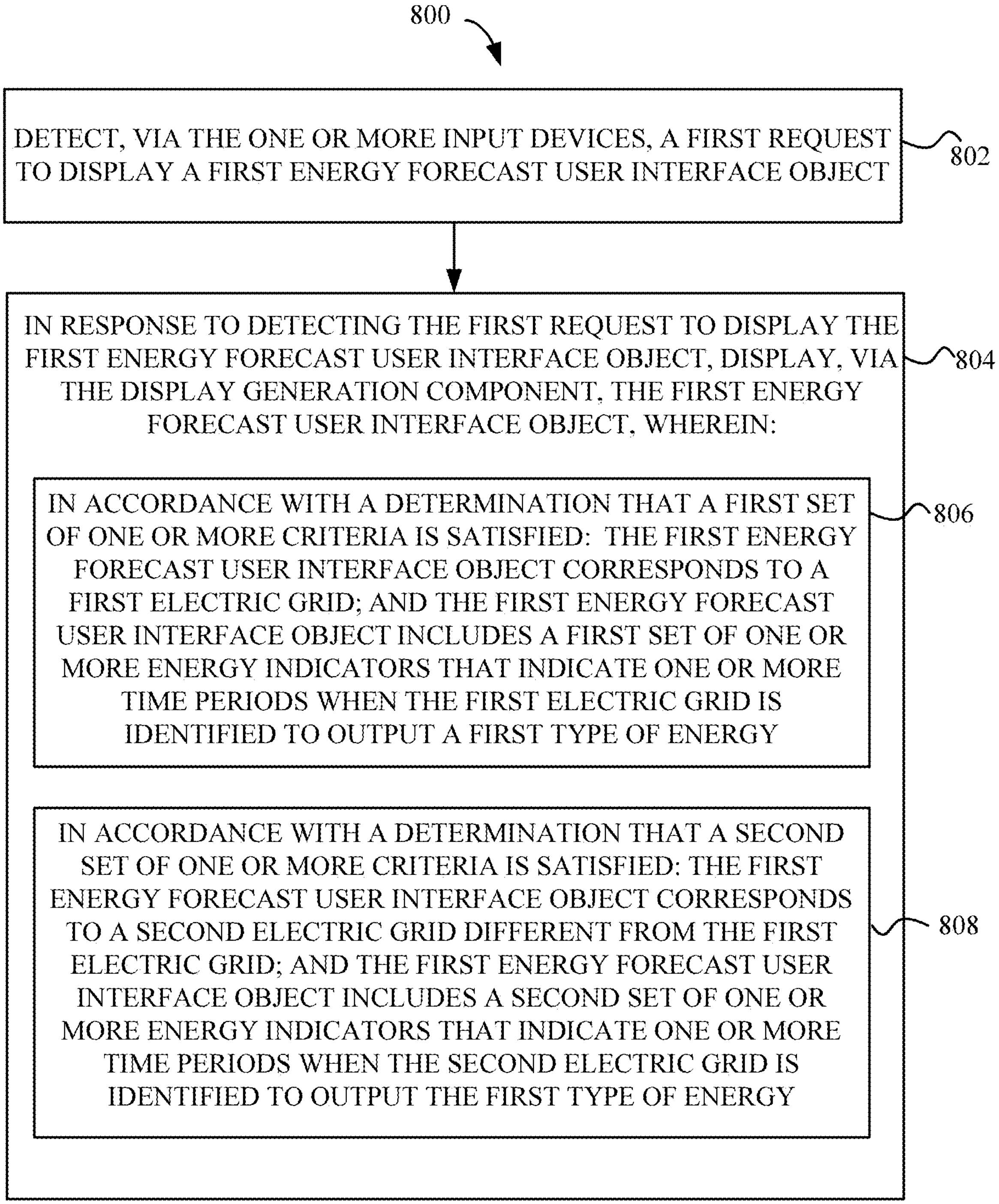
FIG. 8 is a flow diagram illustrating a method for selectively displaying a type of energy forecast in accordance with some examples.
Figure 9:
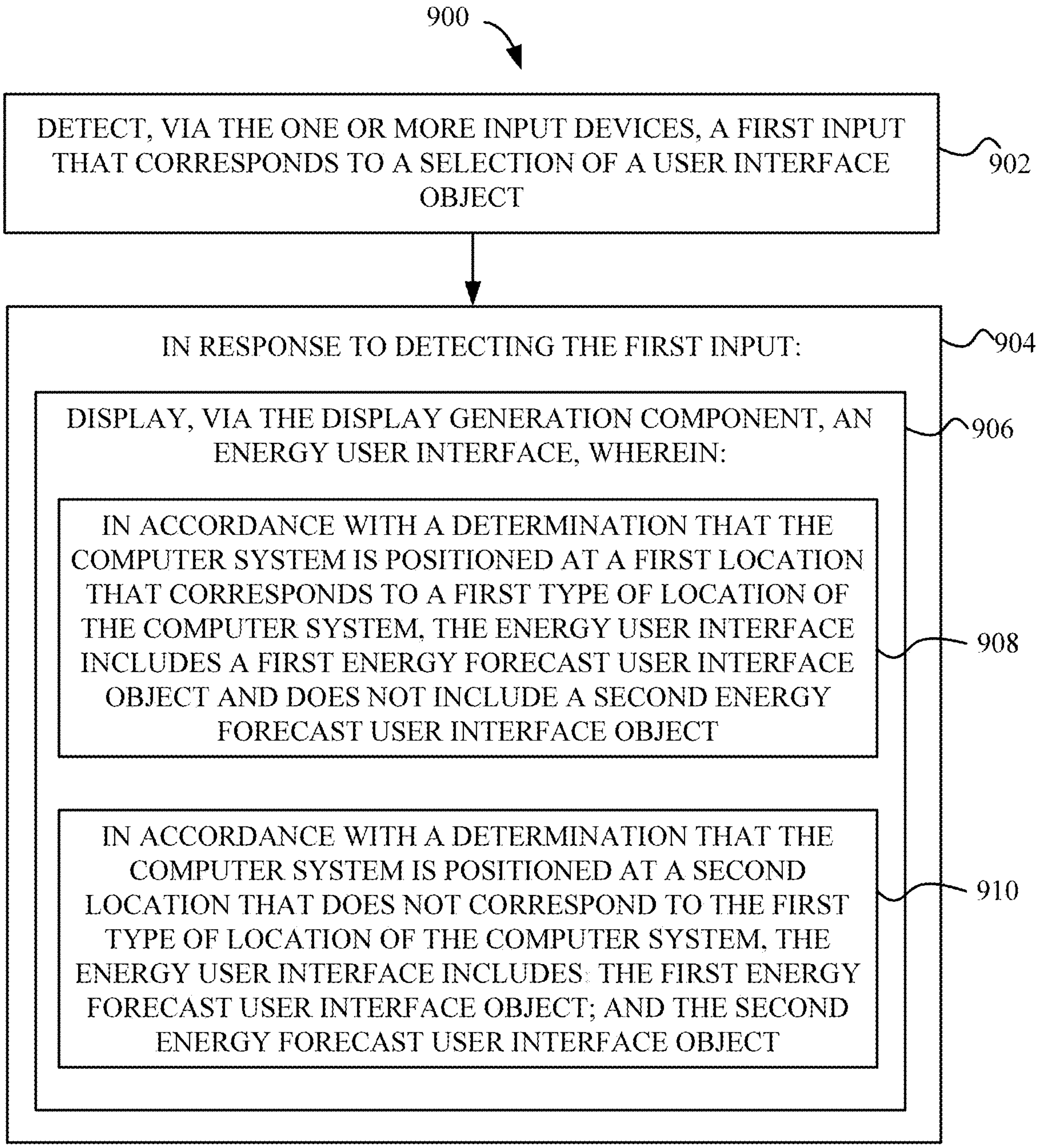
FIG. 9 is a flow diagram illustrating a method for selectively displaying one or more energy forecasts in accordance with some examples.
Figure 10:
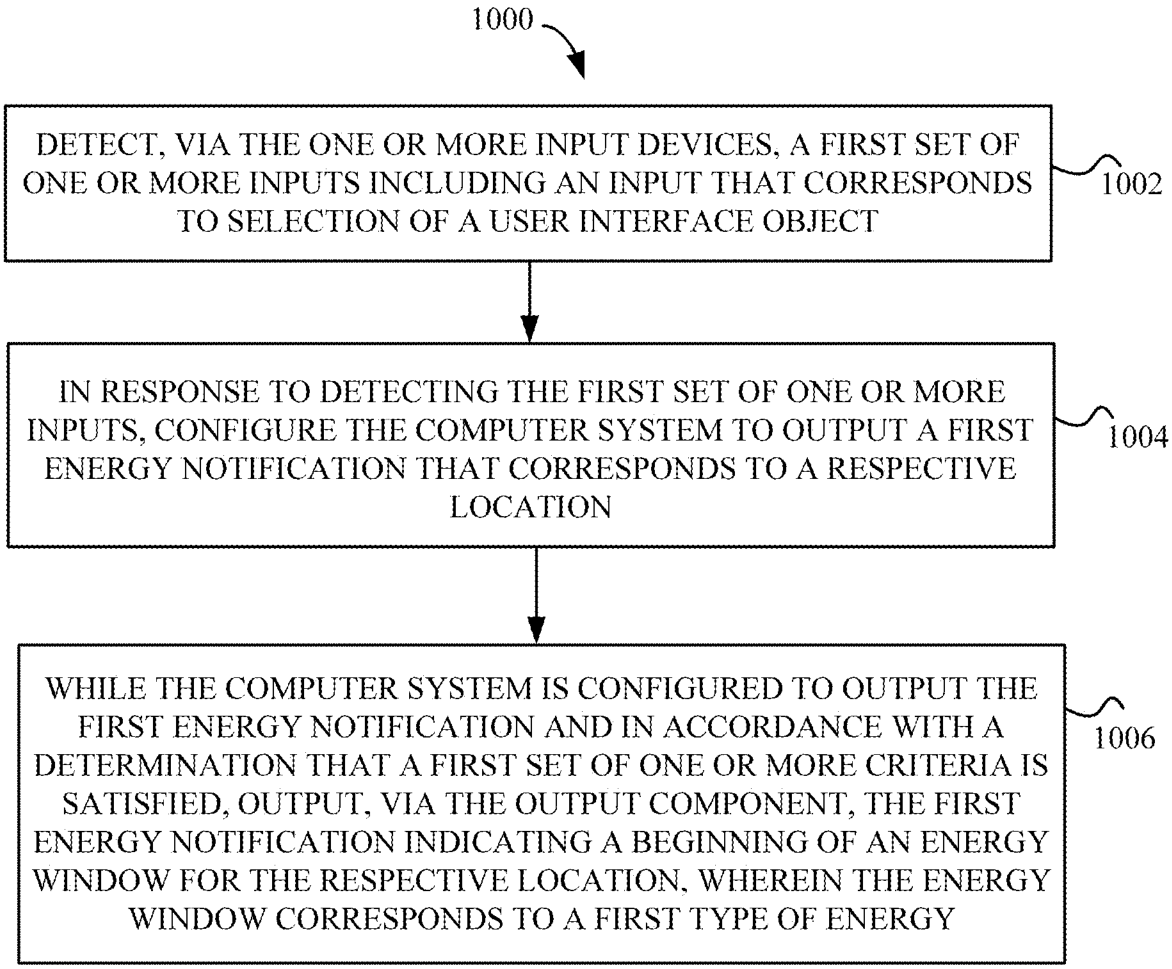
FIG. 10 is a flow diagram illustrating a method for outputting an energy notification in accordance with some examples.

Below, FIGS. 1A-1B, 2, 3, 4A-4B, and 5A-5B provide a description of exemplary devices for performing the techniques for managing energy forecasts. FIGS. 6A-6Y illustrate exemplary user interfaces for managing an energy forecast in accordance with some examples. FIGS. 7A-7E illustrate exemplary user interfaces for managing an energy forecast on a wearable computer system in accordance with some examples. FIG. 8 is a flow diagram illustrating methods of selectively displaying a type of energy forecast in accordance with some examples. FIG. 9 is a flow diagram illustrating methods of selectively displaying one or more energy forecast in accordance with some examples. FIG. 10 is a flow diagram illustrating methods of outputting an energy notification in accordance with some examples. The user interfaces in FIGS. 6A-6Y and FIGS. 7A-7E are used to illustrate the processes described below, including the processes in FIGS. 8-10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
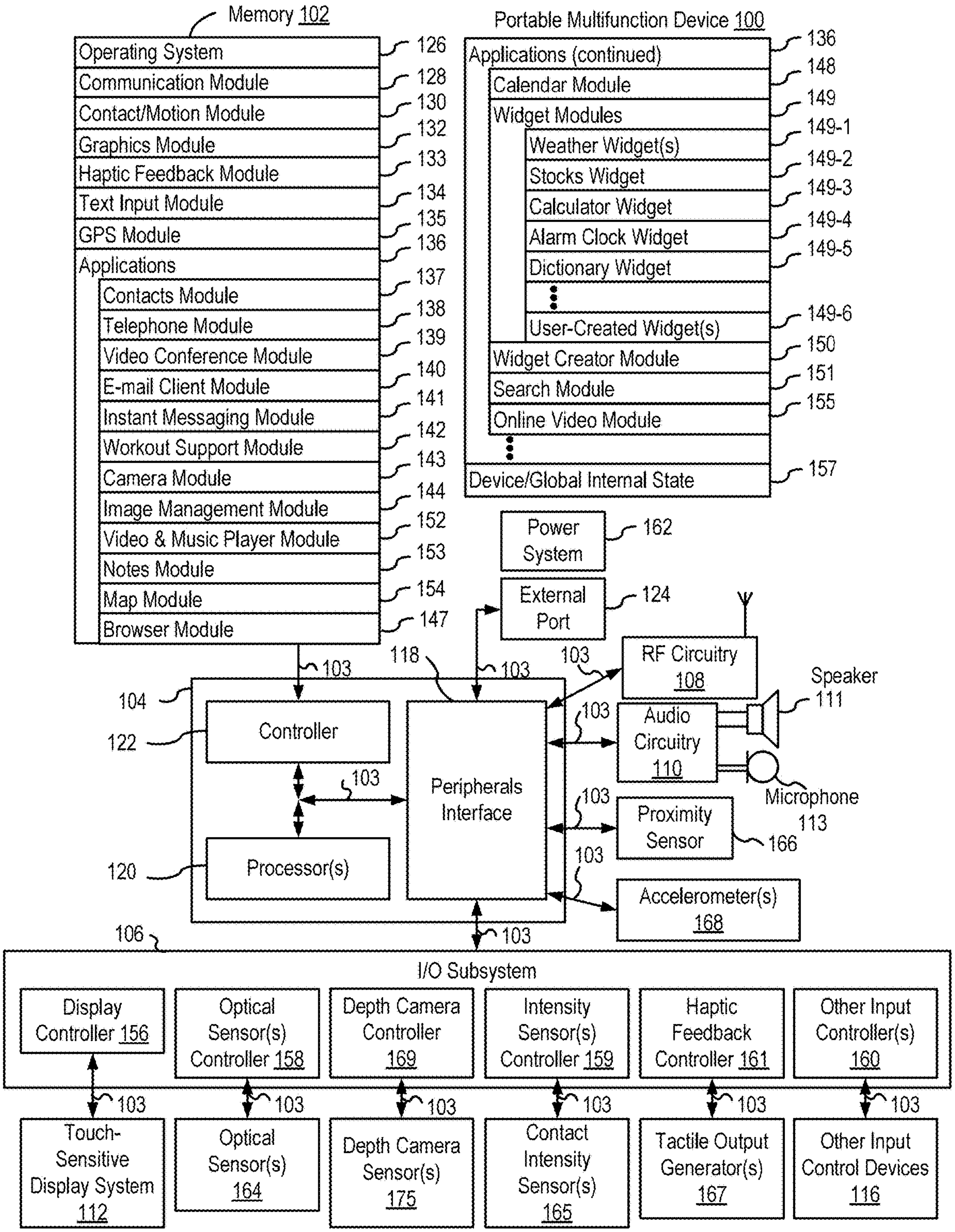
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "O" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
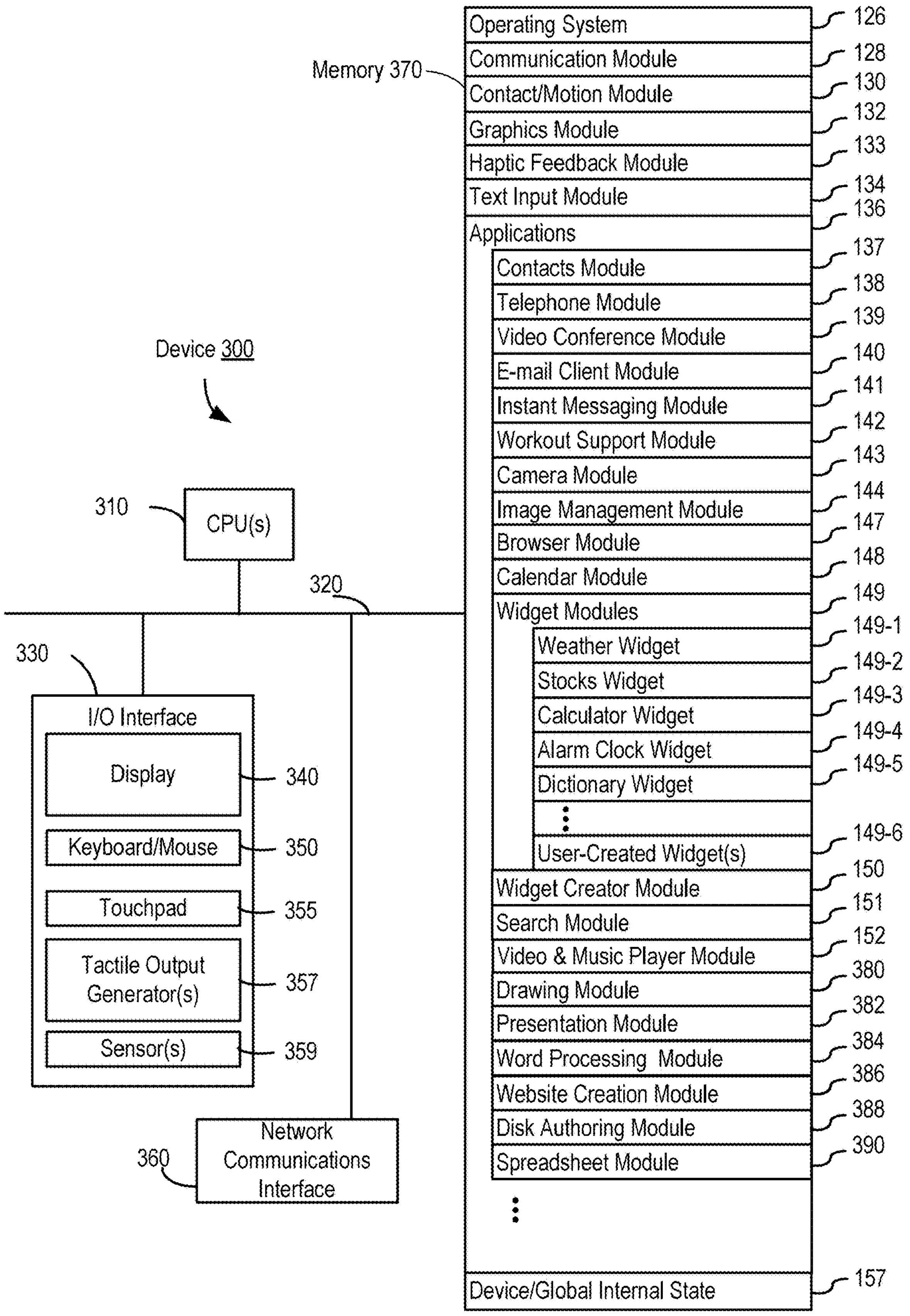
FIG. 3 is a block diagram of an exemplary multifunction device with a display and a touch-sensitive surface in accordance with some examples.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
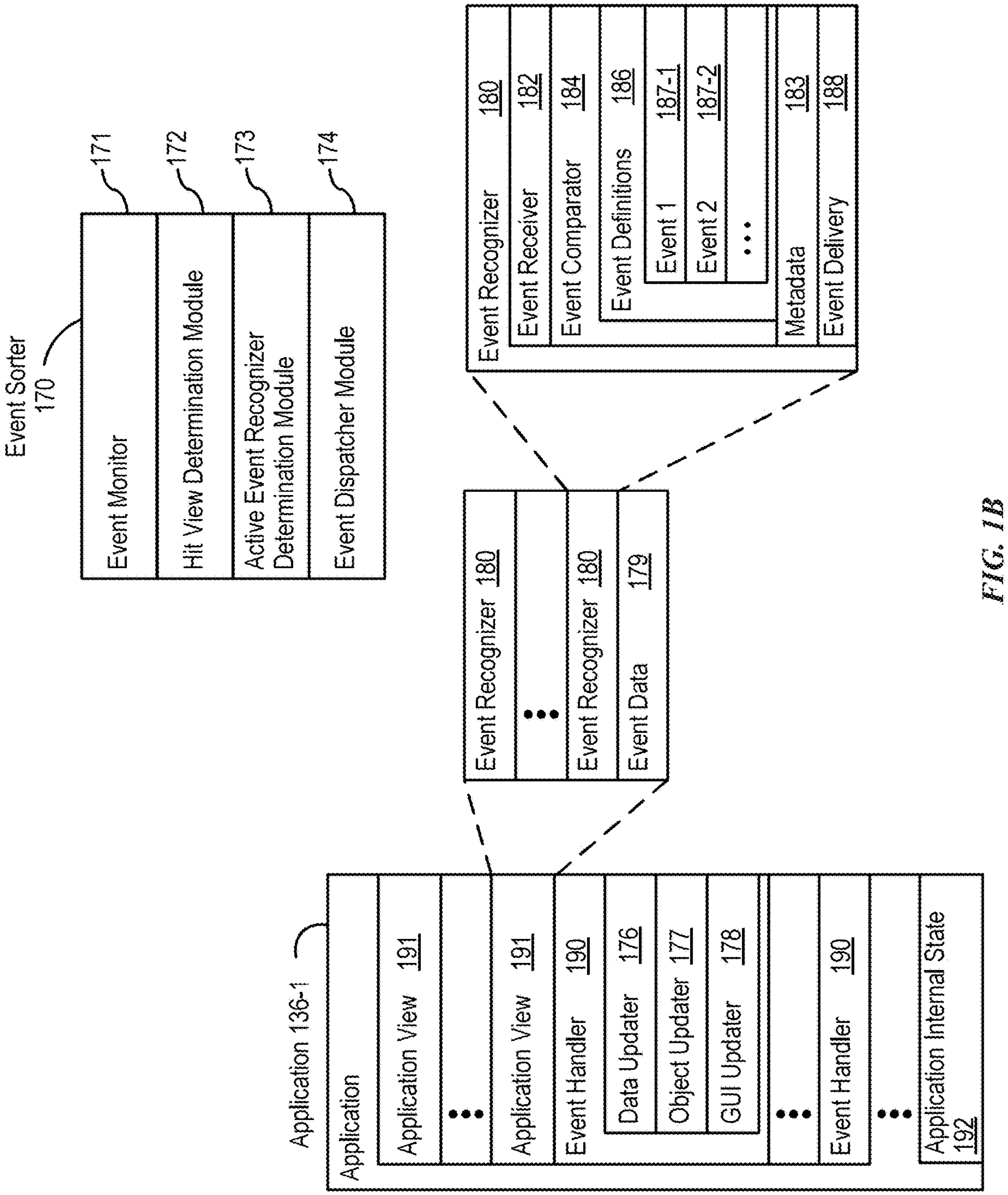
FIG. 1B is a block diagram illustrating exemplary components for event handling in accordance with some examples.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
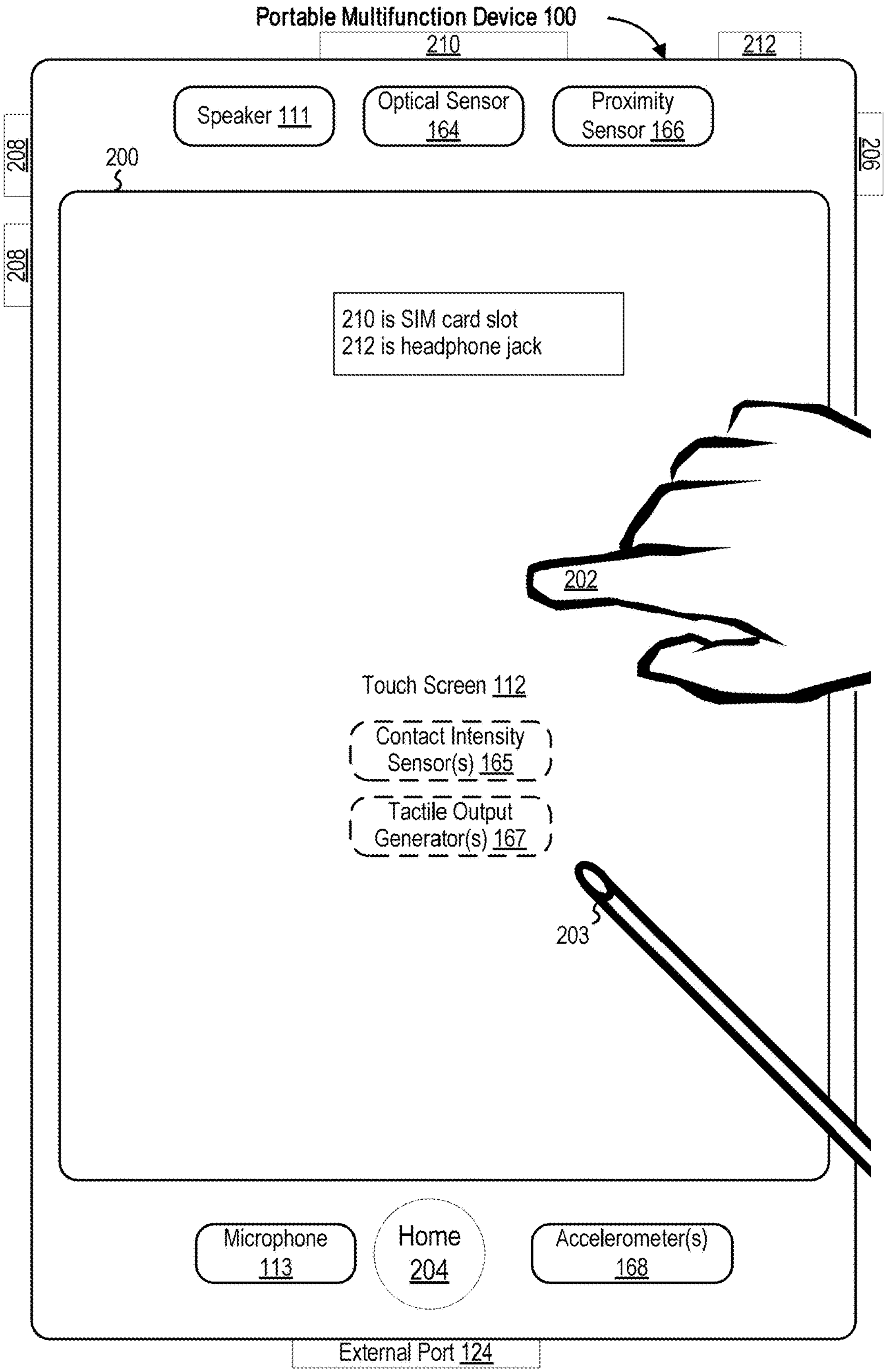
FIG. 2 illustrates a portable multifunction device having a touch screen in accordance with some examples.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
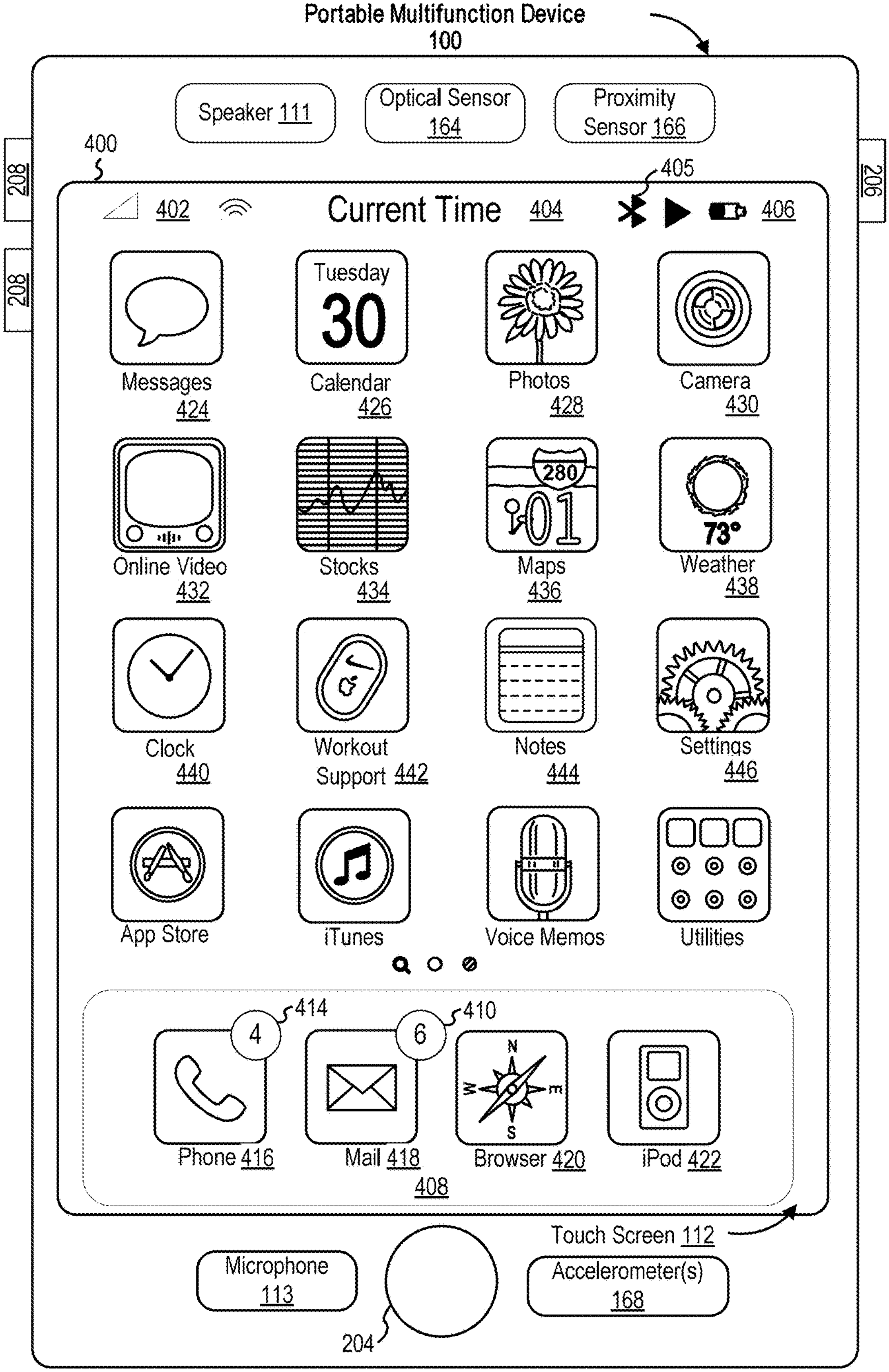
FIG. 4A illustrates an exemplary user interface for a menu of applications on a portable multifunction device in accordance with some examples.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
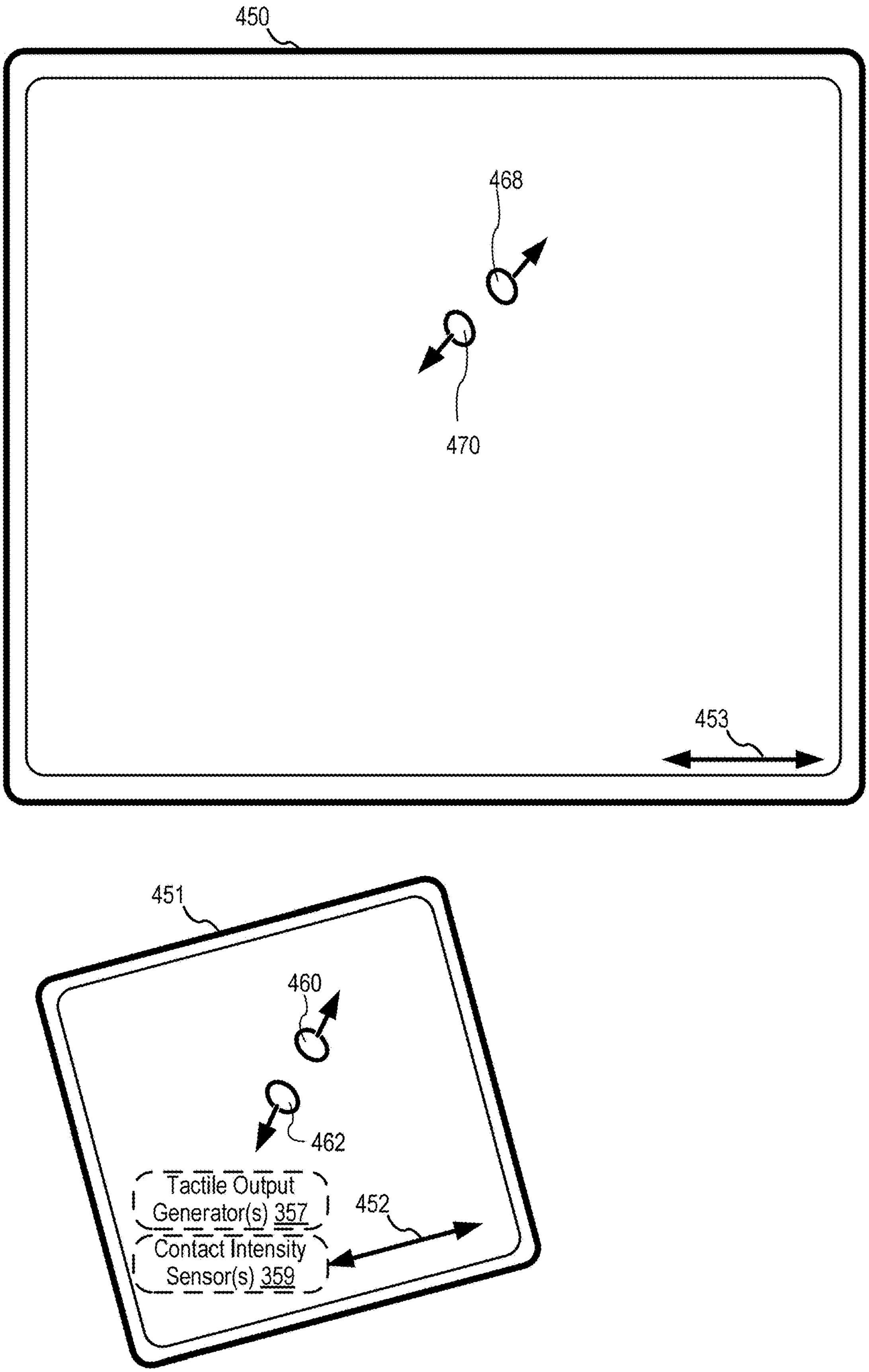
FIG. 4B illustrates an exemplary user interface for a multifunction device with a touch-sensitive surface that is separate from the display in accordance with some examples.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
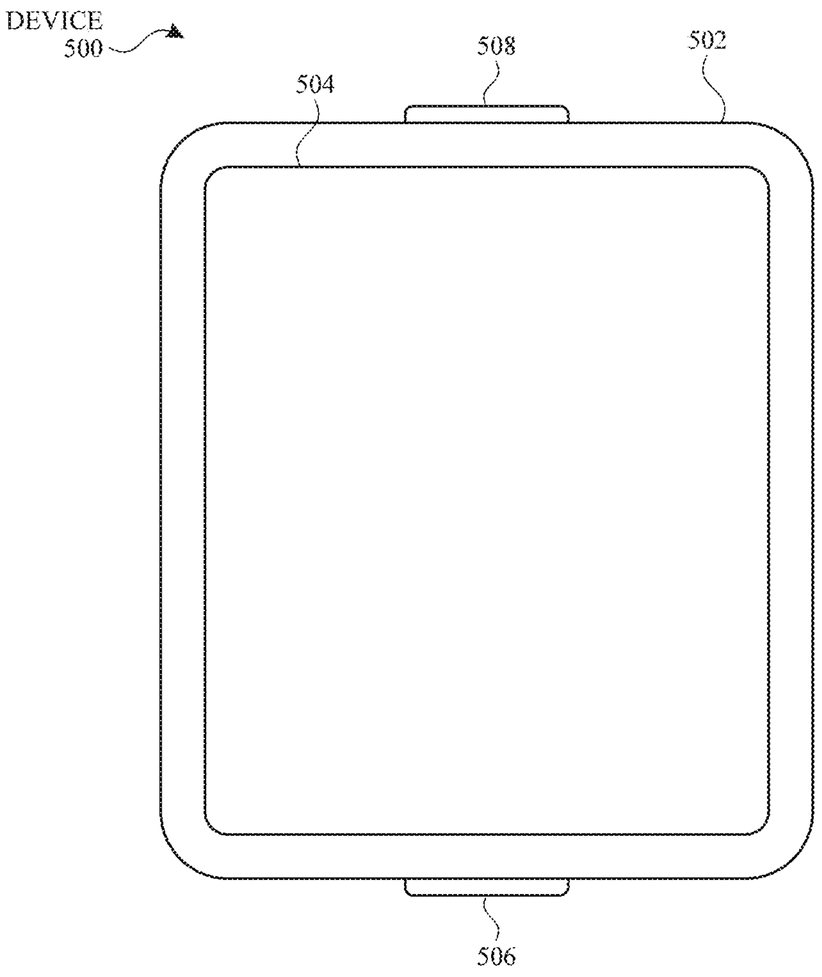
FIG. 5A illustrates a personal electronic device in accordance with some examples.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
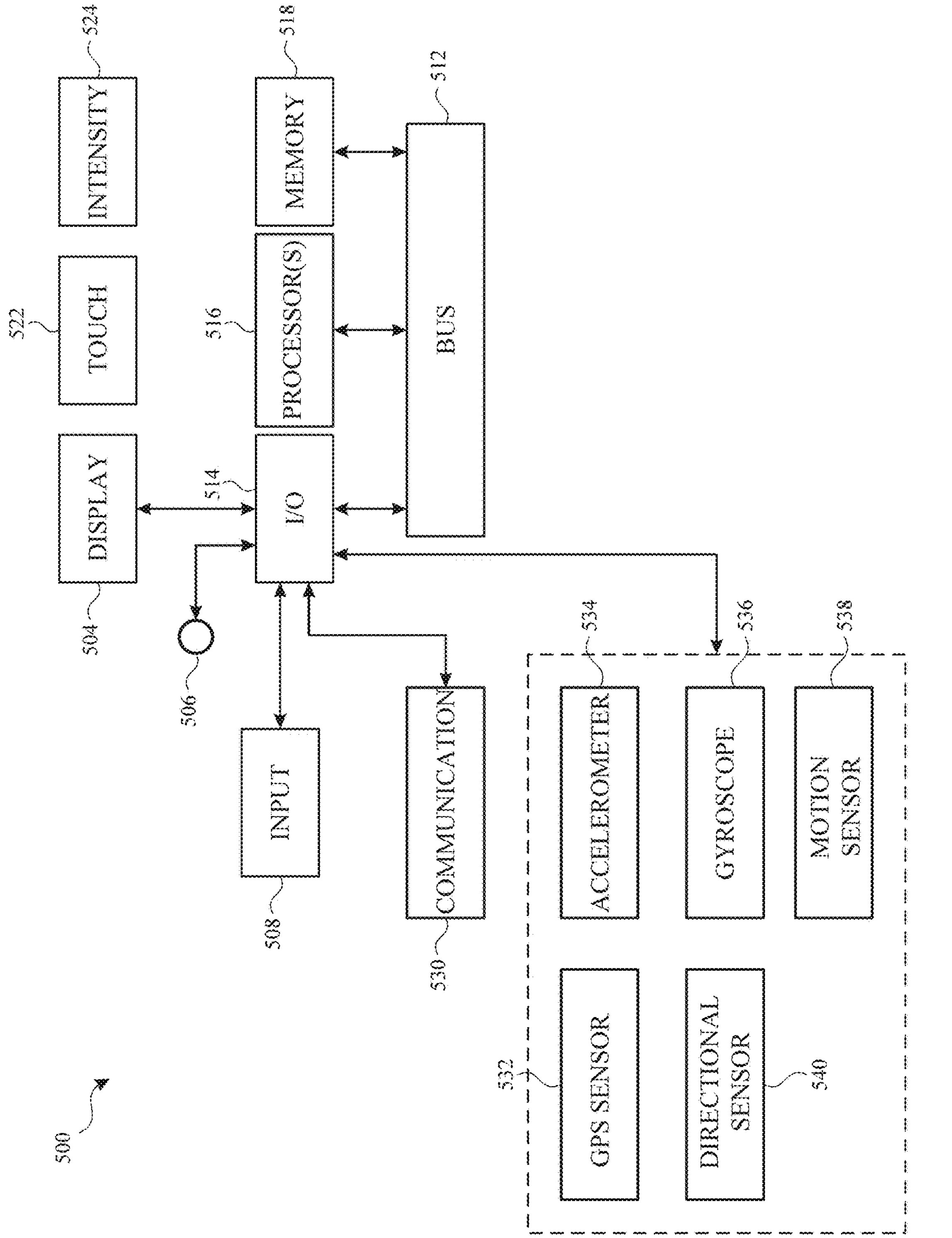
FIG. 5B is a block diagram illustrating a personal electronic device in accordance with some examples.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 900, and 1000 (FIGS. 8, 9, and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6Y and 7A-7E illustrate exemplary user interfaces for managing an energy forecast user interface using a computer system in accordance with some embodiments. The user interfaces in these figures are used to illustrate the processes described below, including the processes in FIGS. 8, 9, and 10.

FIGS. 6A-6Y span across a period of four days. Each figure of FIGS. 6A-6Y include energy forecast schematic 606. Energy forecast schematic 606 is included as a visual aid that indicates the time, the date, and the current location of computer system 600. At FIG. 6A, energy forecast schematic 606 indicates that FIG. 6A corresponds to a first day in the series of days (e.g., Monday, September 5th), the current time is 7:00 am, and computer system 600 is positioned at Cupertino, California.

FIG. 6A illustrates computer system 600. As illustrated in FIG. 6A, computer system 600 is a smartphone. While computer system 600 is illustrated as a smartphone, it should be recognized that this is merely an example and techniques described herein can be performed with other types of computer systems, such as a tablet, a smart watch, laptop, a personal gaming system, a head-mounted display (HMD) device, and/or a desktop computer. In some examples, computer system 600 includes one or more components and/or features described above in relation to electronic devices 100, 300, and/or 500.

As illustrated in FIG. 6A, computer system 600 displays home page 602. As illustrated in FIG. 6A, home page 602 includes current time indicator 604 and application region 608. Current time indicator 604 indicates the current time. As illustrated in FIG. 6A, current time indicator 604 indicates that the current time is 7:00 AM. Computer system 600 displays graphical representations of applications that are installed on computer system 600 within application region 608 of home page 602. As illustrated in FIG. 6A, application region 608 includes home application control 610. In some examples, home application control 610 corresponds to an application that is installed on computer system 600 that provides details regarding the status of one or more accessories that are registered with computer system 600 and/or positioned at a location that is designated as a primary (e.g., home) location of computer system 600. At FIG. 6A, computer system 600 detects tap input 605*a* directed to (e.g., corresponding to the selection of) home application control 610.

Figure 6B:
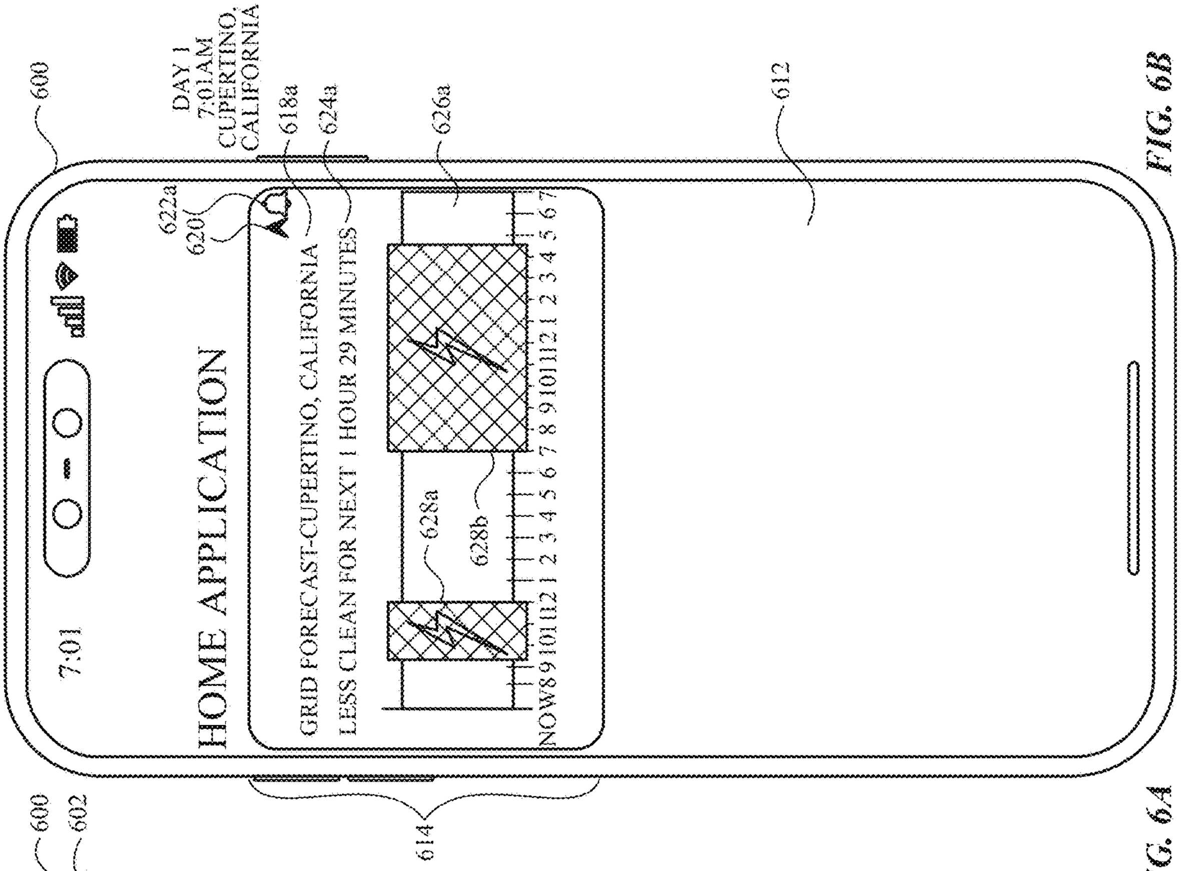
FIGS. 6A-6Y illustrate exemplary user interfaces for managing an energy forecast in accordance with some examples.
Figure 6A:
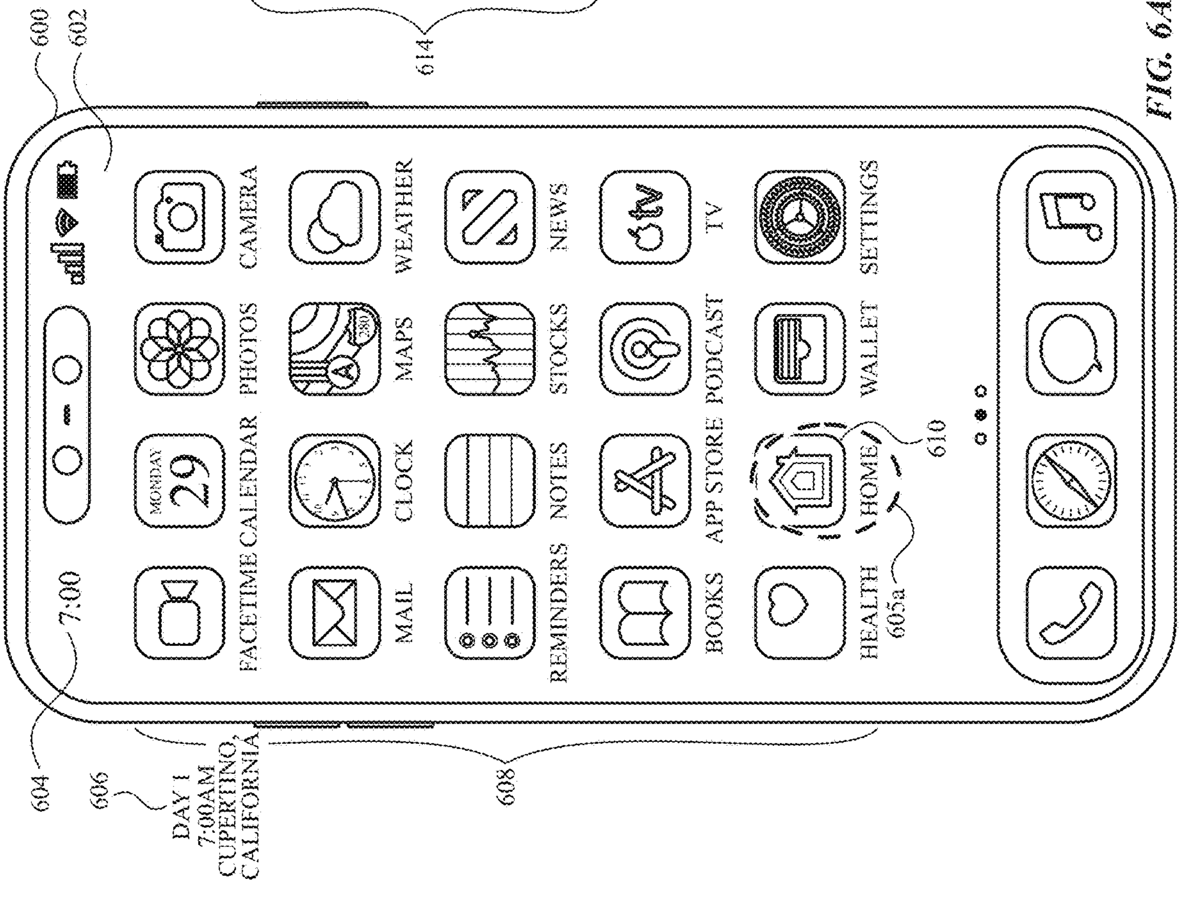
Figure 6D:
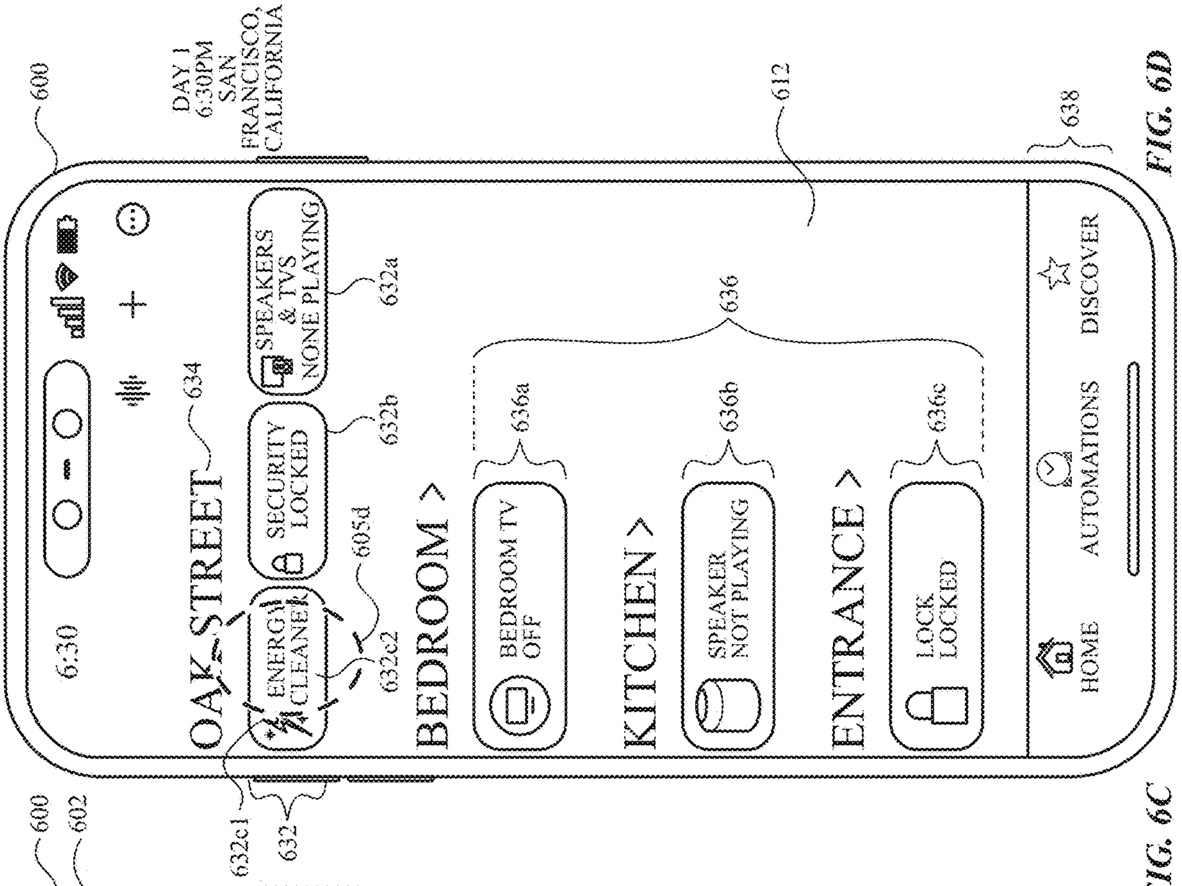

As illustrated in FIG. 6B, in response to detecting tap input 605*a*, computer system 600 displays home user interface 612. As illustrated in FIG. 6B, home user interface 612 includes current location energy forecast platter 614. At FIG. 6B, a determination is made that a primary location (e.g., a home location, a location where computer system 600 recognizes a network (e.g., a Wi-Fi network), a location where computer system 600 recognizes one or more external accessories, a location that has been registered as a home location with computer system 600, and/or a house of the user of computer system 600) has not been selected for computer system 600. At FIG. 6B, because a determination is made that no primary location has been selected for computer system 600, current location energy forecast platter 614 corresponds to an electrical grid at the current location (e.g., Cupertino, California) of computer system 600.

As illustrated in FIG. 6B, current location energy forecast platter 614 includes energy forecast grid location indicator 618*a*, GPS position indicator 620, notification control 622*a*, energy forecast window indicator 624*a*, energy forecast user interface object 626*a*, clean energy period indicator 628*a*, and clean energy period indicator 628*b*. As illustrated in FIG. 6B, computer system 600 displays energy forecast grid location indicator 618*a* (e.g., an indication that the electrical grid that corresponds to current location energy forecast platter 614 is located at Cupertino, California). In some examples, computer system 600 displays GPS position indicator 620 within current location energy forecast platter 614 to indicate that current location energy forecast platter 614 corresponds to the current location of computer system 600. As explained in greater detail below, in response to detecting an input corresponding to selection of notification control 622*a*, computer system 600 initiates a process for configuring itself to output a notification indicating the beginning of a clean energy period (e.g., a period of time where the electrical grid at the current location of computer system 600 will output clean energy (e.g., energy drawn from a renewable resource (e.g., solar, wind, geothermal, hydropower, ocean energy, and/or bioenergy) and/or energy drawn from sources that naturally renew or replenish themselves)) for an electrical grid at the current location of computer system 600. In some examples, computer system 600 configures itself to output a notification indicating the beginning of a clean energy period in response to detecting an input corresponding to selection of notification control 622*a*. In some examples, in response to detecting an input that corresponds to selection of current location energy forecast platter 614, computer system 600 displays an educational user interface that includes information (e.g., historic output, current output, amount of clean energy output over a time period, and/or information regarding how clean energy is created) regarding the electrical grid at the current location of computer system 600.

In some examples, energy forecast user interface object 626*a* has a length that corresponds to a twenty-four-hour time period. In such examples, the left most portion of energy forecast user interface object 626*a* can correspond to the present time of day and the right most portion of energy forecast user interface object 626*a* can correspond to twenty-four hours later. Accordingly, at FIG. 6B, energy forecast user interface object 626*a* corresponds to a twenty-four-hour time period that begins at 7:01 AM of the current day (e.g., day one of the series of days) and ends at 7:01 AM of the next day. As illustrated in FIG. 6B, energy forecast user interface object 626*a* includes numbers along its bottom axis that represent the hours during the twenty-four-hour time period.

As illustrated in FIG. 6B, computer system 600 displays clean energy period indicator 628*a* and clean energy period indicator 628*b* as overlaid on and/or part of energy forecast user interface object 626*a*. In some examples, computer system 600 displays clean energy period indicator 628*a* and clean energy period indicator 628*b* to indicate a period of time, ranging from a minimum of fifteen minutes (and/or, in some examples, shorter or longer) to a maximum of twenty-four hours (e.g., the length of energy forecast user interface object 626*a*), when the electrical grid that corresponds to the location of computer system 600 outputs clean energy (e.g., energy drawn from a renewable resource (e.g., solar, wind, geothermal, hydropower, ocean energy, and/or bioenergy) and/or energy drawn from sources that naturally renew or replenish themselves). In some examples, computer system 600 displays clean energy period indicator 628*a* and/or 628*b* based on a determination that the electrical grid at the current location of computer system 600 outputs an amount of clean energy (e.g., 1-1000 GW) that is above a threshold amount (e.g., for the current location and/or generally for any location).

As illustrated in FIG. 6B, clean energy period indicator 628*a* spans across a portion of energy forecast user interface object 626*a* that corresponds to a two and one-half hour time period that starts at 9:30 AM and ends at 12:00 PM and clean energy period indicator 628*b* spans across a portion of energy forecast user interface object 626*a* that corresponds to a ten hours and fifteen minutes time period that begins at 7:00 PM and ends at 4:45 AM. Accordingly, at FIG. 6B, the electrical grid at the location of computer system 600 will output clean energy from 9:30 AM to 12:00 PM and from 7:00 PM to 4:45 PM. In some examples, computer system 600 does not display any respective clean energy indicators on energy forecast user interface object 626*a* when a determination is made that the respective electrical grid will not output clean energy for the twenty-four-hour time period. In some examples, computer system 600 does not display any respective clean energy indicators on energy forecast user interface object 626*a* when a determination is made that the electrical grid at the current location of computer system 600 will not continuously output clean energy during the twenty-four-hour time period for longer than a threshold amount of time (e.g., 1-30 minutes). In some examples, clean energy period indicator 628*a* and clean energy period indicator 628*b* begin and end at 15-minute increments (e.g., 6:15 pm, 6:30 μm, and/or 6:45 pm). In some examples, computer system 600 displays clean energy period indicator 628*a* and clean energy period indicator 628*b* as textual indications of clean energy periods for the electrical grid at the current location of computer system 600 (e.g., and not graphical representations of clean energy periods).

As illustrated in FIG. 6B, computer system 600 displays energy forecast window indicator 624*a* to indicate the current status of the electrical grid at the location of computer system 600 and how long the electrical grid at the location of computer system 600 will remain at that status. At FIG. 6B, energy forecast window indicator 624*a* indicates that the electrical grid at the current location of computer system 600 will output less clean energy for the next hour and twenty-nine minutes. In some examples, computer system 600 displays energy forecast window indicator 624*a* with an indication of the time remaining until the electrical grid at the current location of computer system 600 begins the next clean energy period or the time left in a pending clean energy period (e.g., "cleaner for next 34 minutes," "Less clean for next 18 minutes"). In some examples, energy that is output by a respective electrical grid is categorized into a first category that corresponds to clean energy or is categorized into a second category that corresponds to less clean energy.

Figure 6C:
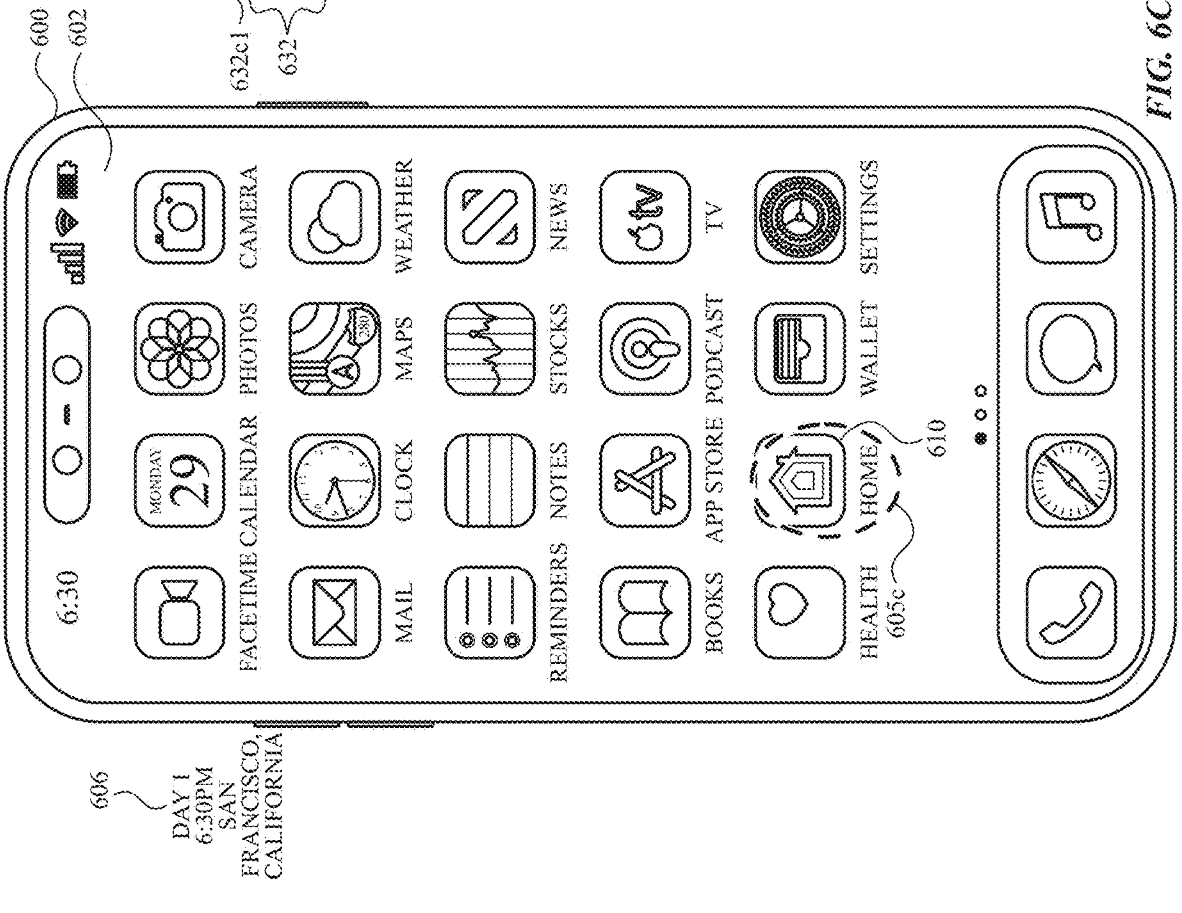

Between FIGS. 6B and 6C, a location entitled Oak Street (e.g., a street in San Francisco, California) is selected as the primary location for computer system 600. Further, between FIGS. 6B and 6C, a bedroom television, kitchen speaker, and smart lock, that are positioned at the primary location, are registered with computer system 600. In some examples, when a primary location is selected for computer system 600, accessories compatible with home application control 610 are automatically (e.g., without intervening user input) registered with computer system 600.

At FIG. 6C, as illustrated by energy forecast schematic 606, the current time is 6:30 PM on the first day and computer system 600 is positioned in San Francisco. Accordingly, between FIGS. 6B and 6C, 9.5 hours have elapsed and computer system 600 has transitioned from being positioned in Cupertino, California to being positioned in San Francisco, California (e.g., the location of the assigned primary location, "Oak Street."). As illustrated in FIG. 6C, computer system 600 displays home page 602. At FIG. 6C, computer system 600 detects tap input 605*c* corresponding to the selection of home application control 610.

As illustrated in FIG. 6D, in response to detecting tap input 605*c*, computer system 600 displays home user interface 612. As illustrated in FIG. 6D, because a primary location has been selected for computer system 600, computer system 600 displays home user interface 612 with accessory control region 632, assigned home location name indicator 634, and control region 636 (e.g., as compared to FIG. 6B, which illustrated home user interface 612 as not including accessory control region 632, assigned home location name indicator 634, and/or control region 636). Comparing home user interface 612 in FIG. 6D to home user interface 612 in FIG. 6B, computer system 600 does not display current location energy forecast platter 614 within home user interface 612 in FIG. 6D because a primary location has been selected for computer system 600. That is, in some examples, the content included within home user interface 612 is based on whether a primary location is selected for computer system 600.

Assigned home location name indicator 634 indicates the name of the primary location (e.g., "Oak Street") of computer system 600. Accessory control region 632 includes audio computer systems menu control 632*a* and security menu control 632*b*. Audio computer system menu controls 632*a* corresponds to the kitchen speaker and bedroom television that are registered with computer system 600. As illustrated in FIG. 6D, audio computer system menu control 632*a* provides a status of the kitchen speaker and the bedroom television (e.g., they are not playing). Security menu control 632*b* corresponds to the smart lock that is registered with computer system 600. Security menu control 632*b* provides a status of the smart lock (e.g., the smart lock is locked).

Further, as illustrated in FIG. 6D, computer system 600 displays energy forecast menu control 632*c* within accessory control region 632. In some examples, computer system 600 displays energy forecast menu control 632*c* within accessory control region 632 because one or more accessories at the primary location of computer system 600 are registered with computer system 600. In some examples, computer system 600 might not display energy forecast menu control 632*c* within accessory control region 632 when no accessories at the primary location of computer system 600 are registered with computer system 600 and instead display an energy forecast user interface object (e.g., similar to energy forecast user interface object 626*a* in FIG. 6B). As illustrated in FIG. 6D, energy forecast menu control 632*c* includes energy forecast icon 632*c*1 and energy status indicator 632*c*2. In some examples, computer system 600 displays energy forecast icon 632*c*1 with an appearance to indicate the current type of energy (e.g., clean energy or less clean energy) being output by the electrical grid that corresponds to the primary location of computer system 600 in real time (e.g., at a current time). In such examples, computer system 600 can change the appearance of energy forecast icon 632*c*1 depending on if the energy being output by the electrical grid at the primary location is clean or less clean.

As illustrated in FIG. 6D, computer system 600 displays energy forecast icon 632*c*1 with an appearance that includes a lightning bolt with flashes of light. The appearance of energy forecast icon 632*c*1 at FIG. 6D signifies that the current energy being output by the electrical grid at the primary location of computer system 600 is clean. In some examples, computer system 600 displays energy forecast icon 632*c*1 with an appearance that includes a lightning bolt with clouds, signifying that the current energy being output by the electrical grid at the primary location of computer system 600 is less clean. In some examples, computer system 600 displays, within energy forecast menu control 632*c*, an indication of a duration of how long the electrical grid at the primary location will output the type of energy indicated by the appearance of energy forecast icon 632*c*1. It should be recognized that other representations of the states described above and other states can be included in energy forecast icon 632*c*1 and that the examples described above are for discussion purposes.

At FIG. 6D, computer system 600 displays energy status indicator 632*c*2 to indicate the current energy type (e.g., clean or less clean) being output by the electrical grid at the primary location of computer system 600. As illustrated in FIG. 6D, computer system 600 displays energy status indicator 632*c*2 with a textual representation of the energy being output by the electrical grid at the primary location of computer system 600. In some examples, computer system 600 displays energy status indicator 632*c*2 as "cleaner" signifying that the current energy being output by the electrical grid at the selected primary location is clean. In some examples, computer system 600 displays energy status indicator 632*c*2 as "less clean," signifying that the current energy type being output by the electrical grid at the primary location of computer system 600 is less clean. In some examples, less clean energy can be created from non-renewable sources, energy created from unnatural sources, energy created from processes that are not replenished (e.g., coal, natural gas, oil, and/or nuclear) and/or energy created from emission sources).

As illustrated in FIG. 6D, control region 636 includes bedroom television control 636*a*, kitchen speaker control 636*b*, and smart lock control 636*c*. In some examples, computer system 600 displays selectable controls that correspond to the bedroom television in response to detecting an input that corresponds to selection of bedroom television control 636*a*. In some examples, computer system 600 displays selectable controls that correspond to the kitchen speaker in response to detecting an input that corresponds to selection of kitchen speaker control 636*b*. In some examples, computer system 600 displays selectable controls pertaining to the smart lock in response to detecting an input that corresponds to selection of smart lock control 636*c*. At FIG. 6D, computer system 600 detects tap input 605*d* directed to (e.g., corresponding to the selection of) energy forecast menu control 632*c*.

Figures 6E, 6F:
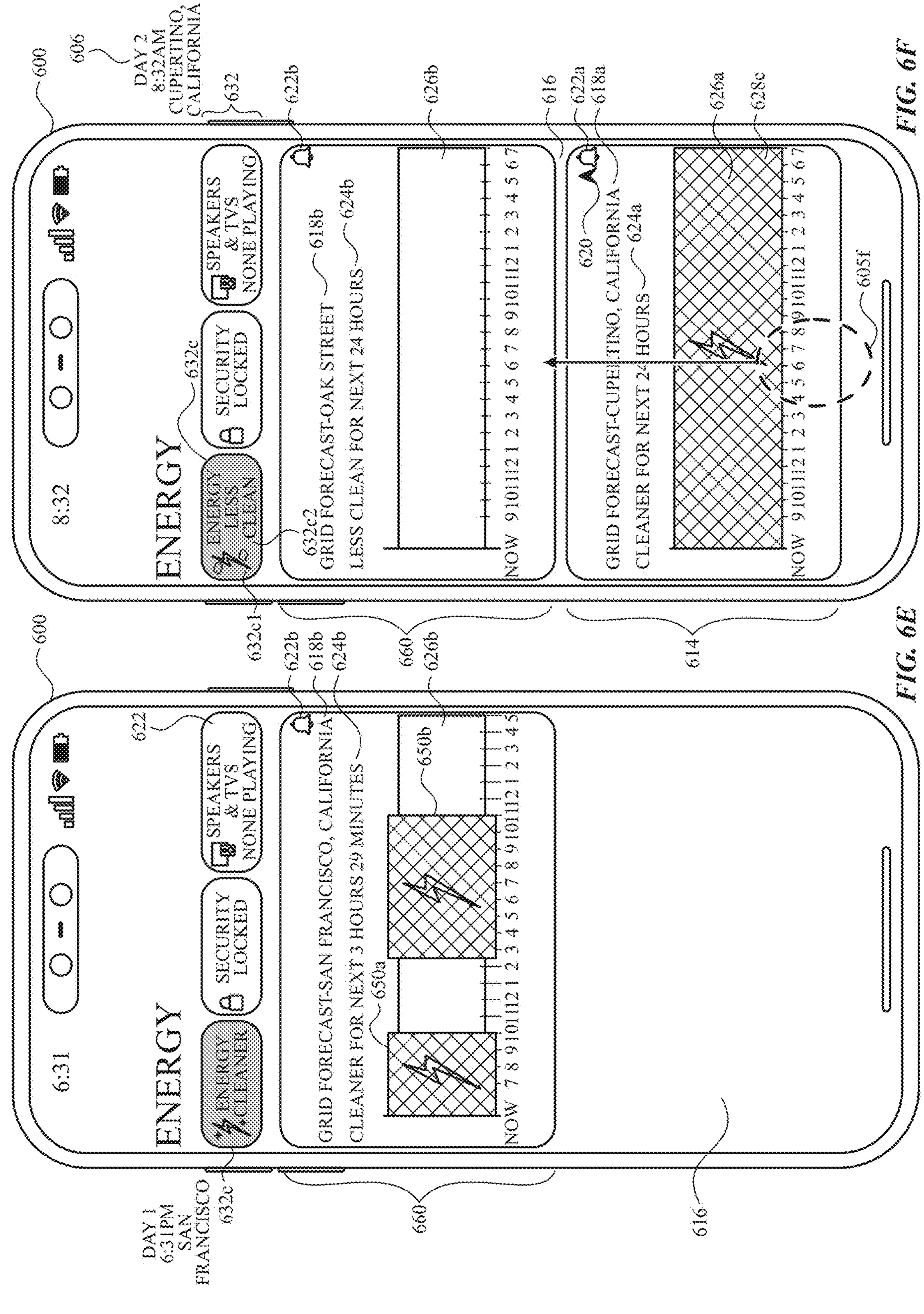
Figure 6H:
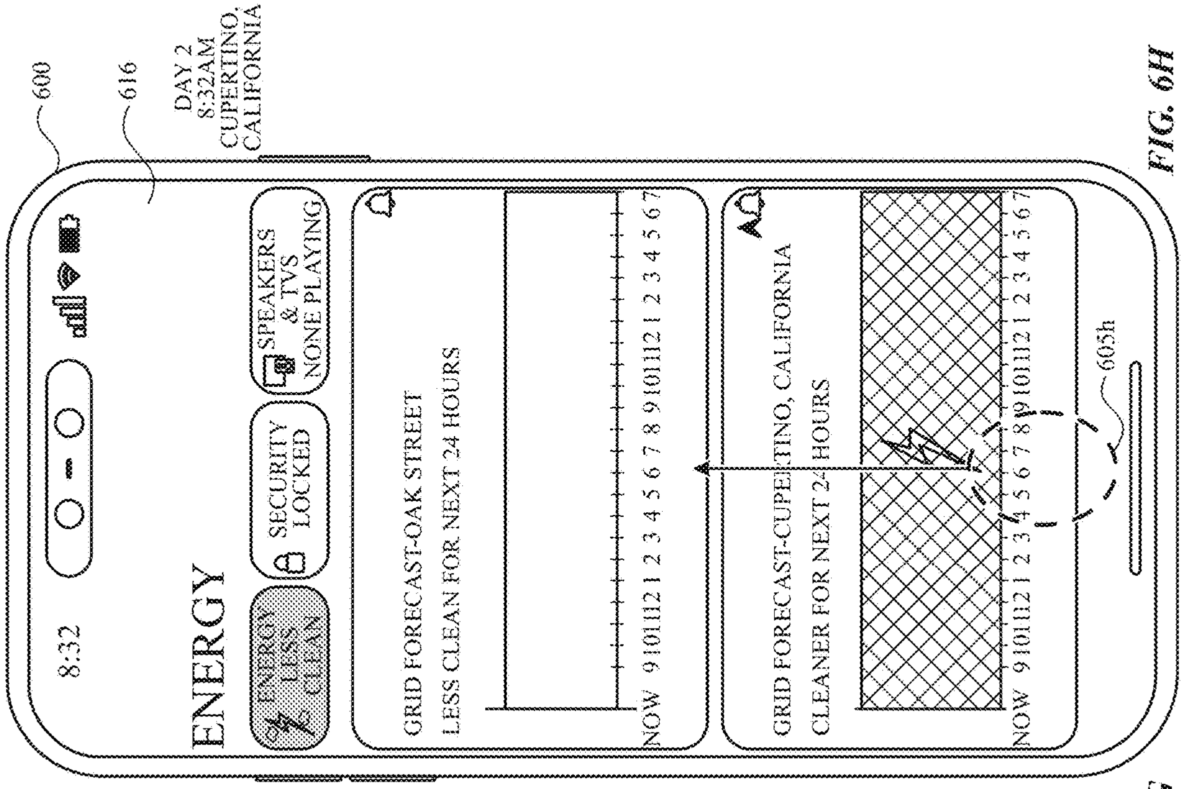

As illustrated in FIG. 6E, in response to detecting tap input 605*d*, computer system 600 displays energy forecast user interface 616. At FIG. 6E, a determination is made that computer system 600 is positioned at the primary location of computer system 600 (e.g., "Oak Street"). In some examples, because a determination is made that computer system 600 is positioned at the primary location of computer system 600, energy forecast user interface 616 includes primary location energy forecast platter 660. At FIG. 6E, computer system 600 does not display current location energy forecast platter 614 within energy forecast user interface 616 (e.g., computer system 600 does not display current location energy forecast platter 614 when computer system 600 is positioned at the selected primary location).

Further, as illustrated in FIG. 6E, in response to detecting tap input 605*d*, computer system 600 fills in the appearance of energy forecast menu control 632*c*. That is, computer system 600 displays energy forecast menu control 632*c* with an unfilled appearance while energy forecast menu control 632*c* is unselected (e.g., as shown in FIG. 6D) and computer system 600 displays energy forecast menu control 632*c* with a filled in appearance while energy forecast menu control 632*c* is selected.

As illustrated in FIG. 6E, primary location energy forecast platter 660 includes energy forecast grid location indicator 618*b*, notification control 622*b*, energy forecast window indicator 624*b*, energy forecast user interface object 626*b*, clean energy period indicator 650*a*, and clean energy period indicator 650*b*. As illustrated in FIG. 6E, energy forecast grid location indicator 618*b* indicates that the electrical grid that corresponds to primary location energy forecast platter 660 is positioned at "San Francisco, California." Further, at FIG. 6E, energy forecast window indicator 624*b* indicates that the electrical grid for the primary location of computer system 600 will output clean energy for the next three hours and twenty-nine minutes.

As illustrated in FIG. 6E, because the electrical grid for the primary location of computer system 600 is outputting clean energy for the next three hours and twenty-nine minutes, computer system 600 displays clean energy period indicator 650*a* over and/or as part of a portion of energy forecast user interface object 626*b* that corresponds to the next three hours and twenty-nine minutes. Further, at FIG. 6E, a determination is made that the electrical grid for the primary location of computer system 600 will output clean energy between 2:30 AM and 11:00 AM. As illustrated in FIG. 6E, because a determination is made that the electrical grid for the primary location of computer system 600 will output clean energy between 2:30 AM and 11:00 AM, computer system 600 displays clean energy period indicator 650*b* over a portion of energy forecast user interface object 626*b* that corresponds to an eight and one half hour time period that starts at 2:30 AM and ends at 11:00 AM.

At FIG. 6F, as indicated by energy forecast schematic 606, the current time is 8:32 AM on the second day and computer system 600 is positioned at Cupertino, California. Accordingly, a day has elapsed between FIGS. 6E and 6F and computer system 600 is repositioned from San, Francisco, California, to Cupertino, California.

As illustrated in FIG. 6F, computer system 600 displays energy forecast user interface 616. At FIG. 6F, a determination is made that computer system 600 is positioned at a location (e.g., Cupertino, California) that is not the selected primary location of computer system 600. As illustrated in FIG. 6F, because a determination is made that computer system 600 is positioned at a location that is not the selected primary location of computer system 600, computer system 600 displays energy forecast user interface 616 with both primary location energy forecast platter 660 and current location energy forecast platter 614. That is, while computer system 600 is assigned to a primary location, computer system 600 concurrently displays both primary location energy forecast platter 660 and current location energy forecast platter 614 within energy forecast user interface 616 while computer system 600 is positioned at a location that is not the primary location of computer system 600. As illustrated in FIG. 6F, computer system 600 displays primary location energy forecast platter 660 above current location energy forecast platter 614. It should be recognized that computer system 600 can display primary location energy forecast platter 660 in a different order, such as below current location energy forecast platter 614.

At FIG. 6F, primary location energy forecast platter 660 corresponds to the energy output of the electrical grid at the primary location (e.g., Oak Street) of computer system 600 for the second day and current location energy forecast platter 614 corresponds to the energy output of the electrical grid at the current location of computer system 600 (e.g., Cupertino, California) for the second day. More specifically, primary location energy forecast platter 660 and current location energy forecast platter 614 correspond to different energy grids over the same time period. In some examples, different locations have different clean energy output threshold amounts in order for computer system 600 to display a clean energy indicator. For example, in some examples, computer system 600 displays a clean energy indicator within an energy forecast for a first respective location (e.g., Cupertino, California) when a respective electrical grid at the first respective location outputs a first amount of clean energy (e.g., 1-1000 GW) and computer system 600 does not display a clean energy indicator within an energy forecast for a second respective city (e.g., San Francisco, California) when a respective electrical grid for the second respective location outputs the first amount of clean energy. In some examples, computer system 600 displays two energy forecast platters if the current location of the computer system 600 is different from the primary location of computer system 600 but within the same geographic boundary (e.g., same state, same city, same town, and/or same country).

As illustrated in FIG. 6F, computer system 600 displays energy forecast grid location indicator 618*b* as "Oak Street." "Oak Street" is the name that has been assigned (e.g., by a user, by computer system 600, and/or an external computer system) to the primary location of computer system 600. In some examples, computer system 600 displays the geographic name (e.g., San Francisco, California) of the primary location of computer system 600 when a determination is made that computer system 600 is not at the primary location of computer system 600, and computer system 600 displays energy forecast grid location indicator 618*b* with the assigned name of the primary location when a determination is made that computer system 600 is positioned at the primary location of computer system 600. In some examples, when computer system 600 is positioned within a geographic boundary (e.g., city, block, neighborhood, state, country) of the primary location but is not at the primary location (e.g., primary location is located at a specific address in San Francisco, California, but computer system 600 is located within San Francisco, California, at a position that is not the specific address) computer system 600 displays energy forecast grid location indicator 618*b* with an indication of both the assigned name of the primary location and the geographic name of the primary location.

At FIG. 6F, a determination is made that the electrical grid at the primary location of computer system 600 will not output clean energy for the next twenty-four hours. Because a determination is made that the electrical grid at the primary location of computer system 600 will not output clean energy for the next twenty-four hours, computer system 600 displays primary location energy forecast platter 660 without a respective clean energy period indicator. Further, because a determination is made that the electrical grid at the primary location of computer system 600 will not output clean energy for the next 24 hours, computer system 600 displays energy forecast window indicator 624*b* with an indication that the electrical grid at the primary location will not output clean energy for the next twenty-four hours.

As illustrated in FIG. 6F, accessory control region 632 includes energy forecast menu control 632*c*. While computer system 600 displays both current location energy forecast platter 614 and primary location energy forecast platter 660, computer system 600 displays energy forecast icon 632*c*1 and energy status indicator 632*c*2 with appearances that correspond to the status of the electrical grid positioned at the primary location of computer system 600. Accordingly, computer system 600 displays energy forecast icon 632*c*1 with an appearance of a lightning bolt with clouds, and computer system 600 displays energy status indicator 632*c*2 as "less clean," signifying that the current energy being output by the electrical grid at the primary location is less clean. It should be recognized that, in other examples, energy forecast icon 632*c*1 and energy status indicator 632*c*2 can correspond to a current location of computer system 600 instead of the primary location of computer system 600.

As illustrated in FIG. 6F, current location energy forecast platter 614 includes GPS position indicator 620 and clean energy period indicator 628*c*. Computer system 600 displays GPS position indicator 620 within current location energy forecast platter 614 and not within primary location energy forecast platter 660 to indicate that computer system 600 is positioned at (and/or using GPS to determine) the location that corresponds to current location energy forecast platter 614.

At FIG. 6F, a determination is made that the electrical grid that corresponds to the current location of computer system 600 will output clean energy for the next twenty-four hours. Because a determination is made that the electrical grid that corresponds to the current location of computer system 600 will output clean energy for the next twenty-four hours, computer system 600 displays clean energy period indicator 628*c* with a size that covers the entirety of energy forecast user interface object 626*a*. Further, at FIG. 6F, computer system 600 displays energy forecast window indicator 624*a* with an indication that the electrical grid at the current location of computer system will output clean energy for the next twenty-four hours. At FIG. 6F, computer system 600 detects swipe input 605*f*.

Figure 6G:
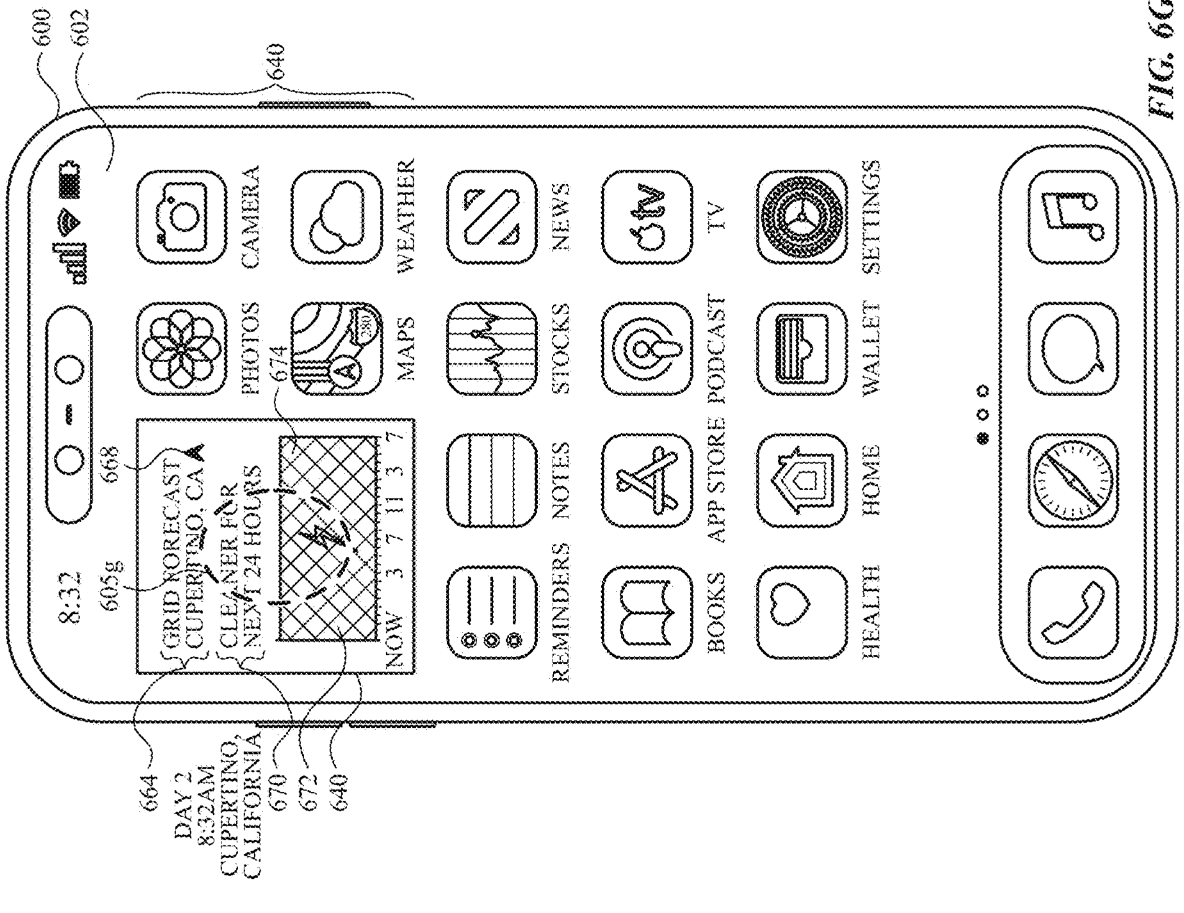

As illustrated in FIG. 6G, in response to detecting swipe input 605*f*, computer system 600 displays home page 602. Between FIGS. 6C and 6G, home page 602 is reconfigured such that home page 602 includes energy forecast widget 640. Accordingly, as illustrated in FIG. 6G, computer system 600 displays home page 602 with energy forecast widget 640. In some examples, energy forecast widget 640 is a reduced size representation of a targeted energy forecast (e.g., current location energy forecast platter 614 or primary location energy forecast platter 660). As illustrated in FIG. 6G, computer system 600 displays GPS position indicator 668 within energy forecast widget 640. GPS position indicator 668 indicates that energy forecast widget 640 corresponds to the current location of computer system 600. Accordingly, energy forecast widget 640 corresponds to an electrical grid at the current location of computer system 600. In some examples, when computer system 600 is a personal computer (e.g., a laptop and/or a desktop), energy forecast widget 640 is a user interface object that is displayed on a home screen of computer system 600.

As illustrated in FIG. 6G, energy forecast widget 640 includes energy forecast grid location indicator 664, energy forecast window indicator 670, clean energy period indicator 672, and energy forecast user interface object 674. Computer system 600 displays energy forecast grid location indicator 664 with an indication of the location of the electrical grid that corresponds to energy forecast widget 640 (e.g., Cupertino, California). Computer system 600 displays energy forecast window indicator 670 with an indication regarding the amount of time remaining in a current clean energy period indicator and/or the time remaining until the next clean energy period for the electrical grid at the current position of computer system 600.

At FIG. 6G, energy forecast user interface object 674 corresponds to a twenty-four-hour time period. As illustrated in FIG. 6G, because a determination is made that the electrical grid at the current location of computer system 600 will output clean energy for the next twenty-four hours (e.g., as discussed above with respect to FIG. 6F), computer system 600 displays clean energy period indicator 672 such that clean energy period indicator 672 covers all of energy forecast user interface object 674. At FIG. 6G, computer system 600 detects tap input 605*g* directed to (e.g., corresponding to the selection of) energy forecast widget 640.

As illustrated in FIG. 6H, in response to detecting tap input 605*g*, computer system 600 displays energy forecast user interface 616 (e.g., and not home user interface 612). Accordingly, energy forecast widget 640 is selectable to navigate directly to energy forecast user interface 616. At FIG. 6H, computer system 600 detects swipe input 605*h*.

Figure 6I:
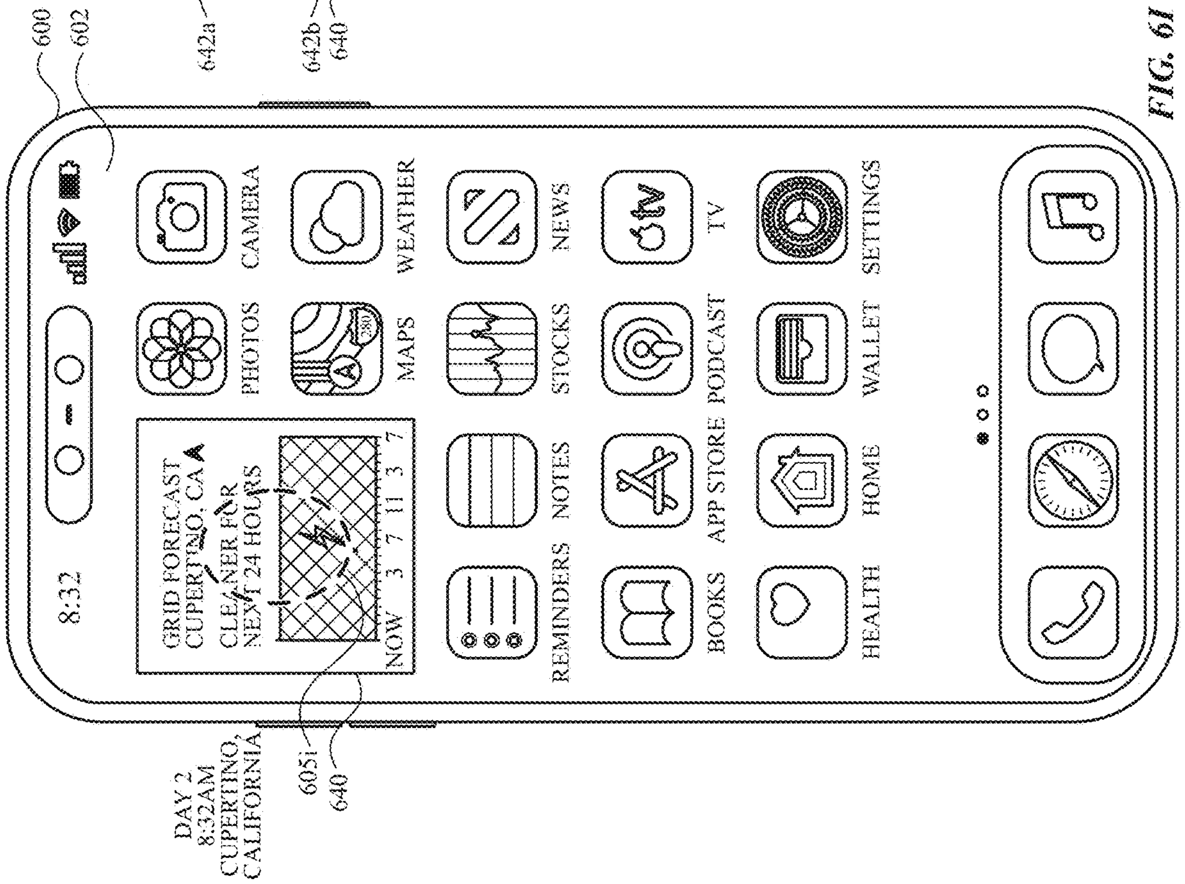

As illustrated in FIG. 6I, in response to detecting swipe input 605*h*, computer system 600 displays home page 602. As illustrated in FIG. 6I, home page 602 includes energy forecast widget 640. At FIG. 6I, energy forecast widget 640 corresponds to an electrical grid at the current location of computer system 600 (e.g., Cupertino, California). At FIG. 6I, computer system 600 detects tap and hold input 605*i* directed to (e.g., corresponding to the selection of) energy forecast widget 640.

Figure 6J:
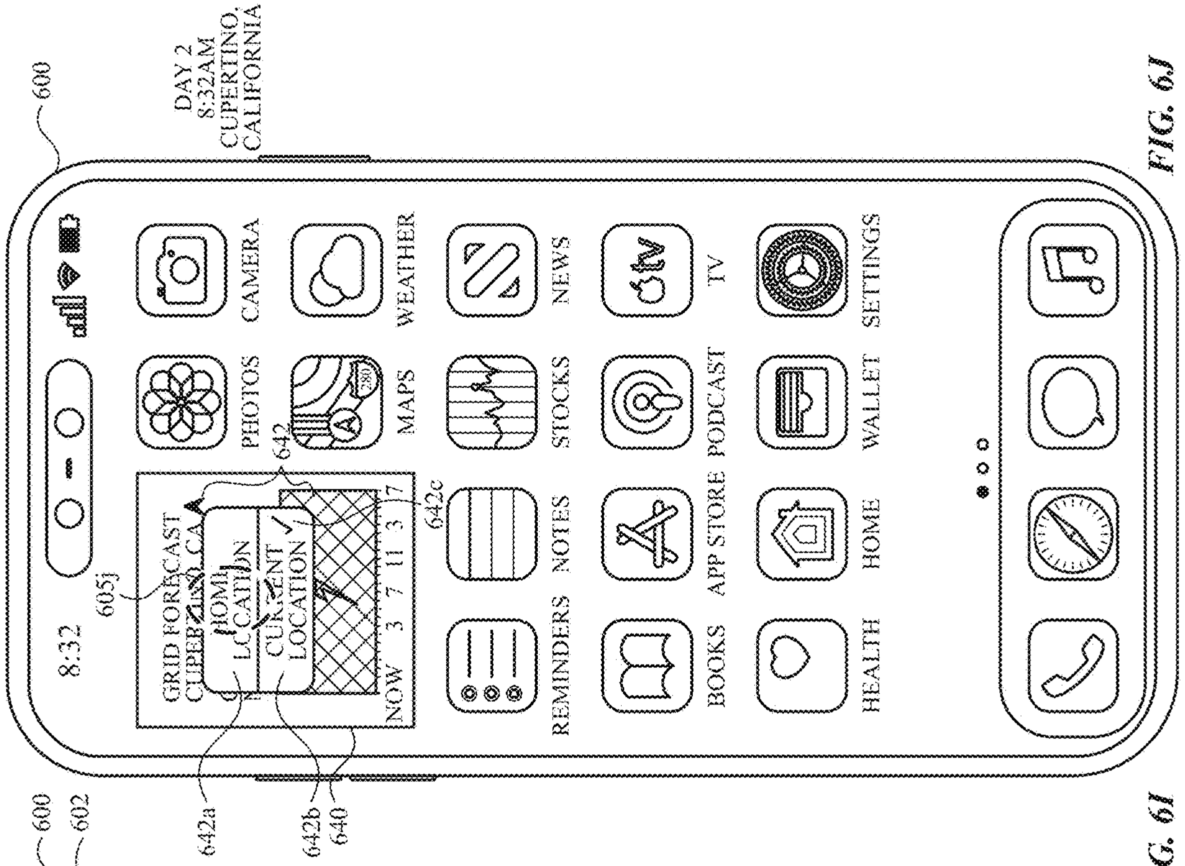
Figure 6L:
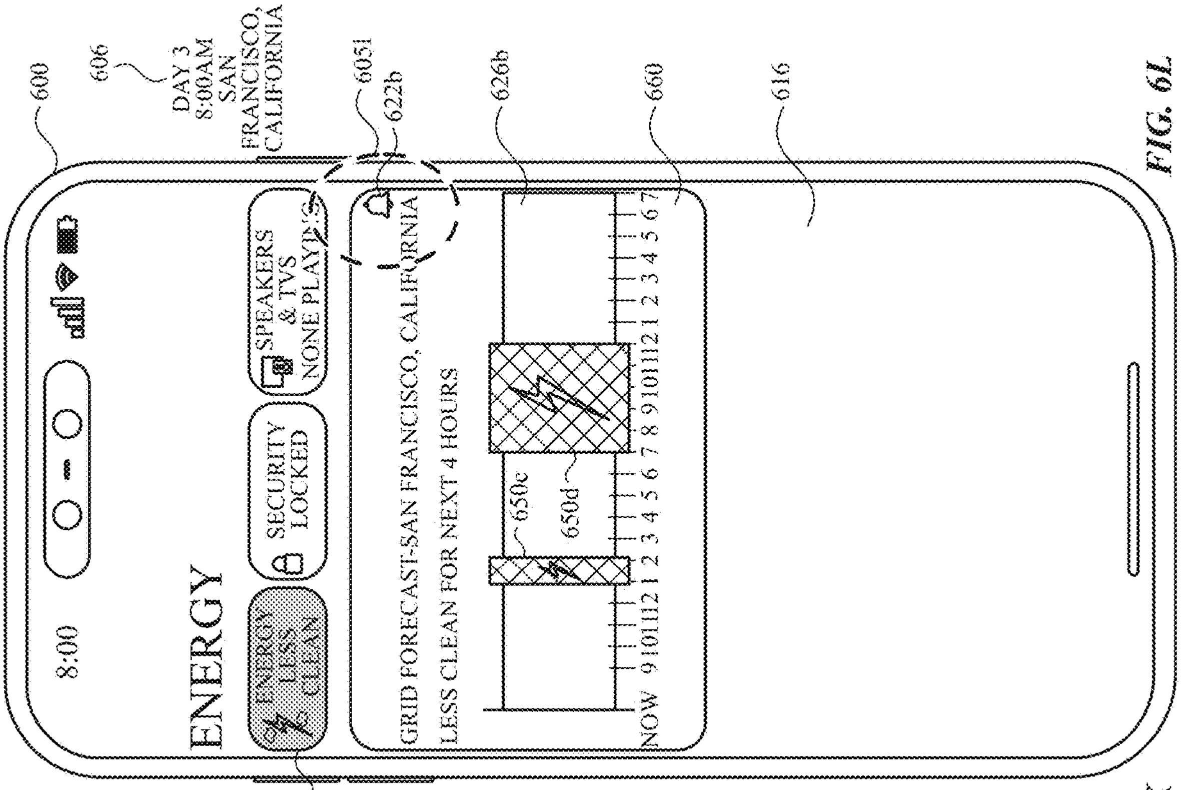

As illustrated in FIG. 6J, in response to detecting tap and hold input 605*i*, computer system 600 displays location selection user interface 642 as overlaid on energy forecast widget 640. As illustrated in FIG. 6J, location selection user interface 642 includes primary location control 642*a*, current location control 642*b*, and selected location indicator 642*c*. It should be recognized that location selection user interface 642 can include more, fewer, and/or different user interface elements than illustrated in FIG. 6J and/or, in some examples, can require one or more inputs after detecting tap and hold input 605*i* to display primary location control 642*a*, current location control 642*b*, and selected location indicator 642*c*. As illustrated in FIG. 6J, computer system 600 displays selected location indicator 642*c* in the shape of a check mark. As illustrated in FIG. 6J, computer system 600 displays selected location indicator 642*c* within current location control 642*b* to indicate that energy forecast widget 640 corresponds to the current location of computer system 600. At FIG. 6J, computer system 600 detects tap input 605*j* directed to (e.g., corresponding to the selection of) primary location control 642*a*.

Figure 6K:
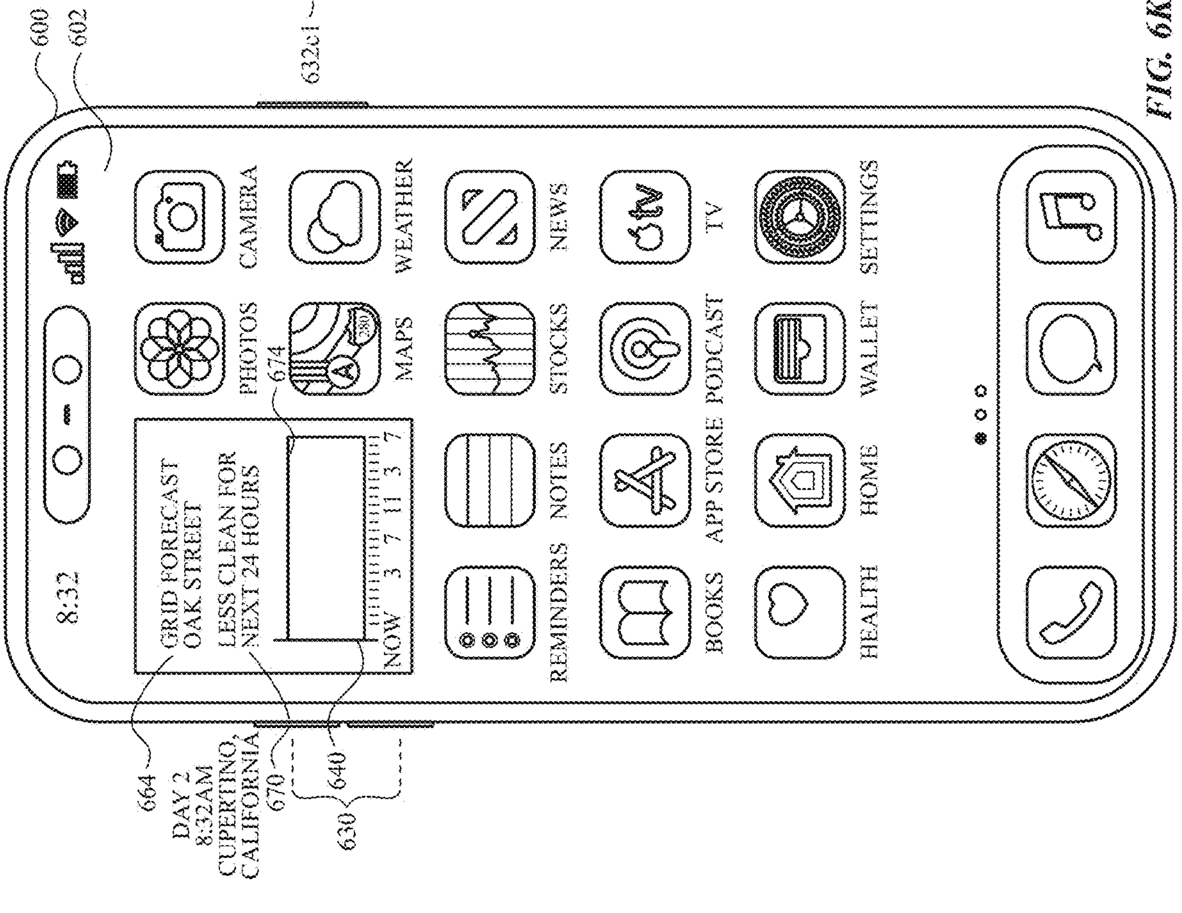

At FIG. 6K, in response to detecting tap input 605*j*, computer system 600 updates energy forecast widget 640 such that energy forecast widget 640 corresponds to the selected primary location of computer system 600 (e.g., "Oak Street"). Accordingly, as illustrated in FIG. 6K, computer system 600 displays energy forecast grid location indicator 664 with an indication of the primary location of computer system 600. Further, computer system 600 displays energy forecast window indicator 670 with an indication regarding how long the electrical grid at the primary location will output less clean energy for. As illustrated in FIG. 6K, because a determination is made that the electrical grid at the primary location will not output clean energy for the next twenty-four hours (e.g., as discussed above with respect to FIG. 6F), computer system 600 does not display a respective clean energy period as overlaid on energy forecast user interface object 674.

At FIG. 6L, as indicated by energy forecast schematic 606, the current time is 8:00 AM on the third day and computer system 600 is positioned at San Francisco, California. Accordingly, a day has elapsed between FIGS. 6K and 6L and computer system 600 is repositioned from Cupertino, California, to San Francisco, California, between FIGS. 6K and 6L.

As illustrated in FIG. 6L, computer system 600 displays energy forecast user interface 616. At FIG. 6L, because computer system 600 is positioned at the primary location, energy forecast user interface 616 includes primary location energy forecast platter 660 and does not include current location energy forecast platter 614. At FIG. 6L, computer system 600 displays primary location energy forecast platter 660 based on the energy output of the electrical grid at the primary location (e.g., Oak Street) on the third day (e.g., September 7th).

As illustrated in FIG. 6L, clean energy period indicator 650*c* spans across a portion of energy forecast user interface object 626*b* that corresponds to a one-hour time period that starts at 1:00 PM and ends at 2:00 PM. Further, as illustrated in FIG. 6L, clean energy period indicator 650*d* spans across a portion of energy forecast user interface object 626*b* that corresponds to a five-hour time period that starts at 7:00 μm and ends at 12:00 am. Accordingly, at FIG. 6L, the electrical grid at the primary location of computer system 600 will output clean energy between the hours of 1:00 PM and 2:00 PM and between the hours of 7:00 PM and 12:00 AM. As illustrated in FIG. 6L, computer system 600 displays energy forecast icon 632*c*1 with an appearance that includes a lightning bolt with clouds. The appearance of energy forecast icon 632*c*1 signifies that the current energy being output by the electrical grid at the primary location of computer system 600 is less clean. At FIG. 6L, computer system 600 detects tap input 605*l* at (e.g., corresponding to the selection of) notification control 622*b*.

Figure 6M:
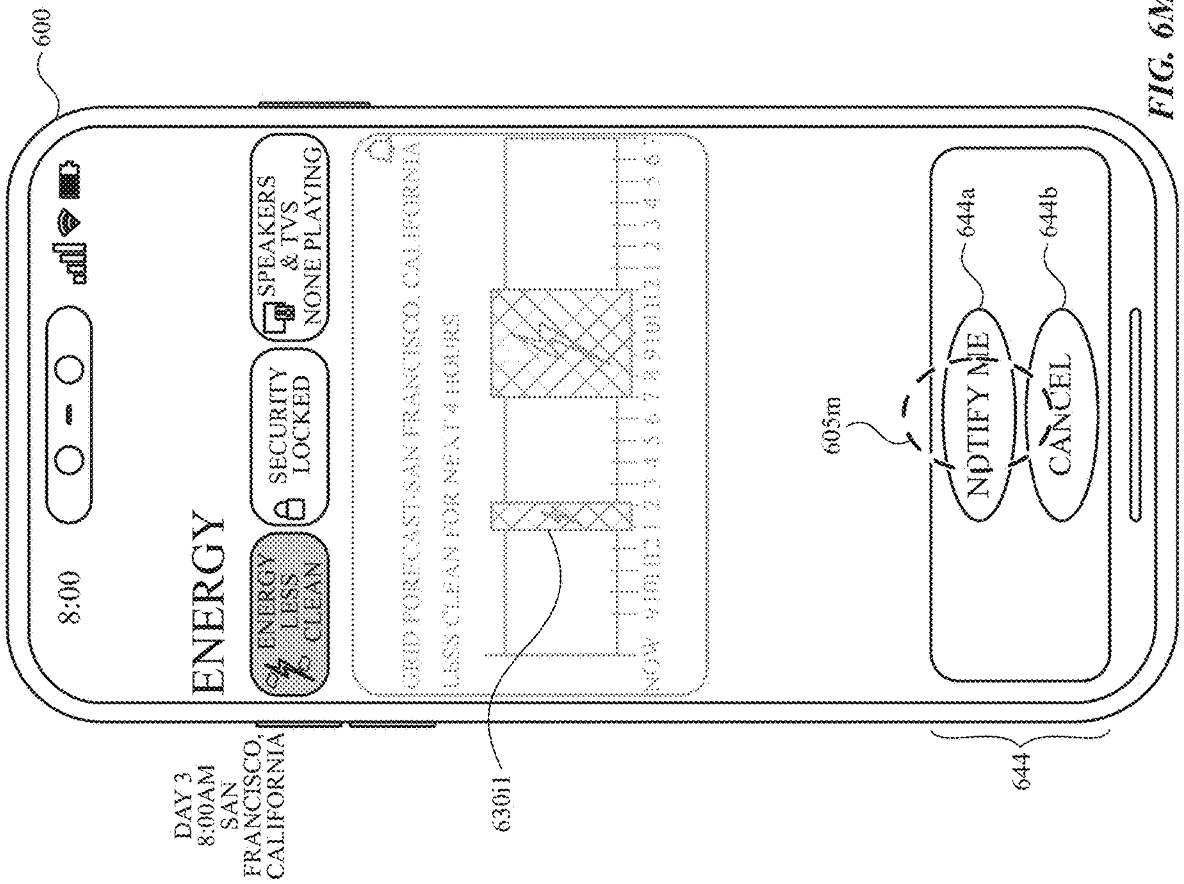

As illustrated in FIG. 6M, in response to detecting tap input 605*l*, computer system 600 displays one-time notification set-up user interface 644. One-time notification set-up user interface 644 includes set up control 644*a* and cancel control 644*b*. In some examples, in response to detecting an input that corresponds to selection of cancel control 644*b*, computer system 600 ceases the display of one-time notification set-up user interface 644 without configuring itself to output a notification indicating the start of the next clean energy period for the electrical grid at the primary location of computer system 600. At FIG. 6M, computer system 600 detects tap input 605*m* directed to (e.g., corresponding to the selection of) one-time notification set up control 644*a*.

Figure 6N:
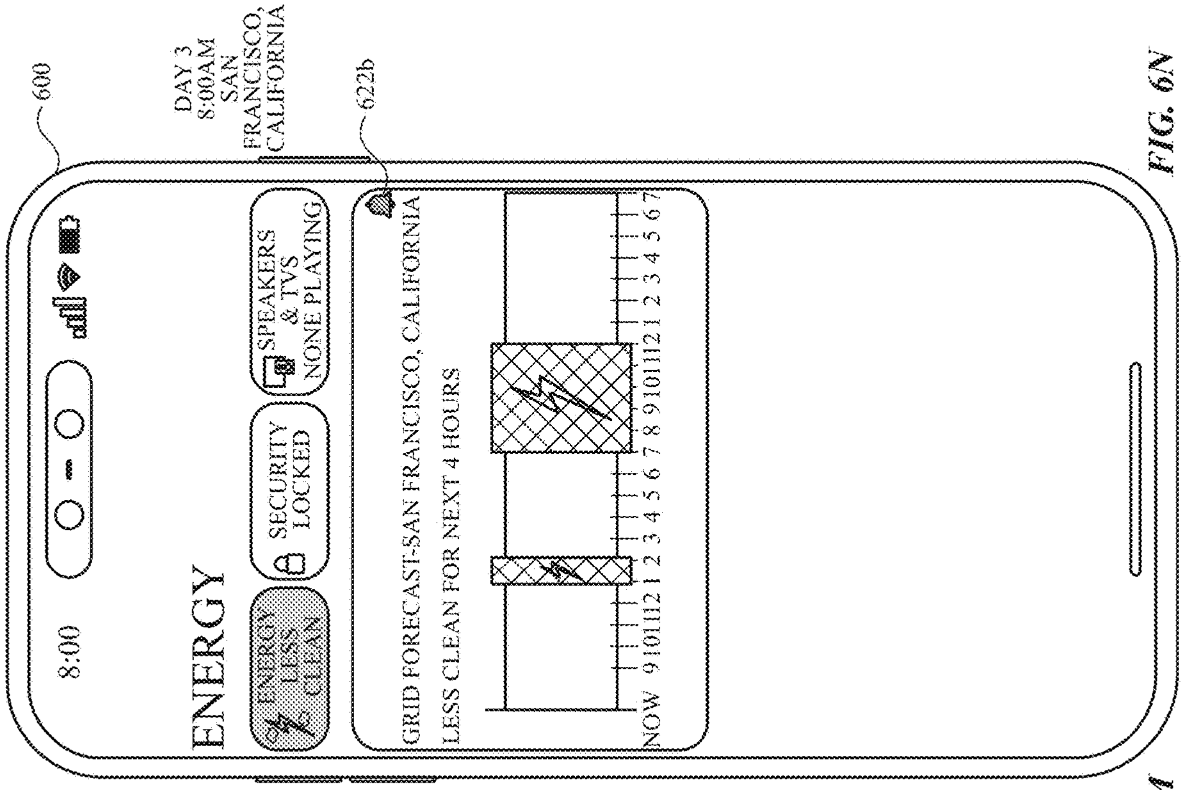
Figure 6P:
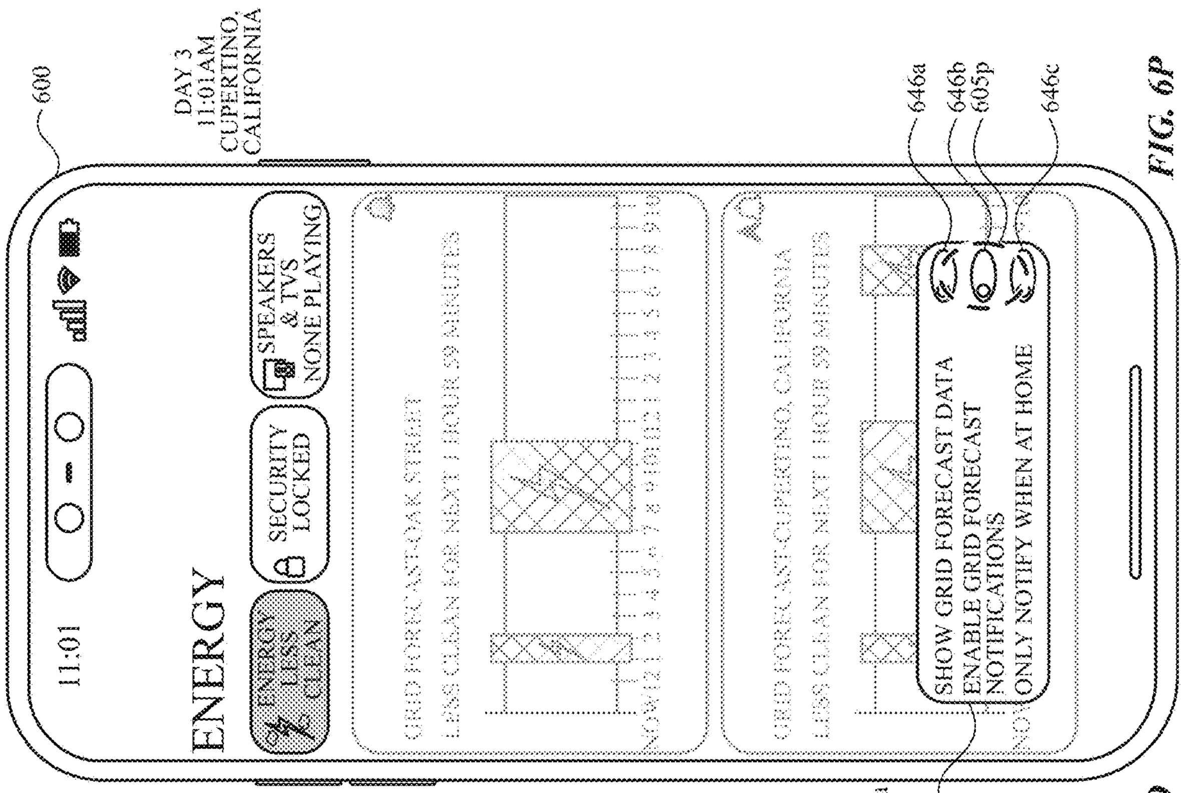

At FIG. 6N, in response to detecting tap input 605*m*, computer system 600 configures itself to output a one-time notification indicating the beginning of the next clean energy period for the electrical grid positioned at the primary location of computer system 600. Further, in response to detecting tap input 605*m*, computer system 600 ceases to display one-time notification set-up user interface 644. At FIG. 6N, because computer system 600 is configured to output a one-time notification, computer system 600 fills in the appearance of notification control 622*b* within primary location energy forecast platter 660. That is, computer system 600 does not display notification control 622*b* with the filled in the appearance while computer system 600 is not configured to output the one-time notification and computer system 600 displays notification control 622*b* with a filled in appearance while computer system 600 is configured to output the one-time notification. It should be recognized that, in some examples, detecting tap input 605*l* does not cause one-time notification set-up user interface 644 to be displayed and instead computer system 600 configures itself to output the one-time notification (and/or fills in the appearance of notification control 622*b* within primary location energy forecast platter 660) in response to detecting tap input 605*l*.

Figure 6O:
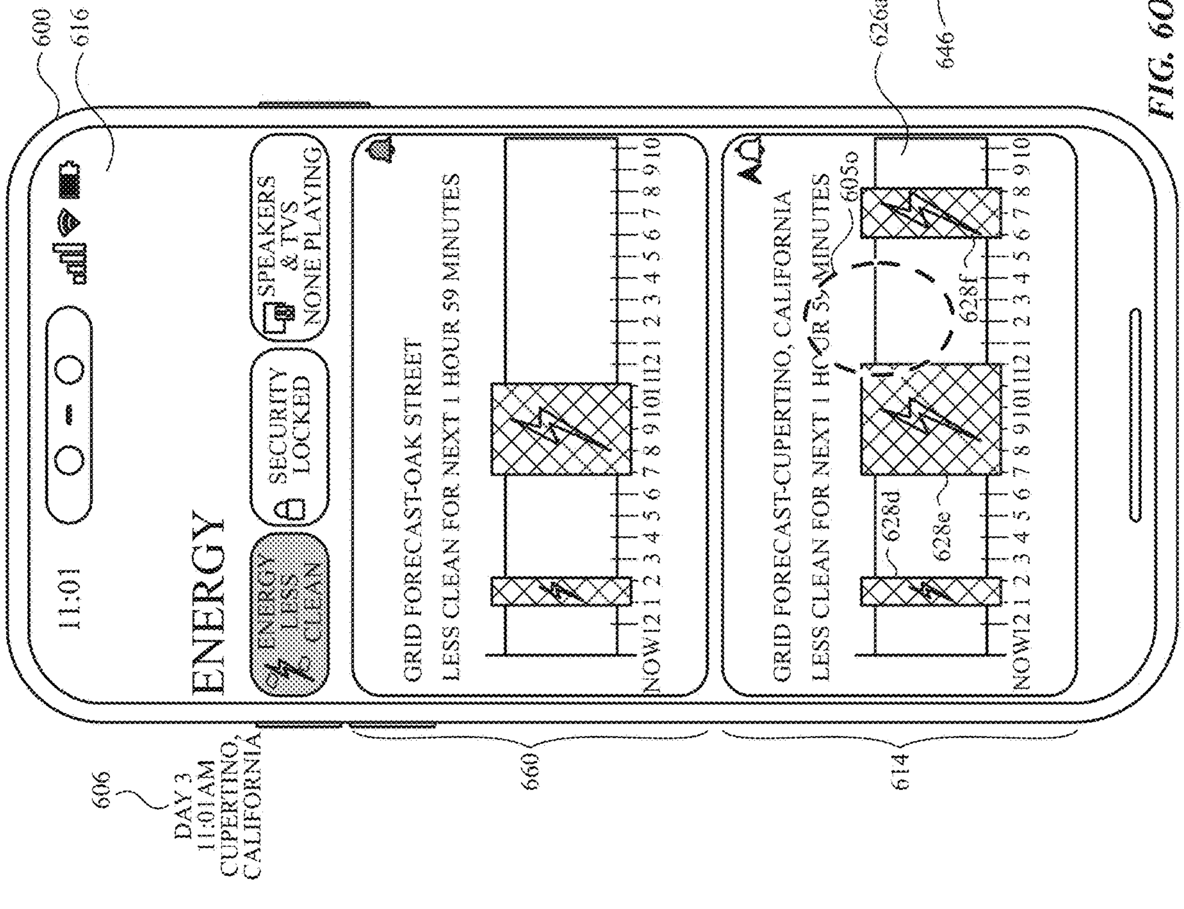
Figure 6R:
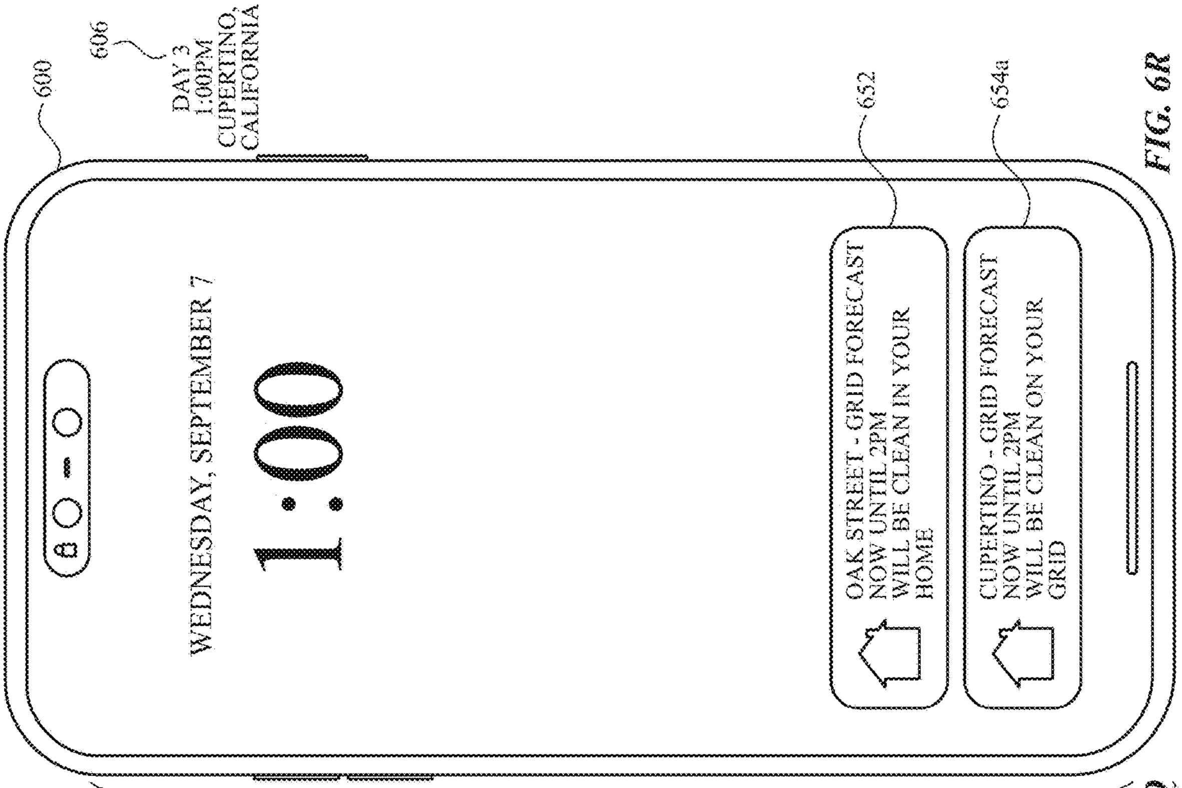

Between FIGS. 6N and 6O, three hours and one minute have elapsed and computer system 600 transitions from being positioned in San Francisco, California to being positioned in Cupertino, California.

At FIG. 6O, energy forecast schematic 606 indicates that the current time is 11:01 AM on the third day and computer system 600 is positioned in Cupertino, California. As illustrated in FIG. 6O, because computer system 600 is positioned at a location that is not the primary location of computer system 600, computer system 600 displays both current location energy forecast platter 614 and primary location energy forecast platter 660 within energy forecast user interface 616.

As illustrated in FIG. 6O, clean energy period indicator 628*d* spans across a portion of energy forecast user interface object 626*a* that corresponds to a one-hour time period that starts at 1:00 PM and ends at 2:00 PM. Clean energy period indicator 628*e* spans across a portion of energy forecast user interface object 626*a* that corresponds to a five-hour time period that starts at 7:00 PM and ends at 12:00 AM. Clean energy indicator 628*f* spans around a portion of energy forecast user interface object 626*a* that corresponds to a two-hour time period that starts at 6:00 AM and ends at 8:00 AM Accordingly, the electrical grid at the current location of computer system 600 will output clean energy between the hours of 1:00 PM and 2:00 PM, between the hours of 7:00 PM and 12:00 AM, and between the hours of 6:00 AM and 8:00 AM. At FIG. 6O, computer system 600 detects tap input 605*o* directed to (e.g., corresponding to the selection of) current location energy forecast platter 614.

As illustrated in FIG. 6P, in response to detecting tap input 605*o*, computer system 600 displays notification user interface 646. Notification user interface 646 includes show grid forecast data control 646*a*, grid forecast notifications control 646*b*, and home control 646*c*. In some examples, computer system 600 displays grid forecast data for the electrical grid at the current location of computer system 600 in response to detecting an input that corresponds to an activation of show grid forecast data control 646*a*. In some examples, in response to detecting an input that corresponds to activation of home control 646*c*, computer system 600 configures itself to output energy forecast notifications indicating the beginning of clean energy time periods for the electrical grid at the current location of computer system 600 only while computer system 600 is positioned at the primary location. At FIG. 6P, computer system 600 detects tap input 605*p* directed to (e.g., corresponding to the selection of) grid forecast notifications control 646*b*.

Figure 6Q:
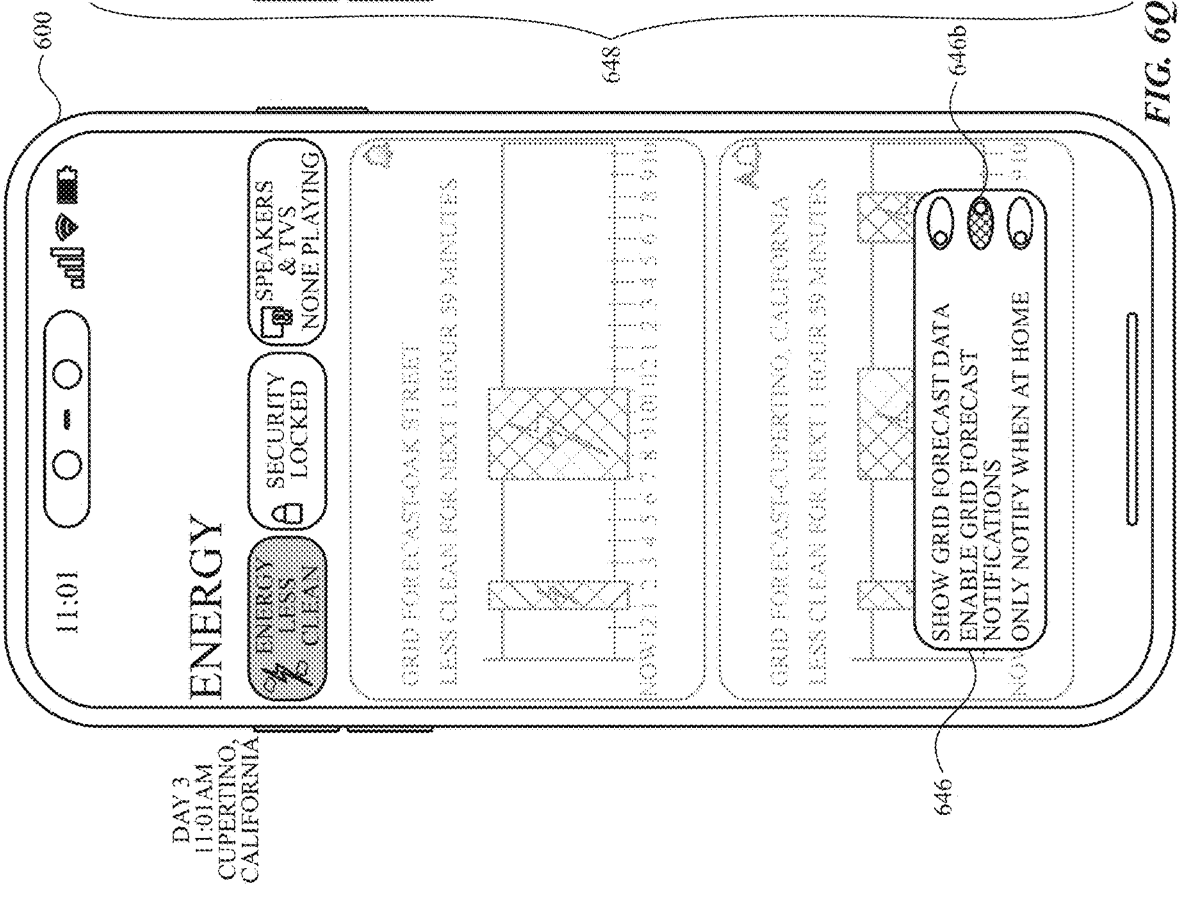

At FIG. 6Q, in response to detecting tap input 605*p*, computer system 600 configures itself to output a notification each time the electrical grid positioned at the current location of computer system 600 begins a clean energy period. Additionally, in response to detecting tap input 605*p*, computer system 600 displays grid forecast notifications control 646*b* as "active," indicating that continuous notifications have been set up for the electrical grid at the current location of computer system 600. In some examples, in response to detecting an input directed at grid forecast notifications control 646*b*, computer system 600 ceases to display notification user interface 646.

At FIG. 6R, as indicated by energy forecast schematic 606, the current time is 1:00 PM on the third day and computer system 600 is positioned in Cupertino, California. At FIG. 6R, computer system 600 displays lock screen user interface 648. Computer system 600 displays lock screen user interface 648 while computer system 600 is in a locked state (e.g., a state where the functionalities of computer system 600 are reduced). At FIG. 6R, a determination is made that the electrical grid for the current location of computer system 600 has begun a clean energy period while computer system 600 is configured to output a notification indicating the beginning of a clean energy period for the current location. As illustrated in FIG. 6R, because a determination is made that the electrical grid for the current location of computer system 600 has begun a clean energy period (e.g., while computer system 600 is configured to output the notification indicating the beginning of the clean energy period), computer system 600 displays continuous notification 654*a*. In some examples, computer system 600 displays energy forecast widget 640 within lock screen user interface 648.

Further, at FIG. 6R, a determination is made that the electrical grid for the primary location of computer system 600 has begun a clean energy period while computer system 600 is configured to output a notification indicating the beginning of a clean energy period for the electrical grid at the primary location. As illustrated in FIG. 6R, because a determination is made that the electrical grid for primary location of computer system 600 has begun a clean energy period (e.g., while computer system 600 is configured to output the notification indicating the beginning of the clean energy period for electrical grid at the primary location), computer system 600 displays one time notification 652.

As illustrated in FIG. 6R, both one time notification 652 and continuous notification 654*a* include an indication of a duration of how long each respective electrical grid will output clean energy. In some examples, one time notification 652 corresponds to the current location (e.g., Cupertino, California) of computer system 600. In some examples, continuous notification 654*a* corresponds to the primary location of computer system 600. In some examples, when a primary location has not been selected for computer system 600, and while grid forecast notifications control 646*b* is active, computer system 600 outputs a notification indicating the status of an electrical grid at the current location of computer system 600. In some examples, computer system 600 outputs a haptic and/or audio alert as part of displaying one time notification 652 and/or continuous notification 654*a*. In some examples, computer system 600 displays primary location energy forecast platter 660 and/or current location energy forecast platter 614 in response to detecting an input that corresponds to selection of one time notification 652 and/or continuous notification 654*a*. In some examples, computer system 600 only displays one time notification 652 while computer system 600 is positioned at the selected primary location of computer system 600. In some examples, computer system 600 does not display one time notification 652 if notification control 622*b* is deselected prior to the initiation of the clean energy period for the electrical grid at the primary location of computer system 600.

Figure 6S:
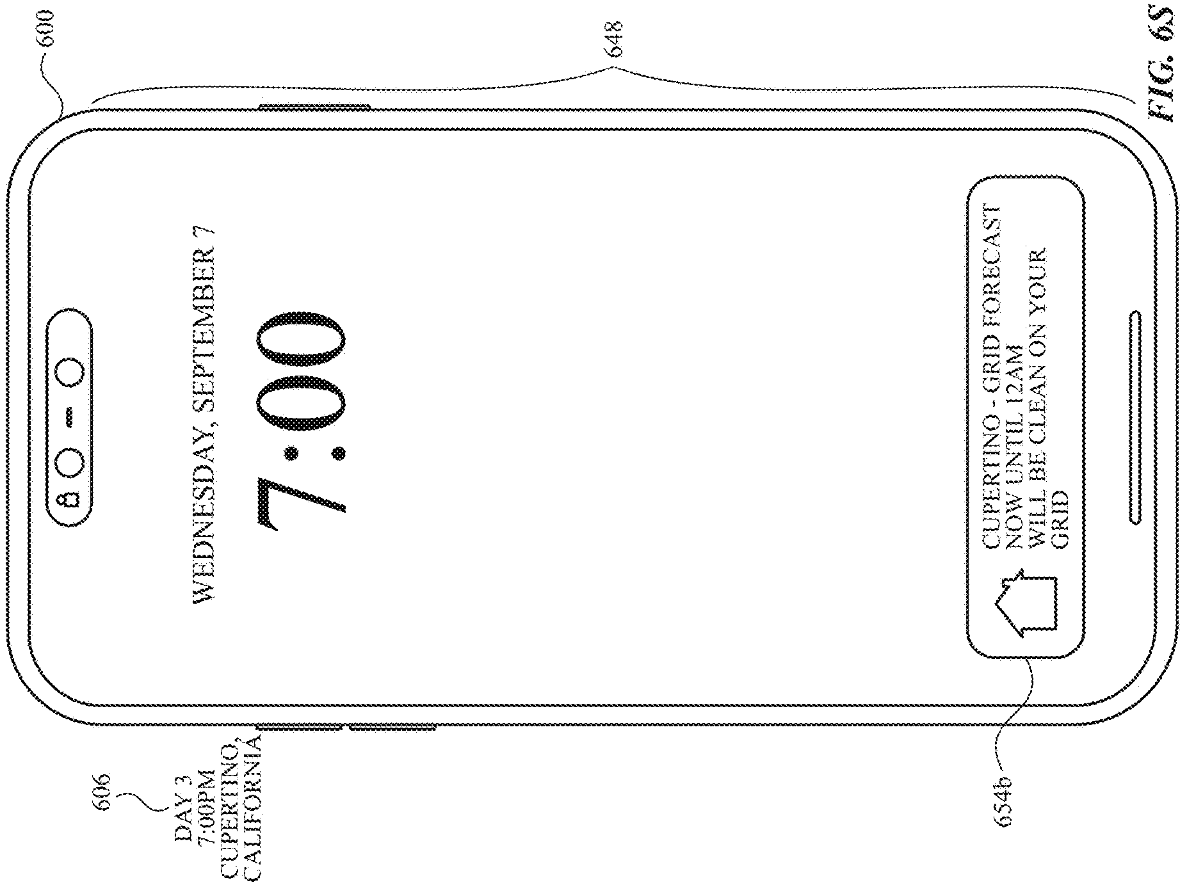

At FIG. 6S, as indicated by energy forecast schematic 606, the current time is 7:00 PM on the third day and computer system 600 is positioned in Cupertino, California. Accordingly, between FIGS. 6R and 6S, six hours have elapsed. As illustrated in FIG. 6S, computer system 600 displays lock screen user interface 648.

At FIG. 6S, a determination is made that the electrical grid for the current location of computer system 600 has begun a clean energy period while computer system 600 is configured to output a notification indicating the beginning of the clean energy period for the electrical grid at the current location of computer system 600. As illustrated in FIG. 6S, because a determination is made that the electrical grid for the current location of computer system 600 has begun a clean energy period (e.g., while computer system 600 is configured to output a notification indicating the beginning of the clean energy period for the electrical grid at the current location of computer system 600), computer system 600 displays continuous notification 654*b*. As illustrated in FIG. 6S, continuous notification 654*b* indicates that the electrical grid at the current location will output clean energy until 12:00 AM. In some examples, computer system 600 stops displaying continuous notifications indicating that the electrical grid at the current location has begun a clean energy period in accordance with a determination that grid forecast notifications control 646*b* is deselected.

Further, at FIG. 6S, a determination is made that the electrical grid for the primary location of computer system 600 has begun a clean energy period. However, at FIG. 6S, computer system 600 is not configured to output notifications indicating that the electrical grid at the primary location of computer system 600 begins a clean energy period. That is, one time notification 652 is a single time (e.g., single occurrence) notification. Computer system 600 is not configured to output additional notifications indicating the beginning of a new clean energy period for the electrical grid at the primary location after computer system 600 outputs one time notification 652.

Figure 6T:
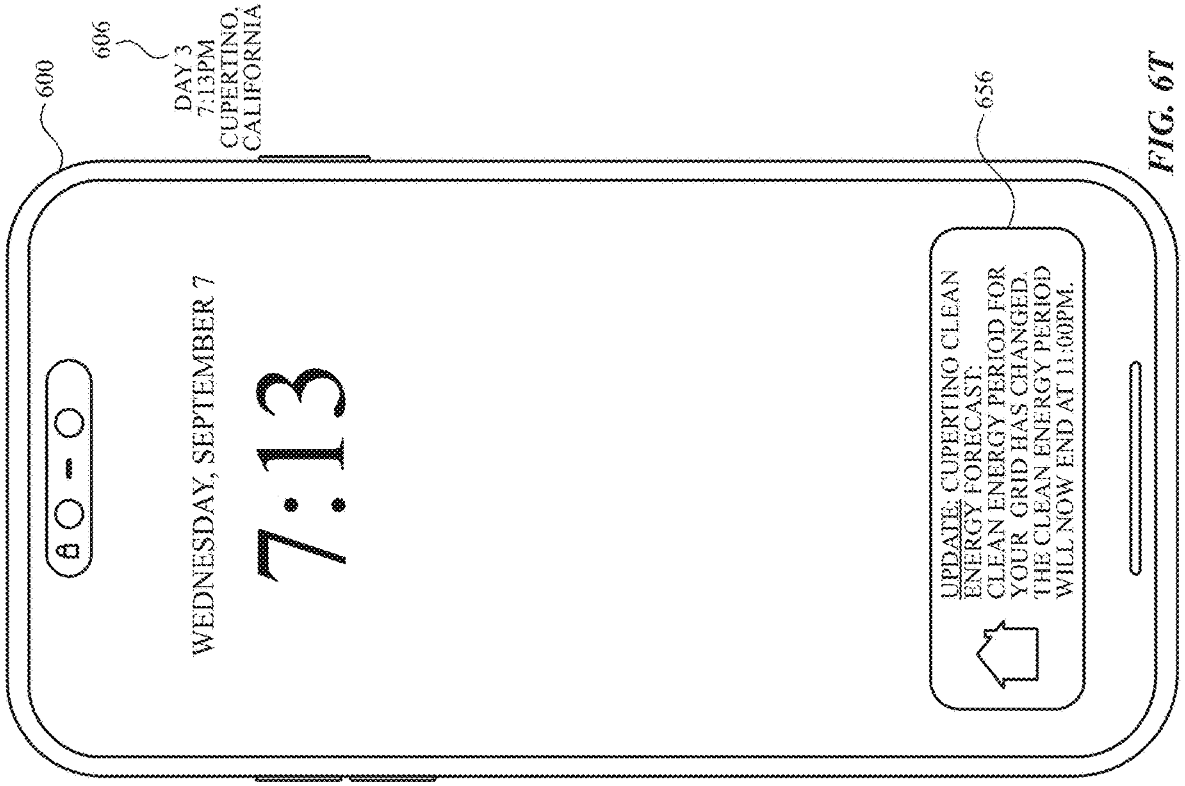

At FIG. 6T, as indicated by energy forecast schematic 606, the current time is 7:13 PM on the third day and computer system 600 is positioned in Cupertino, California. Accordingly, between FIGS. 6S and 6T, thirteen minutes have elapsed. At FIG. 6T, a determination is made that the duration of the clean energy period for the electrical grid at the current location of the computer system 600 is reduced by one hour. Because a determination is made that the duration of the clean energy period for the electrical grid at the current location of the computer system 600 is reduced by one hour, computer system 600 displays update notification 656. Computer system 600 displays update notification 656 to indicate that the duration of the clean energy period for the electrical grid at the current location of computer system 600 has changed. As illustrated in FIG. 6T, update notification 656 indicates that the electrical grid of the current location of computer system 600 will now stop outputting clean energy at 11:00 PM. In some examples, update notification 656 indicates that the duration of the clean energy time period for a respective energy grid has increased.

Figure 6U:
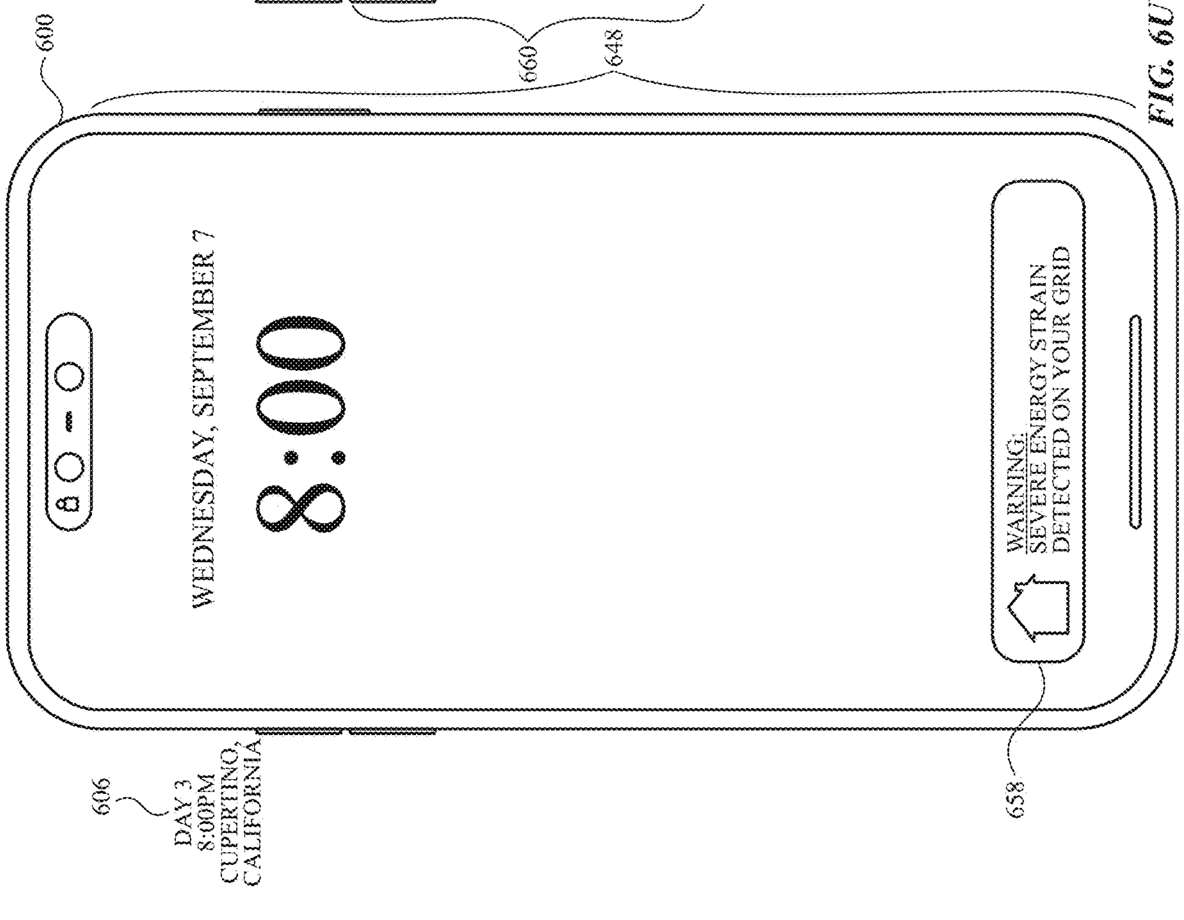

At FIG. 6U, as indicated by energy forecast schematic 606, the current time is 8:00 PM on the third day and computer system 600 remains positioned in Cupertino, California. Accordingly, between FIGS. 6T and 6U, forty-seven minutes have elapsed.

As illustrated in FIG. 6U, computer system 600 displays lock screen user interface 648. At FIG. 6U, a determination is made that there is severe energy strain (e.g., caused by extreme weather, increased energy demand, blackouts, and/or brownouts) on the electrical grid corresponding to the current location of computer system 600 (e.g., Cupertino, California). As illustrated in FIG. 6U, because a determination is made that there is severe energy strain on the electrical grid that corresponds to the current location of computer system 600, computer system 600 displays energy warning notification 658.

As illustrated in FIG. 6U, energy warning notification 658 includes an indication of the strain that is being placed on the electrical grid at the current location of computer system 600. In some examples, computer system 600 does not output energy warning notification 658 while a setting notification that corresponds to energy warning notification 658 is inactive. In some examples, computer system 600 concurrently displays a respective energy warning notification for an electrical grid at the current location of computer system 600 and a respective energy warning notification for an electrical grid at the primary location of computer system 600.

Figure 6V:
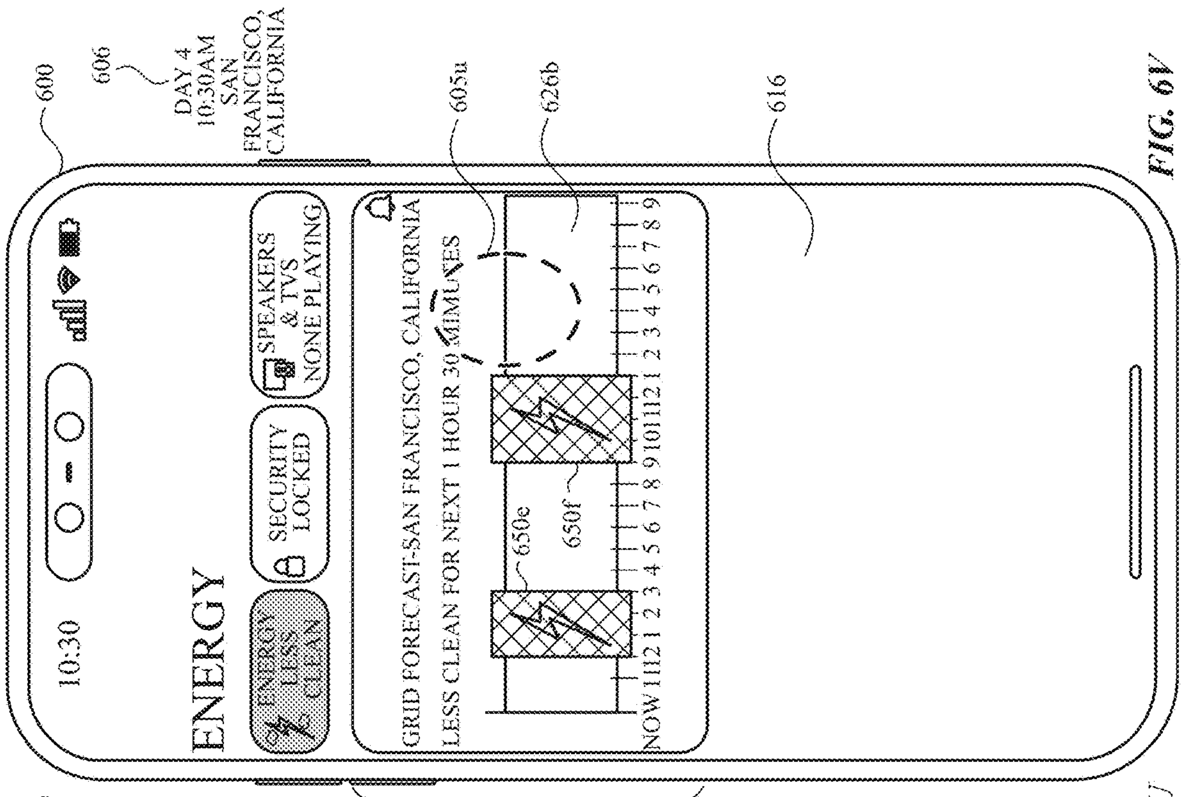
Figure 6X:
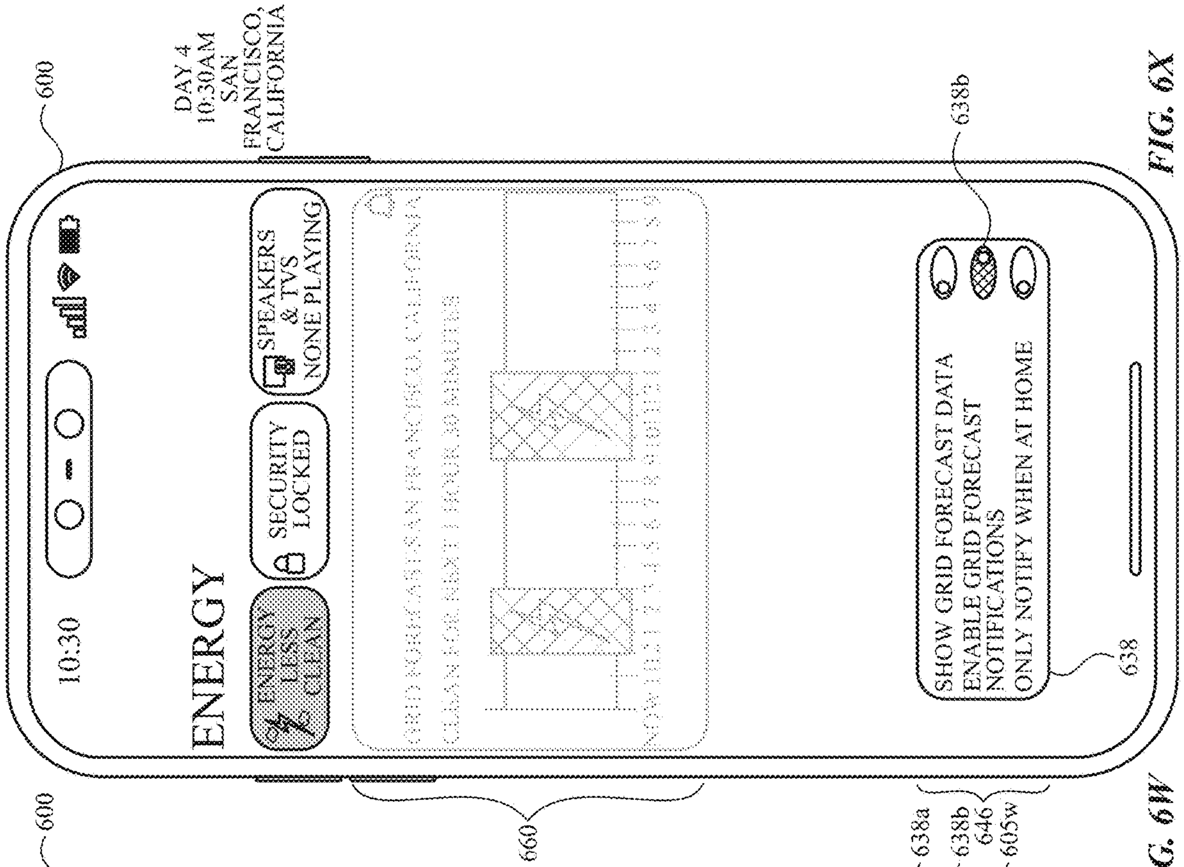

At FIG. 6V, as indicated by energy forecast schematic 606, the time is 10:30 AM on the fourth day (e.g., Thursday, September 8th) and computer system 600 is positioned in San Francisco, California. Accordingly, a day has elapsed between FIGS. 6U and 6V and computer system 600 transitions from Cupertino, California, to San Francisco, California, between FIGS. 6U and 6V.

As illustrated in FIG. 6V, computer system 600 displays primary location energy forecast platter 660 within energy forecast user interface 616. At FIG. 6V, computer system 600 displays primary location energy forecast platter 660 based on with the energy output of the fourth day (e.g., September 8th) of the electrical grid at the primary location.

As illustrated in FIG. 6V, clean energy period indicator 650*e* spans across a portion of energy forecast user interface object 626*b* that corresponds to a three-hour time period that starts at 12:00 PM and ends at 3:00 PM. Clean energy period indicator 650*f* spans across a portion of energy forecast user interface object 626*b* that corresponds to a four-hour time period that starts at 9:00 PM and ends at 1:00 AM. Accordingly, at FIG. 6V, the electrical grid that corresponds to the primary location of computer system 600 will output clean energy from 12:00 PM to 3:00 PM and from 9:00 PM to 1:00 AM. At FIG. 6V, computer system 600 detects tap input 605*v* directed to (e.g., corresponding to the selection of) primary location energy forecast platter 660.

Figure 6W:
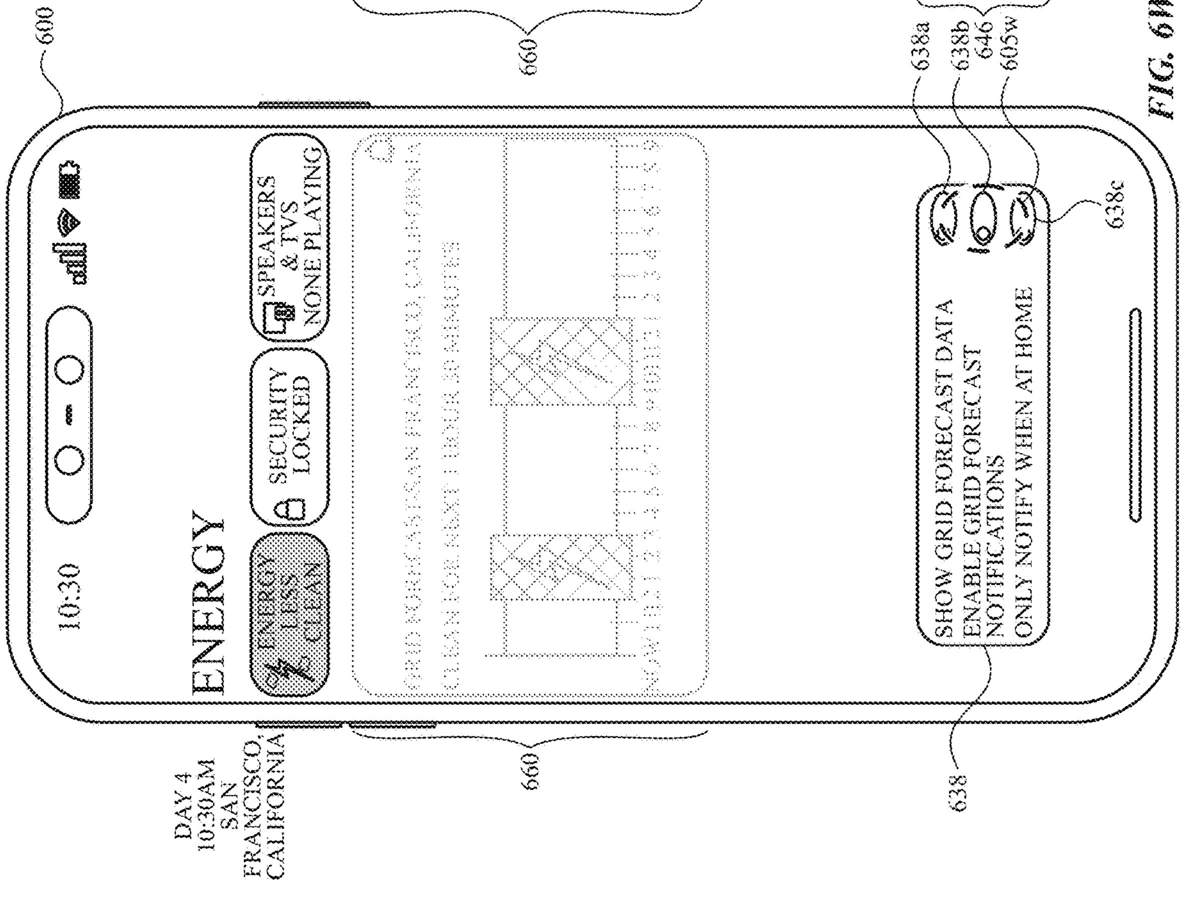
Figure 6Y:
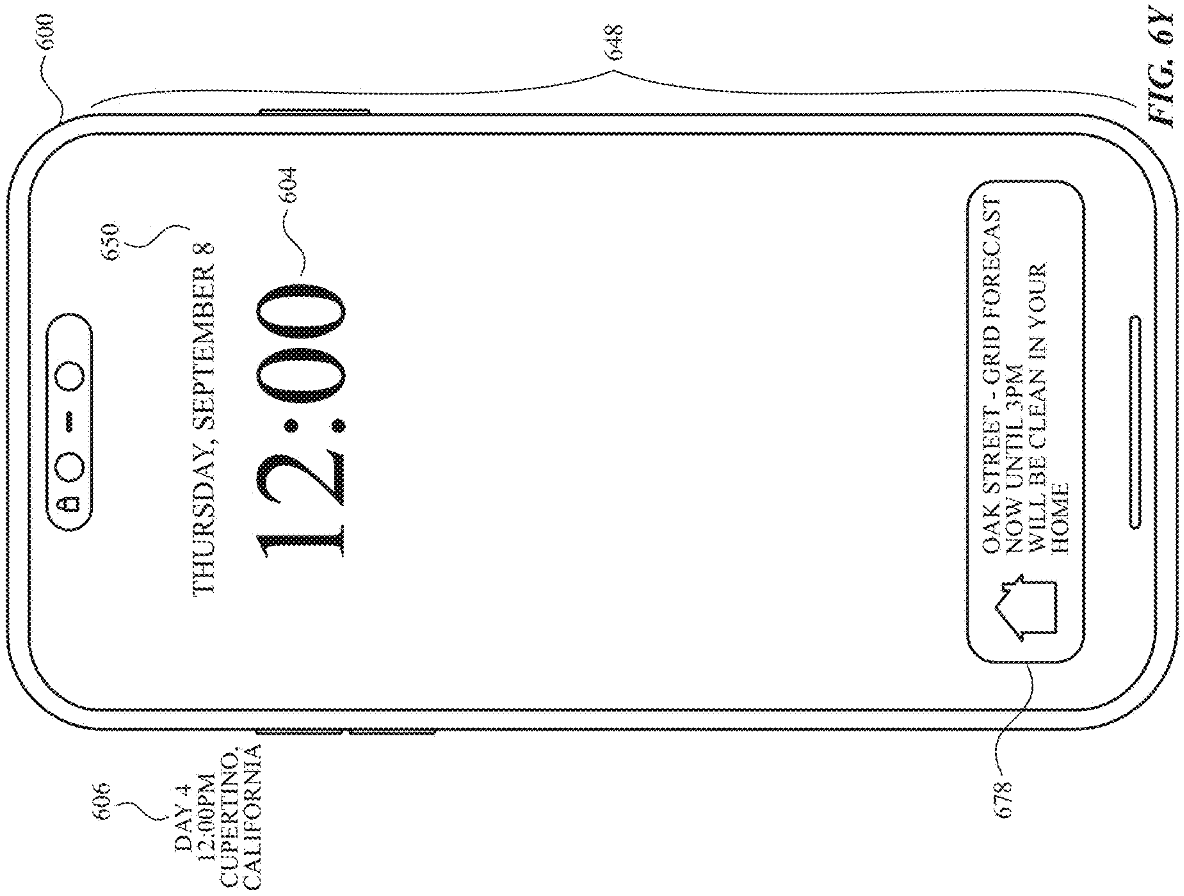

As illustrated in FIG. 6W, in response to detecting tap input 605*v*, computer system 600 displays notification user interface 638. Notification user interface 638 includes show grid forecast data control 638*a*, grid forecast notifications control 638*b*, and home control 638*c*. In some examples, computer system 600 displays grid forecast data with respect to the electrical grid at the primary location of computer system 600 in response to detecting an input that corresponds to an activation of show grid forecast data control 638*a*. In some examples, in response to detecting an input that corresponds to activation of home control 638*c*, computer system 600 configures itself to only output energy forecast notifications indicating the beginning of clean energy time periods for the electrical grid at the current location of computer system 600 while computer system 600 is positioned at the primary location. At FIG. 6W, computer system 600 detects tap input 605*w* directed to (e.g., corresponding to the selection of) grid forecast notifications control 638*b*.

At FIG. 6X, in response to detecting tap input 605*w*, computer system 600 configures itself to output a notification each time the electrical grid positioned at the primary location of computer system 600 begins a clean energy period. Additionally, in response to detecting tap input 605*p*, computer system 600 displays grid forecast notifications control 638*b* as "active," indicating that continuous notifications have been set up for the electrical grid at the primary location of computer system 600. In some examples, in response to detecting an input directed at grid forecast notifications control 638*b*, computer system 600 ceases to display notification user interface 638.

At FIG. 6Y, as indicated by energy forecast schematic 606, the time is 12:00 PM on the fourth day (e.g., Thursday, September 8th) and computer system 600 is positioned in Cupertino, California. Accordingly, one and a half hours have elapsed between FIGS. 6X and 6Y and computer system 600 transitions from San Francisco, California, to Cupertino, California, between FIGS. 6X and 6Y.

As illustrated in FIG. 6Y, computer system 600 displays lock screen user interface 648. At FIG. 6Y, a determination is made that the electrical grid for the primary location of computer system 600 has begun a clean energy period while computer system 600 is configured to output a notification indicating the beginning of a clean energy period for the electrical grid at the primary location. As illustrated in FIG. 6R, because a determination is made that the electrical grid for the primary location of computer system 600 has begun a clean energy period (e.g., while computer system 600 is configured to output the notification indicating the beginning of the clean energy period for electrical grid at the primary location), computer system 600 displays continuous notification 678. As illustrated in FIG. 6Y, continuous energy notification 678 indicates that the electrical grid at the primary location of computer system 600 will output clean energy until 3:00 PM. In some examples, while computer system is away from the selected primary location of computer system 600, computer system 600 does not display continuous notification 678 based on a determination that home control 638*c* is selected.

FIGS. 7A-7E illustrate various techniques and methods described herein as implemented on computer system 700. At FIG. 7A, computer system 700 is a smartwatch. Similar to computer system 600, a primary location that corresponds to "Oak Street" has been selected for computer system 700. In some examples, when computer system 700 and computer system 600 are registered with a common user account and/or paired together, the selection of a primary location for computer system 600 is extended to computer system 700. In some examples, a primary location for computer system 700 is selected independently of computer system 600.

Figure 7A:
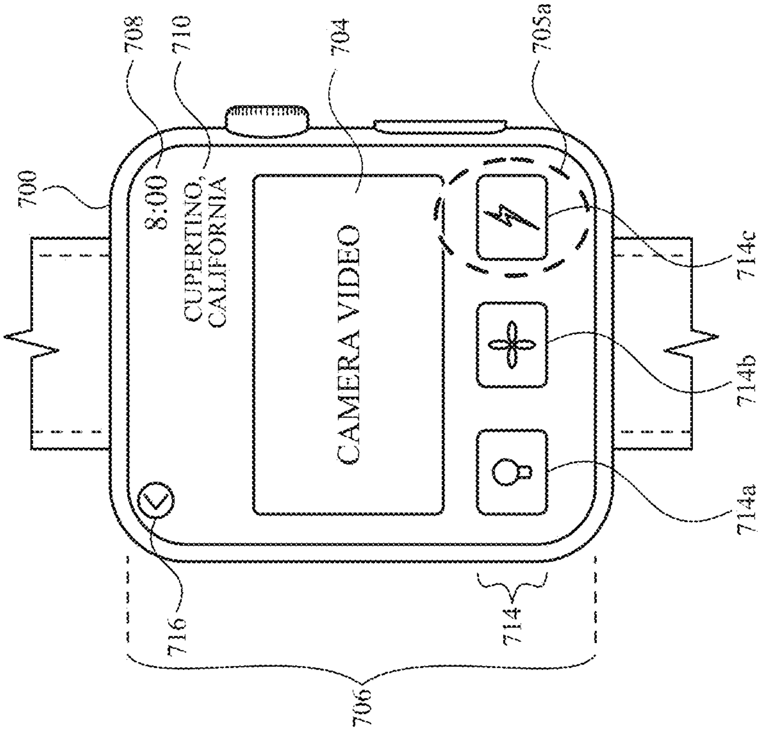
FIGS. 7A-7E illustrate exemplary user interfaces for managing an energy forecast on a wearable computer system in accordance with some examples.

As illustrated in FIG. 7A, computer system 700 displays home application user interface 706. In some examples, home application user interface 706 corresponds to a home application installed on computer system 700 and is displayed in response to navigating to the home application. As illustrated in FIG. 7A, home application user interface 706 includes current time indicator 708, current location indicator 710, complication menu control region 714, video feed 704, and return control 716. Computer system 700 displays current time indicator 708 with an indication of the current time. Computer system 700 displays current location indicator 710 with an indication of the current location of computer system 700. Accordingly, at FIG. 7A, as indicated by current location indicator 710, computer system 700 is positioned in Cupertino, California. In some examples, complication menu control region 714 includes one or more controls corresponding to different functionalities of the home application. In such examples, unlike video feed 704, complication menu control region 714 might not include content corresponding to such functionality and instead include controls to navigate to the different functionality.

Video feed 704 includes a representation of a field of view of one or more cameras that are in communication (e.g., wireless communication and/or wired communication) with computer system 700. As illustrated in FIG. 7A, complication menu control region 714 includes lighting control **714*a*, air management control 714*b*, and energy forecast control 714*c*. Both lighting control 714*a* and air management control 714*b* correspond to external accessories (e.g., smart lights and/or an air conditioning device) that are in communication (e.g., wireless communication and/or wired communication) with computer system 700. It should be recognized that more, fewer, and/or different user interface elements can be included in home application user interface 706 and that the examples described above are used for discussion purposes. At FIG. 7A, computer system 700 detects tap input 705*a* directed to (e.g., corresponding with the selection of) energy forecast control 714*c***.

Figure 7B:
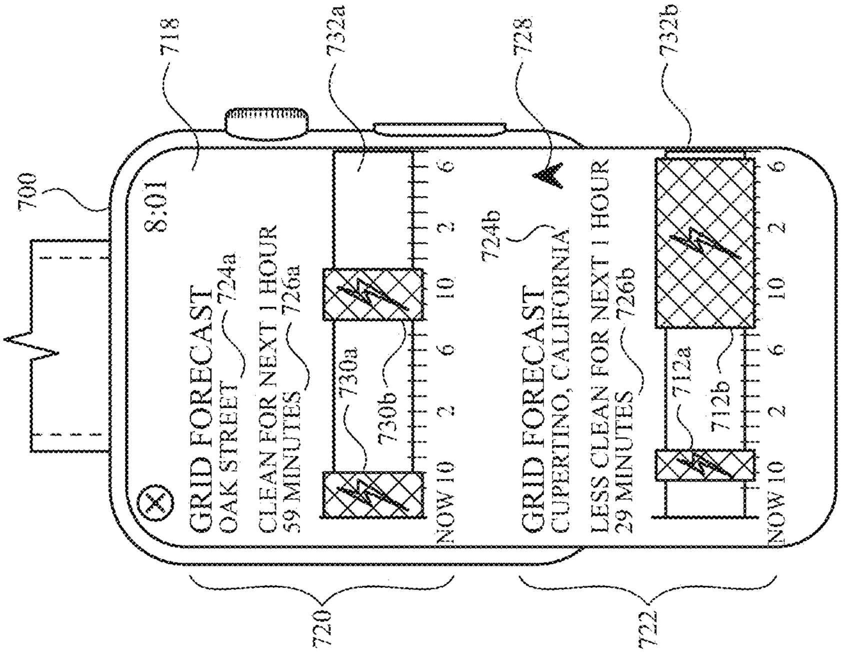

As illustrated in FIG. 7B, in response to detecting tap input **705*a*, computer system 700 displays energy forecast user interface 718. In some examples, energy forecast user interface 718 includes similar elements as described above with respect to energy forecast user interface 616. For example, energy forecast user interface 718 includes an energy forecast for one or more locations. In some examples, while computer system 700 displays home application user interface 706, computer system 700 detects a rotation of a rotatable input mechanism (e.g., a crown, a joystick, a wheel) of computer system 700 and in response to detecting the rotation of the rotatable input mechanism, computer system 700 displays energy forecast user interface 718**.

At FIG. 7B, a determination is made that computer system 700 is positioned away from the primary location of computer system 700. As illustrated in FIG. 7B, because a determination is made that computer system 700 is positioned away from the primary location of computer system 700, energy forecast user interface 718 concurrently includes primary location energy forecast 720 and current location energy forecast 722. As illustrated in FIG. 7B, computer system 700 displays primary location energy forecast 720 above current location energy forecast 722. When energy forecast user interface 718 includes both primary location energy forecast 720 and current location energy forecast 722, computer system 700 displays primary location energy forecast 720 above current location energy forecast 722. In some examples, computer system 700 displays current location energy forecast 722 above primary location energy forecast 720. In some examples, computer system 700 concurrently displays primary location energy forecast 720 and current location energy forecast 722. In some examples, energy forecast user interface 718 is scrollable to navigate to primary location energy forecast 720 and/or current location energy forecast 722. In some examples, based on a determination being made that computer system 700 is positioned at its selected primary location, energy forecast user interface 718 includes primary location energy forecast 720 and does not include current location energy forecast 722.

As illustrated in FIG. 7B, primary location energy forecast 720 includes energy forecast grid location indicator **724*a*, energy forecast window indicator 726*a*, primary location energy forecast user interface object 732*a*, clean energy period indicator 730*a*, and clean energy period indicator 730*b*. Computer system 700 displays energy forecast grid location indicator 724*a* with an indication that the electrical grid that corresponds to primary location energy forecast 720 is located at "Oak Street." When a determination is made that computer system 700 is positioned away from the primary location of computer system 700, computer system 700 displays energy forecast grid location indicator 724*a* with an indication of the assigned (e.g., user assigned and/or computer system assigned) name (e.g., Oak Street) of the primary location of computer system 700. Alternatively, when a determination is made that computer system 700 is positioned at its primary location, computer system 700 displays energy forecast grid location indicator 724*a* with an indication of the geographic name (e.g., San Francisco, California) of the primary location of computer system 700. In some examples, when computer system 700 is positioned within a geographic boundary (e.g., city, block, neighborhood, state, and/or country) of the primary location but is not at the primary location (e.g., primary location is located at a specific address in San Francisco, California, but computer system 700 is located within San Francisco, California, at a position that is not the specific address) computer system 700 displays energy forecast grid location indicator 724*a*** with an indication of both the assigned name of the primary location and the geographic name of the primary location.

Computer system 700 displays energy forecast window indicator **726*a* with an indication of how much longer the electrical grid at the primary location will output clean energy, or with an indication of the amount of time remaining until the electrical grid at the primary location begins to output clean energy. Further, as illustrated in FIG. 7B, computer system 700 displays clean energy period indicator 730*a* and clean energy period indicator 730*b* as overlaid on top of and/or part of primary location energy forecast user interface object 732*a* to indicate the time periods when the electrical grid at the primary location of computer system 700** will output clean energy.

Further, as illustrated in FIG. 7B, current location energy forecast 722 includes energy forecast grid location indicator **724*b*, energy forecast window indicator 726*b*, current location energy forecast user interface object 732*b*, GPS position indicator 728, clean energy period indicator 712*a*, and clean energy period indicator 712*b*. Computer system 700 displays energy forecast grid location indicator 724*b* with an indication that the electrical grid that corresponds to current location energy forecast 722 is located at Cupertino, California. Computer system 700 displays energy forecast window indicator 726*b* with an indication of how much longer the electrical grid at the current location will output clean energy, or with an indication of the amount of time left until the electrical grid at the current location of computer system 700 begins to output clean energy. Further, computer system 700 displays GPS position indicator 728 to indicate that current location energy forecast 722 corresponds to the current location of computer system 700. Further, as illustrated in FIG. 7B, computer system 700 displays clean energy period indicator 712***a* and clean energy period indicator 712*b* as overlaid on top and/or as part of current location energy forecast user interface object 732*b* to indicate the time periods when the electrical grid at the current location of computer system 700 will output clean energy.

Figure 7D:
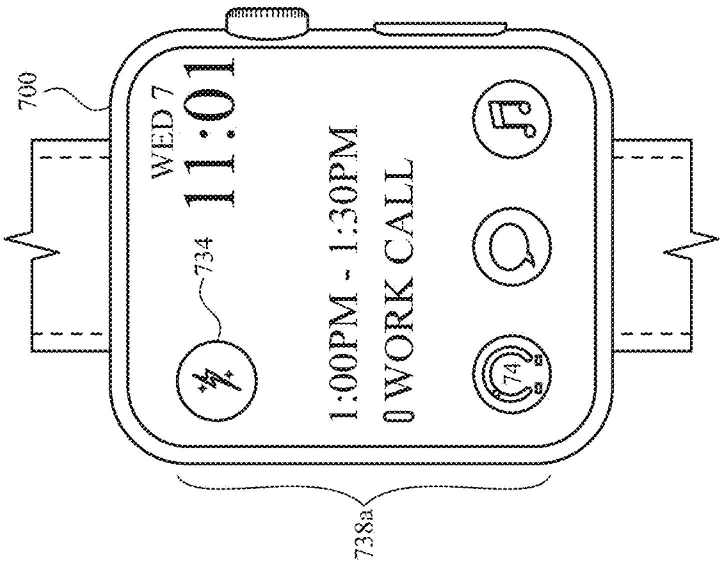
Figure 7C:
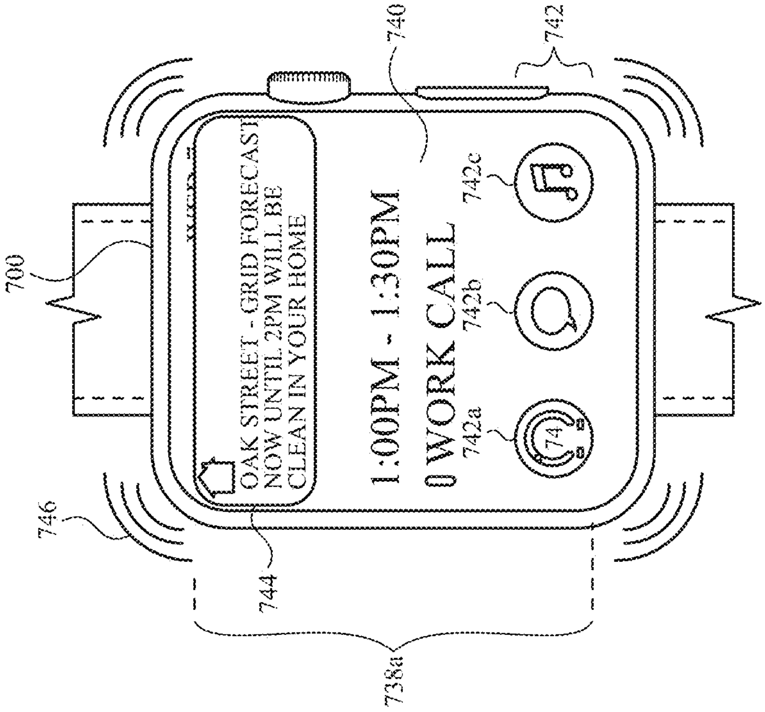

FIG. 7C illustrates computer system 700 outputting a notification that indicates that the electrical grid at the primary location has begun a clean energy period. As illustrated in FIG. 7C, computer system 700 displays home screen user interface 738*a*. As illustrated in FIG. 7C, home screen user interface 738*a* includes daily schedule indicator 740, complication control region 742, and energy forecast notification 744. Computer system 700 displays daily schedule indicator 740 with an indication of upcoming scheduled events (e.g., scheduled via user input and/or scheduled via computer system 700). Complication control region 742 includes temperature complication 742*a*, messaging complication control 742*b*, and media control 742*c*. Temperature complication 742*a* corresponds to a weather application that is installed on computer system 700, messaging complication control 742*b* corresponds to an electronic messaging (e.g., text messaging and/or electronic mail) application that is installed on computer system 700, and media control 742*c* corresponds to a media playback application installed on computer system 700.

At FIG. 7C, computer system 700 is configured to output a notification that indicates that the electrical grid at the primary location of computer system 700 has begun a clean energy period. At FIG. 7C, a determination is made that the electrical grid at the primary location of computer system 700 has begun a clean energy period. As illustrated at FIG. 7C, because a determination is made that the electrical grid at the primary location of computer system 700 has begun a clean energy period (e.g., while computer system 700 is configured to output a notification that indicates that the electrical grid at the primary location has begun a clean energy period), computer system 700 displays energy forecast notification 744. As illustrated in FIG. 7C, energy forecast notification 744 includes an indication of how long the electrical grid at the primary location of computer system 700 will output clean energy. Further, at FIG. 7C, as part of displaying energy forecast notification 744, computer system 700 outputs haptic alerts 746. That is, computer system 700 outputs a combination of haptic and visual alerts to indicate that the electrical grid at the primary location of computer system 700 has begun a clean energy period. It should be recognized that the method in which computer system 700 outputs energy forecast at FIG. 7C is merely exemplary. Computer system 700 can output energy forecast notification 744 using one or more modalities, including a visual modality, an auditory modality, and/or a haptic modality. In some examples, computer system 700 is configured to output the notifications in response to computer system 700 detecting a series of one or more inputs or in response to receiving instructions from an external computer system (e.g., computer system 600). In some examples, haptic alerts 746 is a series of haptic alerts. In some examples, haptic alerts 746 is a single discrete haptic alert. In some examples, computer system 700 outputs haptic alerts 746 before, while, or after computer system 700 displays energy forecast notification 744. In some examples, the notification is configured on an external device (e.g., computer system 600) (e.g., as discussed above with respect to FIGS. 6L-6M and FIGS. 6O-6Q) and computer system 700 outputs the notification.

At FIG. 7D, computer system 700 ceases to display energy forecast notification 744. As illustrated in FIG. 7D, when computer system 700 does not display energy forecast notification 744, energy forecast complication control 734 is visible (e.g., the display of energy forecast notification 744 obstructs the view of energy forecast complication control 734). Energy forecast complication control 734 is included in home screen user interface 738*a* at FIG. 7C. However, at FIG. 7C, because computer system 700 displays energy forecast notification 744, energy forecast complication control 734 is not visible. Computer system 700 displays energy forecast complication control 734 with an appearance that is indicative of the type of energy that the electrical grid at the primary location of computer system 700 is presently outputting. As illustrated in FIG. 7D, computer system 700 displays energy forecast complication control 734 with an appearance that includes a lightning bolt with flashes of light. The appearance of energy forecast complication control 734 at FIG. 7D indicates that the electrical grid at the primary location of computer system 700 is outputting clean energy. In some examples, the appearance of energy forecast complication control 734 indicates the type of energy that the electrical grid at the current location of computer system 700 is outputting. In some examples, in response to detecting a press and hold (e.g., a long press) on energy forecast complication control 734, computer system 700 displays controls (e.g., similar to location selection user interface 642 as shown at FIG. 6J) that allows a user to select which location (e.g., the present location of computer system 700 or the primary location of computer system 700) corresponds to energy forecast complication control 734.

Figure 7E:
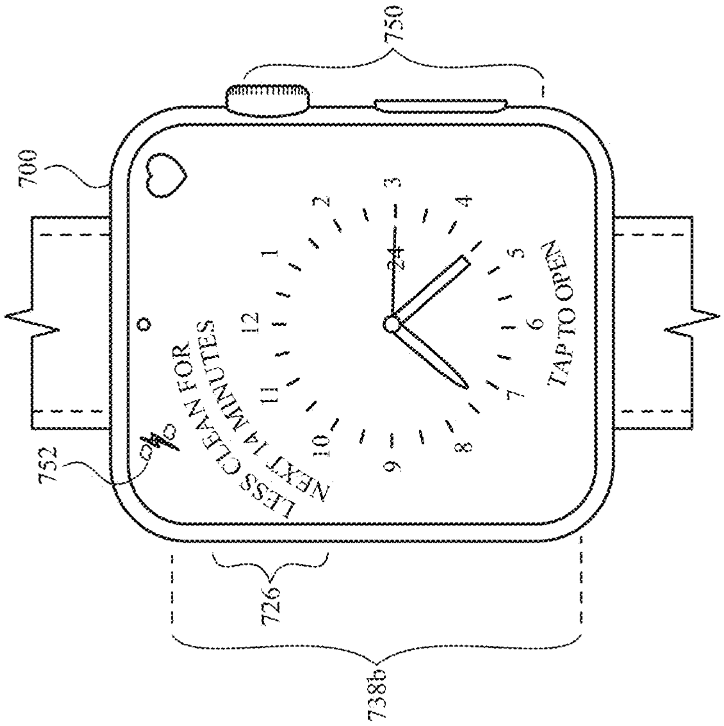

As illustrated in FIG. 7E, computer system 700 displays home screen user interface 738*b*. Home screen user interface 738*b* is a different iteration of home screen user interface 738*a*. As illustrated in FIG. 7E, home screen user interface 738*b* includes clock indicator 750, energy forecast icon 752, and energy forecast window indicator 726.

As illustrated in FIG. 7E, computer system 700 displays clock indicator 750 with an indication of the current time. Computer system 700 displays energy forecast icon 752 with an appearance that is indicative of the type of energy that the electrical grid at the primary location of computer system 700 is presently outputting. At FIG. 7E, computer system 700 displays energy forecast icon 752 with an appearance of a lightning bolt with clouds. The appearance of energy forecast icon 752 at FIG. 7E indicates that that the electrical grid at the primary location of computer system 700 is outputting less clean energy.

Further, at FIG. 7E, computer system 700 displays energy forecast window indicator 726 with an indication of how long the electrical grid at the primary location of computer system 700 will output the less clean energy for or the time remaining until the electrical grid at the primary location of computer system 700 begins to output clean energy. As illustrated in FIG. 7E, computer system 700 currently displays energy forecast window indicator 726 as "Less clean for next 14 minutes," signifying the amount of time remaining until the electrical grid at the primary location of computer system 700 stops outputting the less clean energy. In some examples, home screen user interface 738*a* and/or home screen user interface 738*b* includes a user interface object (e.g., notification control 622*a* and/or notification control 622*b*) that, when selected, configures computer system 700 to output a notification (e.g., energy forecast notification 744) that indicates that a clean energy period for a respective electrical grid has begun. In some examples, in response to detecting an input that corresponds to selection of energy forecast icon 752 and/or energy forecast complication control 734 (e.g., as shown in FIG. 7D), computer system 700 displays primary location energy forecast 720 and/or current location energy forecast 722.

FIG. 8 is a flow diagram illustrating a method (e.g., method 800) for selectively displaying a type of energy forecast in accordance with some examples. Some operations in method 800 are, optionally, combined, the orders of some operations are, optionally, changed, and some operations are, optionally, omitted.

As described below, method 800 provides an intuitive way for selectively displaying a type of energy forecast. Method 800 reduces the cognitive burden on a user for selectively displaying a type of energy forecast, thereby creating a more efficient human-machine interface. For battery-operated computing devices, enabling a user to selectively display a type of energy forecast faster and more efficiently conserves power and increases the time between battery charges.

In some examples, method 800 is performed at a computer system (e.g., 600) that is in communication with a display generation component (e.g., a display screen and/or a touch-sensitive display) and one or more input devices (e.g., a physical input mechanism (e.g., a hardware input mechanism, a rotatable input mechanism, a crown, a knob, a dial, a physical slider, and/or a hardware button), a camera, a touch-sensitive display, a microphone, and/or a button). In some examples, the computer system is a watch, a phone, a tablet, a processor, a head-mounted display (HMD) device, and/or a personal computing device.

At 802, the computer system detects, via the one or more input devices, a first request (e.g., 605*a* and/or 605*d*) (e.g., an input (e.g., one or more tap inputs and/or, in some examples, one or more non-tap inputs, such as air inputs (e.g., pointing air gestures, tapping air gestures, swiping air gestures, and/or moving air gestures), gaze inputs, gaze-and-hold inputs, mouse clicks, mouse click-and-drags, voice commands, selection inputs, and/or inputs that move the computer system in a particular direction), an input that corresponds to selection of a respective user interface object, a voice command, an air gesture, and/or a rotation of a rotatable input mechanism) to display a first energy forecast user interface object (e.g., 626*a* and/or 626*b*). In some examples, the first energy forecast user interface object corresponds to an estimated, predicted, determined, and/or future demand (e.g., load) and/or price of energy (e.g., chemical, electrical, radiant, mechanical, thermal, and/or nuclear). In some examples, the first energy forecast user interface object is for a future and/or later time (e.g., as compared to a current time).

At 804, in response to detecting the first request (e.g., 605*a* and/or 605*d*) to display the first energy forecast user interface object (e.g., 626*a* and/or 626*b*), the computer system displays, via the display generation component, the first energy forecast user interface object, wherein in accordance with (806) a determination that a first set of one or more criteria is satisfied: the first energy forecast user interface object (e.g., 626*a* and/or 626*b*) corresponds to a first electrical grid (e.g., as discussed at FIG. 6B) (e.g., a network of one or more energy generators and/or consumers that are connected via transmission and/or distribution lines) (e.g., the electrical grid corresponds to a first location (e.g., a set of one or more: streets, blocks, neighborhoods, cities, states, countries, and/or other division (either physical or imaginary) of an area in an environment)) and the first energy forecast user interface object (e.g., 626*a* and/or 626*b*) includes a first set of one or more energy indicators (e.g., 628*a*, 628*b*, 628*c*, 650*a*, 650*b*, 650*c*, and/or 650*d*) (e.g., the one or more energy indicators are a different shape, size, and/or color than the first energy forecast user interface object) (e.g., the first set of one or more energy indicators are overlaid on top of the first energy forecast user interface object) (e.g., the first set of one or more energy indicators is a graphical representation and/or a textual representation of a time period when the first electrical grid is identified to output a first type of energy (e.g., clean, cleaner, and/or less dirty energy as compared to a different type of energy)) that indicate one or more time periods (e.g., the one or more time periods span across a day, a week, a month, and/or a year) when the first electrical grid is identified to output a first type of energy (e.g., as discussed at FIGS. 6B, 6F, 6E, and/or 6L) (e.g., energy that is created from renewable sources, energy created from natural sources, energy created from processes that are replenished (e.g., sunlight, ocean current, and/or wind) and/or energy created from zero emission sources). In some examples, in accordance with a determination that the first set of one or more criteria is satisfied, the first energy forecast user interface object indicates one or more time periods when the first electrical grid is identified to output a second type of energy (e.g., less-clean, dirty, and/or dirtier energy as compared to the first type of energy) (e.g., energy that is created from non-renewable sources, energy created from unnatural sources, energy created from processes that are not replenished (e.g., coal, natural gas, oil, and/or nuclear) and/or energy created from emission sources) different from the first type of energy. In some examples, in accordance with a determination that the first set of one or more criteria is satisfied, the first energy forecast user interface object includes a third set of one or more energy indicators that indicate one or more time periods when the first electrical grid is identified to output the second type of energy. In some examples, the first set of one or more criteria includes a criterion that is based on a location (e.g., a detected and/or determined location) of the computer system. In some examples, the first set of one or more criteria includes a criterion that is satisfied when an application that is at least partially executing on the computer system is configured (e.g., preconfigured and/or a setting is established) to provide the first energy forecast user interface object. In some examples, the first set of one or more criteria includes a criterion that is satisfied when the computer system is in communication with a second computer system (e.g., a remote computer system, such as a computer system that stores one or more energy forecasts (e.g., a different energy forecast for different electrical grids and/or locations)) different from the computer system.

At 806, in response to detecting the first request (e.g., 605*a* and/or 605*d*) to display the first energy forecast user interface object (e.g., 626*a* and/or 626*b*), the computer system displays, via the display generation component, the first energy forecast user interface object, wherein in accordance with (808) a determination that a second set of one or more criteria is satisfied: the first energy forecast user interface object (e.g., 626*a* and/or 626*b*) corresponds to a second electrical grid (e.g., a network of one or more energy generators and/or consumers that are connected via transmission and/or distribution lines) different (e.g., and/or distinct) from the first electrical grid (e.g., the second electrical grid corresponds to a second location that is different and/or distinct from the first location (e.g., the first electrical grid is located in a different location than the second electrical grid and/or the first electrical grid supplies energy to different consumers than the first electrical grid)) and the first energy forecast user interface object (e.g., 626*a* and/or 626*b*) includes a second set of one or more energy indicators (e.g., 628*a*, 628*b*, 628*c*, 650*a*, 650*b*, 650*c*, and/or 650*d*) (e.g., the second set of one or more energy indicators are different and/or distinct from the first set of one or more energy indicators) (e.g., the second set of one or more energy indicators is a graphical representation and/or a textual representation of a time period when the first electrical grid is identified to output the first type of energy) that indicate one or more time periods when the second electrical grid is identified to output the first type of energy (e.g., as discussed at FIGS. 6B, 6F, 6E, and/or 6L). In some examples, the first energy forecast user interface object includes an indication (e.g., a textual indication and/or a graphical indication) of the first location or the second location. In some examples, the computer system transitions the first energy forecast user interface object from corresponding to the first location to corresponding to the second location in accordance with a determination that the location of the computer system transitions from the first location to the second location. In some examples, the computer system displays a textual and/or graphical indication of the one or more time periods that the first electrical grid or the second electrical grid is identified to output the first type of energy while the computer system displays the first energy forecast user interface object. In some examples, the first energy forecast user interface object is selectable to display an educational user interface (e.g., an interface that includes information regarding the electrical grid that corresponds to the first energy forecast user interface object, types of renewable energy, information regarding the first type of energy and/or information regarding a second type of energy (e.g., less-clean, dirty, and/or dirtier energy as compared to the first type of energy), to increase the size of the first energy forecast user interface object, or to cease the display of the first energy forecast user interface object). In some examples, in accordance with a determination that the second set of one or more criteria is satisfied, the first energy forecast user interface object indicates one or more time periods when the second electrical grid is identified to output the second type of energy. In some examples, in accordance with a determination that the first set of one or more criteria is satisfied, the first energy forecast user interface object includes a fourth set of one or more energy indicators that indicate one or more time periods when the second electrical grid is identified to output the second type of energy. In some examples, in accordance with a determination that the first set of one or more criteria is satisfied, the first energy forecast user interface object does not include an energy indicator that indicates a time period when the second electrical grid is identified to output the first type of energy. In some examples, in accordance with a determination that the second set of one or more criteria is satisfied, the first energy forecast user interface object does not include an energy indicator that indicates a time period when the first electrical grid is identified to output the first type of energy. In some examples, the second set of one or more criteria includes a criterion that is satisfied when the first set of one or more criteria is not satisfied. In some examples, the second set of one or more criteria includes a criterion that is based on the location of the computer system. In some examples, the second set of one or more criteria includes a criterion that is satisfied when the application is configured (e.g., preconfigured and/or a setting is established) to provide the first energy forecast user interface object. In some examples, the first set of one or more criteria includes a criterion that is satisfied when the computer system is in communication with a third computer system (e.g., a remote computer system, such as a computer system that stores one or more energy forecasts (e.g., a different energy forecast for different electrical grids and/or locations)) (e.g., the second computer system) different from the computer system. In some examples, the first set of one or more criteria includes a criterion that is satisfied when a determination is made that the computer system is at the first location and not the second location. In some examples, the first energy forecast user interface object corresponds to the first electrical grid in accordance with a determination that the first set of one or more criteria is satisfied and the second set of one or more criteria is not satisfied. In some examples, the second set of one or more criteria includes a criterion that is satisfied when a determination is made that the computer system is at the second location and not at the first location. In some examples, the first energy forecast user interface object corresponds to the second electrical grid in accordance with a determination that the second set of one or more criteria is satisfied and the first set of one or more criteria is not satisfied. In some examples, the second electrical grid includes one or more generation sources, consumers, and/or transmission resources that are not part of the first electrical grid. In some examples, the second electrical grid includes one or more generation sources, consumers, and/or transmission resources that are part of the first electrical grid. In some examples, the second electrical grid does not include one or more generation sources, consumers, and/or transmission resources that are part of the first electrical grid. In some examples, in accordance with a determination that the first set of one or more criteria is satisfied, the first energy forecast user interface object does not correspond to the second electrical grid. In some examples, in accordance with a determination that the second set of one or more criteria is satisfied, the first energy forecast user interface object does not correspond to the first electrical grid.

In some examples, in accordance with a determination that a first location (e.g., location of 600 at FIG. 6A or 6D) (e.g., city, street, block, town, country, and/or village) is assigned (e.g., by a user and/or by the manufacturer of the computer system) as a first type of location (e.g., a home and/or primary location) (e.g., a user account associated with the computer system includes and/or designates a particular location as the first type of location) (e.g., the computer system and/or a user previously designated a particular location as the first type of location for the computer system and/or an application of the computer system) (e.g., the computer system has a relationship (e.g., is paired, previously communicated, and/or has common ownership) with one or more computer systems that are located at a particular location corresponding to the first type of location) (e.g., a location that includes one or more accessories (e.g., television, smart speaker, thermostat, ceiling fan, and/or one or more lights) (e.g., one or more accessories that correspond to a common user account of the computer system) (e.g., one or more accessories that recognize a common Wi-Fi signal that the computer system recognizes) assigned to a particular location such that the computer system is configured to display one or more user-interface elements that, when selected, cause the computer system to alter an operating state of the one or more accessories) (e.g., a location that includes a Wi-Fi signal that the computer system recognizes) (e.g., a location that is user defined as a primary residence and/or secondary residence of the user) for the computer system (e.g., 600) (e.g., an application of the computer system), the first energy forecast user interface object (e.g., 626*a* and/or 626*b*) corresponds to the first location (e.g., as described at FIG. 6E). In some examples, the first location corresponds to the first electrical grid (e.g., the first electrical grid corresponds to the first location and/or the first electrical grid services the first location). In some examples, in accordance with a determination that a location is not assigned as the first type of location for the computer system, the first energy forecast user interface object corresponds to a first current location (e.g., the current location of the computer system and/or a location that is derived from location data and/or determined to be a location of the computer system) of the computer system (e.g., as described at FIG. 6B), wherein the first current location is different from the first location. In some examples, the first current location corresponds to the second electrical grid (e.g., the second electrical grid is at the second location and/or the second electrical grid services the second location). In some examples, the computer system displays the first energy forecast user interface object corresponding to the first location while at the first current location (e.g., display home location while not at home). In some examples, the first location is different from a detected and/or determined location (e.g., a current location) of the computer system. Displaying the first energy forecast user interface that corresponds to either a current location of the computer system or a location assigned as a first type of location when prescribed conditions are met allows the computer system to automatically perform a display operation that indicates to a user whether a location is assigned as the first type of location for the computer system, thereby performing an operation when a set of conditions has been met without requiring further user input.

In some examples, the computer system displays, via the display generation component, a first user interface (e.g., 612) (e.g., landing user interface (e.g., a user interface that the computer system displays in response to launching the application) and/or a home user interface of the application) (e.g., that corresponds to an application installed (e.g., installed by the user of the computer system or the manufacturer of the computer system) on the computer system), wherein displaying the first user interface includes. in accordance with a determination that no external computer system is registered with the computer system (e.g., 600) (e.g., as discussed at FIG. 6B) at a location assigned as a second type of location (e.g., the first type of location described above or a different type of location), displaying, via the display generation component, a second energy forecast user interface object (e.g., 626*a* and/or 626*b*) and in accordance with a determination that one or more external computer systems are registered with the computer system at a location assigned as the second type of location (e.g., as discussed at FIG. 6D), displaying, via the display generation component, a control (e.g., 632*c*) without displaying the second energy forecast user interface object. In some examples, the second energy forecast user interface object is not displayed in the first type of user interface when the control is displayed in the first type of user interface. In some examples, while displaying the control, the computer system detects a second input (e.g., 605*d*) (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) that corresponds to selection of the control. In some examples, in response to detecting the second input that corresponds to selection of the control, the computer system displays, via the display generation component, a second user interface (e.g., 616) (e.g., that corresponds to the application) different (e.g., includes different content and/or corresponds to different information) from the first user interface, wherein the second user interface includes the second energy forecast user interface object. In some examples, the computer system displays the second energy forecast user interface object in the second user interface after the computer system displays the second energy forecast user interface object in the first user interface. In some examples, the computer system displays the first user interface as a part of the computer system ceasing to display the second user interface. In some examples, the computer system launches the application in response to detecting the input. In some examples, the computer system displays the second energy forecast user interface object in the first user interface object without displaying the control. In some examples, the first user interface is displayed in response to detecting a first input (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction), an input that corresponds to selection of a respective user interface object, a voice command, an air gesture, and/or a rotation of a rotatable input mechanism. Displaying the first user interface with particular content allows the computer system to automatically perform a display operation that indicates to a user whether one or more external computer systems are registered with the computer system at a location assigned as the second type of location, thereby performing an operation when a set of conditions has been met without requiring further user input. Having the first user interface include the second energy forecast user interface object when no external computer system is registered with the computer system at a location assigned as the second type of location allows the computer system to selectively include the second energy forecast user interface object when there is less to display, thereby performing an operation when a set of conditions has been met without requiring further user input.

In some examples, in response to detecting the request (e.g., 605*a* and/or 605*d*) to display the first energy forecast user interface object (e.g., 626*a* and/or 626*b*), the computer system displays, via the display generation component, a notification user interface object (e.g., 622*a* and/or 622*b*) (e.g., a graphical and/or textual representation of a bell and/or a notification) (e.g., the notification user interface object is displayed at one or more locations that corresponds to the first energy forecast user interface object). In some examples, while the first energy forecast user interface object and the notification user interface object are displayed, the computer system detects, via the one or more input devices, a set of one or more inputs (e.g., 605*l* and/or 605*m*) (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) including an input (e.g., 605*l*) that corresponds to selection of the notification user interface object. In some examples, in response to detecting the set of one or more inputs, the computer system configures (e.g., enable and/or set up) itself (e.g., 600) to output a notification (e.g., 652, 654*b*, and/or 654*a*) (e.g., a one-time notification or an ongoing notification) at a time associated with (e.g., at the time of and/or before) a next occurrence of a time period during which a first respective electrical grid is identified to output the first type of energy (e.g., as discussed at FIGS. 6N and 6R) (e.g., the respective electrical grid is identified to output clean energy or the respective electrical grid is identified to output clean energy within a time period (e.g., 1-60 minutes) (e.g., the time period has begun or the time period will begin within a period of time (e.g., 1-60 minutes))). In some examples, the notification includes an indication of the time period for which the respective electrical grid is identified to output the first type of energy. In some examples, the notification indicates that the respective electrical grid is identified to cease to output clean energy within a first time period. In some examples, the notification indicates that the respective electrical grid is identified to output less-clean energy (e.g., energy generated from non-renewable sources (e.g., coal, oil, natural gas and/or gasoline)). In some examples, after detecting the third input and while displaying the first energy forecast user interface object, the computer system displays the notification user interface object in a second state, wherein before detecting the third input, the computer system displays the notification user interface object in a first state different from the second state. In some examples, while the computer system is configured to output the notification, the computer system displays a notification based on a determination that the respective electrical grid is currently identified to output the first type of energy. In some examples, the computer system ceases to display the notification after a time period (e.g., 1-120 seconds) has elapsed since the computer system initially displayed the notification and/or in response to detecting a respective input.

In some examples, in accordance with a determination that a third set of one or more criteria is satisfied (e.g., a respective energy grid that corresponds with the first energy forecast user interface object is identified to not output energy of a respective type for a particular time period, the respective energy grid is identified to output an amount of energy of the respective type that is less than an amount threshold for the particular time period, and/or the respective energy grid is identified to output energy of the respective type for less than a time threshold (e.g., 1-15 minutes)) (e.g., the third set of one or more criteria is different from the first set of one or more criteria and/or the second set of one or more criteria), the first energy forecast user interface object (e.g., 626*a* and/or 626*b*) does not include an energy indicator (e.g., 628*d*, 628*c*, 628*f*, 650*c*, and/or 650*d*) that indicates one or more time periods when a second respective electrical grid is identified to output the first type of energy (e.g., 626*b* at FIG. 6F). In some examples, the first set of one or more criteria and the second set of one or more criteria are not satisfied when the third set of one or more criteria is satisfied. In some examples, in accordance with a determination that the third set of one or more criteria is satisfied, the computer system displays the respective set of one or more energy indicators as part of displaying the first energy forecast user interface object. Not displaying an energy indicator as part of displaying the first energy forecast user interface object when a set of prescribed conditions is met allows the computer system to automatically perform a display operation (e.g., the display of the first energy forecast user interface object) that indicates to a user the type of energy that the respective electrical grid is identified to output, thereby performing an operation when a set of conditions has been met without requiring further user input.

In some examples, in response to detecting the request (e.g., 605*a* and/or 605*d*) to display the first energy forecast user interface object (e.g., 626*a* and/or 626*b*), the computer system displays, via the display generation component, a notification user interface object (e.g., 622*a* and/or 622*b*) (e.g., a graphical and/or textual representation of a bell and/or a notification) (e.g., the notification user interface object is displayed at one or more locations that corresponds to the first energy forecast user interface object). In some examples, while the first energy forecast user interface object and the notification user interface object are displayed, the computer system detects, via the one or more input devices, a set of one or more inputs (e.g., 605*l* and/or 605*m*) (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) including an input (e.g., 605*l*) that corresponds to selection of the notification user interface object. In some examples, in response to detecting the set of one or more inputs, the computer system configures (e.g., enable and/or set up) itself (e.g., 600) to output a notification (e.g., 652, 654*b*, and/or 654*a*) (e.g., a one-time notification or an ongoing notification) at a time associated with (e.g., at the time of and/or before) a next occurrence of a time period during which a first respective electrical grid is identified to output the first type of energy (e.g., as discussed at FIGS. 6N and 6R) (e.g., the respective electrical grid is identified to output clean energy or the respective electrical grid is identified to output clean energy within a time period (e.g., 1-60 minutes) (e.g., the time period has begun or the time period will begin within a period of time (e.g., 1-60 minutes))). In some examples, the notification includes an indication of the time period for which the respective electrical grid is identified to output the first type of energy. In some examples, the notification indicates that the respective electrical grid is identified to cease to output clean energy within a first time period. In some examples, the notification indicates that the respective electrical grid is identified to output less-clean energy (e.g., energy generated from non-renewable sources (e.g., coal, oil, natural gas and/or gasoline)). In some examples, after detecting the third input and while displaying the first energy forecast user interface object, the computer system displays the notification user interface object in a second state, wherein before detecting the third input, the computer system displays the notification user interface object in a first state different from the second state. In some examples, while the computer system is configured to output the notification, the computer system displays a notification based on a determination that the respective electrical grid is currently identified to output the first type of energy. In some examples, the computer system ceases to display the notification after a time period (e.g., 1-120 seconds) has elapsed since the computer system initially displayed the notification and/or in response to detecting a respective input.

In some examples, displaying the first energy forecast user interface object (e.g., 626*a* and/or 626*b*) with the first set of one or more energy indicators (e.g., 628*a*, 628*b*, 628*c*, 650*a*, 650*b*, 650*c*, and/or 650*d*) includes displaying a first energy indicator (e.g., 628*a*, 628*b*, 628*c*, 650*a*, 650*b*, 650*c*, and/or 650*d*) that corresponds to a first time period (e.g., 15-600 mins) when the first electrical grid is identified to output the first type of energy and a second energy indicator (e.g., 628*a*, 628*b*, 628*c*, 650*a*, 650*b*, 650*c*, and/or 650*d*) (e.g., the second energy indicator is different (e.g., different size, different shape, and/or different color) and/or distinct from the first energy indicator) that corresponds to a second time period (e.g., 15-600 mins) (e.g., the first time period is different (e.g., non-overlapping and/or corresponding to different times of the day) than the second time period or the first time period is equal to the second time period) when the first electrical grid is identified to output the first type of energy (e.g., as described at FIG. 6E). In some examples, the first energy indicator and the second energy indicator are positioned adjacent to each other on the first energy forecast user interface object. In some examples, the first energy indicator and the second energy indicator are not positioned in adjacent positions on the first energy forecast user interface object. Displaying the first energy indicator user interface object that corresponds to a time period when the first electrical grid is identified to output the first type of energy and displaying the second energy indicator that corresponds to a time period when the first electrical grid is identified to output the first type of energy provides a user with visual feedback regarding the present and/or future status of the first electrical grid, thereby providing improved visual feedback.

In some examples, the first energy forecast user interface object (e.g., 626*a* and/or 626*b*) corresponds to a third time period (e.g., 15-600 mins) (e.g., and not another respective time period). In some examples, in accordance with a determination that a respective electrical grid is identified to output the first type of energy for the third time period (e.g., the electrical grid is identified to output clean energy for the entirety of the third time period or a majority of the third time period), the first energy forecast user interface object includes a single energy indication (e.g., 628*c*) with a first size (e.g., the single energy indicator is displayed at the first size or the sum of lengths of each respective energy indicator within the first set of one or more energy indicators is equal to the size length) that corresponds to the third time period (e.g., 628*a* at FIG. 6F). Displaying the single energy indication with the first size that corresponds to the third time period provides a user with visual feedback with respect to the time period and/or duration when the first electrical grid is identified to output the first type of energy, thereby providing improved visual feedback.

In some examples, in accordance with a determination that the first amount of time (e.g., 1-360 minutes) is greater than a threshold amount of time (e.g., 1-60 minutes), the first energy forecast user interface object (e.g., 626*a* and/or 626*b*) includes an energy indicator (e.g., 628*a*, 628*b*, 628*c*, 650*a*, 650*b*, 650*c*, and/or 650*d*) (e.g., the energy indicator is a graphical representation and/or a textual representation of a the fifth time period when the first electrical grid is identified to output the first type of energy (e.g., clean, cleaner, and/or less dirty energy as compared to a different type of energy)) that corresponds to the first amount of time (e.g., as discussed above at FIG. 6B). In some examples, in accordance with a determination that the first amount of time is less than the threshold amount of time, the first energy forecast user interface does not include the energy indicator that corresponds to the first amount of time (e.g., as discussed above at FIG. 6B). Displaying the first energy forecast user interface object with an energy indicator when prescribed conditions are satisfied allows the computer system to automatically perform a display operation that indicates to a user that the first electrical grid is identified to output a type of energy for at least a threshold amount of time, thereby performing an operation when a set of conditions has been met without requiring further user input.

In some examples, in accordance with a determination that the first energy forecast user interface object (e.g., 626*a* and/or 626*b*) corresponds to a second location (e.g., location of computer system 600 at FIG. 6A or 6C) (e.g., street, city, block, country, and/or village) and a fourth set of one or more criteria is met (e.g., the fourth set of one or more criteria is met when a respective electrical grid at the second location outputs an amount of a type of energy that is above a threshold and/or the fourth set of one or more criteria is met when a respective electrical grid at the second location outputs a type of energy for greater than a time threshold), the first energy forecast user interface object includes a third set of one or more clean energy indicators (e.g., 628*a*, 628*b*, 628*c*, 650*a*, 650*b*, 650*c*, and/or 650*d*). In some examples, in accordance with a determination that the first energy forecast user interface object corresponds to a third location (e.g., location of computer system 600 at FIG. 6A or 6C) that is different (e.g., different cities, different states, different streets, and/or different towns) from the second location and the fourth set of one or more criteria is met, the first energy forecast user interface does not include a set of one or more clean energy indicators (e.g., 628*a*, 628*b*, 628*c*, 650*a*, 650*b*, 650*c*, and/or 650*d*) (e.g., as discussed above at FIG. 6F). Displaying the first energy forecast user interface object with a third set of one or more clean energy indicators based on whether a set of prescribed conditions are met allows the computer system to automatically perform a display operation that indicates to a user the state of a respective electrical grid, thereby performing an operation when a set of conditions has been met without requiring further user input.

In some examples, a length of the first energy forecast user interface object (e.g., 626*a* and/or 626*b*) corresponds to a time period (e.g., 1-24 hours). In some examples, a length of each respective energy indicator (e.g., 628*a*, 628*b*, 628*c*, 650*a*, 650*b*, 650*c*, and/or 650*d*) in the first set of one or more energy indicators (e.g., 628*a*, 628*b*, 628*c*, 650*a*, 650*b*, 650*c*, and/or 650*d*) corresponds to a respective time period (e.g., 15-600 minutes).

In some examples, the first energy forecast user interface object (e.g., 626*a* and/or 626*b*) is a first size. In some examples, before displaying the first energy forecast user interface object, the computer system displays, via the display generation component, a third energy forecast user interface object (e.g., 674) (e.g., the computer system displays the third energy forecast on a respective user interface of the computer system and/or on a user interface that corresponds to an application that is associated with the first energy user interface object) at a second size different from (e.g., bigger or smaller than) the first size. In some examples, the third size energy forecast user interface object includes a representation (e.g., 672, 670 and/or 664) based on at least a portion of the content of the first energy forecast user interface object (e.g., 626*a* and/or 626*b*) (e.g., the third energy forecast user interface object includes a subset of the content included in the first energy forecast user interface or a superset of the content included in the first energy forecast user interface object) (e.g., the third energy forecast user interface object includes a graphical and/or textual representation of an energy window for a location) (e.g., a clock face on a smart watch or a widget (e.g., a control that displays real-time information and/or information and/or data that corresponds to one or more metrics that has been calculated within a predetermined amount of time and/or calculated and/or displayed at certain time intervals and/or a control that, when selected, causes a user interface to be displayed that includes one or more portions of real-time information (e.g., real-time information that was included in the display of the control))). In some examples, detecting the first request (e.g., 605*a*, 605*g*, and/or 605*d*) to display the first energy forecast user interface object includes detecting an input (e.g., 605*g*) corresponding to selection of the third energy forecast user interface object. In some examples, the computer system displays the third energy forecast user interface object in response to the computer system transitioning from a locked state to an unlocked state. Displaying the first energy user interface object in response to detecting the input provides a user with visual feedback regarding the state of the computer system (e.g., the computer system has detected the input that corresponds to selection of the third forecast user interface object), thereby providing improved visual feedback.

In some examples, the first energy forecast user interface object (626*a* and/or 626*b*) corresponds to a fourth location that is assigned as a third type of location for the computer system (e.g., 600 at FIG. 6E) (e.g., a home location (e.g., the computer system corresponds to a user account that is associated with a home location and/or the computer system is designated to correspond to the home location) (e.g., the computer system and/or a user previously designated a home location to the computer system) (e.g., the computer system recognizes one or more computer systems that are located at the home location and/or one or more computer systems that are located at the home location and the computer system have a common ownership) and/or primary location (e.g., a location that includes one or more accessories (e.g., television, smart speaker, thermostat, ceiling fan, and/or one or more lights) (e.g., one or more accessories that correspond to a common user account of the computer system) (e.g., one or more accessories that recognize a common wi-fi signal that the computer system recognizes) assigned to the to a respective location such the computer system displays one or more that, when selected, cause the computer system to alter an operating state of the one or more accessories) (e.g., a location that includes a Wi-Fi signal that the computer system recognizes)). In some examples, the third energy forecast user interface object (e.g., 674) corresponds to a second current location (e.g., the current location of the computer system, a past location of the computer system, a future location of the computer system, and/or a location derived from location data of the computer system) of the computer system (e.g., 600 at FIG. 6B). In some examples, the fourth location is different (e.g., and/or distinct) from the second current location of the computer system.

In some examples, the first energy forecast user interface object (e.g., 626*a* and/or 626*b*) is a third size. In some examples, after displaying the first energy forecast user interface object (e.g., 626*a* and/or 626*b*), the computer system displays, via the display generation, a fourth energy forecast user interface object (e.g., 674) (e.g., the fourth energy forecast user interface object includes a subset of the content included in the first energy forecast user interface object or a superset of the content included in the first energy forecast user interface object) (e.g., the fourth energy forecast user interface object includes a graphical and/or textual representation of an energy window for the first location) (e.g., a clock face on a smart watch or a widget (e.g., a control that displays real-time information and/or information and/or data that corresponds to one or more metrics that has been calculated within a predetermined amount of time and/or calculated and/or displayed at certain time intervals and/or a control that, when selected, causes a user interface to be displayed that includes one or more portions of real-time information (e.g., real-time information that was included in the display of the control))) at a fourth size different from the third size, wherein the fourth energy forecast user interface object corresponds to a third current location (e.g., current location, a location derived from location data of the computer system, a home location, a previous location of the computer system, and/or a future location of the computer system) of the computer system (e.g., 600 at FIG. 6B). In some examples, while displaying the fourth energy forecast user interface object at the fourth size, the computer system detects a third input (e.g., 650*i*) (e.g., tap and hold, one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) that corresponds to selection of the fourth energy forecast user interface object. In some examples, in response to detecting the third input, the computer system displays a grid forecast location selection control (e.g., 642*a*, and/or 642*b*) (e.g., a control for selecting and/or changing the location that the fourth energy forecast user interface object corresponds to) (e.g., the computer system visually emphasizes the current setting location user interface object and does not visually emphasize the home setting user interface object or vice versa). In some examples, while displaying the grid forecast location selection control, the computer system detects a fourth input (e.g., 650*j*) (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) directed to the grid forecast location selection control. In some examples, in response to detecting the fourth input directed to the grid forecast location selection control, the computer system displays a fifth energy forecast user interface object at the fourth size (e.g., 674 at FIG. 6K), wherein the fifth energy user interface object corresponds to a fifth location different from the third current location of the computer system (e.g., 600) (e.g., the fifth location is assigned as a respective type of location (e.g., a home location (e.g., the computer system corresponds to a user account that is associated with a home location and/or the computer system is designated to correspond to the home location) (e.g., the computer system and/or a user previously designated a home location for the computer system) (e.g., the computer system recognizes one or more computer systems that are located at the home location and/or one or more computer systems that are located at the home location and the computer system have a common ownership) and/or primary location) (e.g., a location that includes one or more accessories (e.g., television, smart speaker, thermostat, ceiling fan, and/or one or more lights) (e.g., one or more accessories that correspond to a common user account of the computer system) (e.g., one or more accessories that recognize a common wi-fi signal that the computer system recognizes) assigned to a respective location such the computer system displays one or more that, when selected, cause the computer system to alter an operating state of the one or more accessories) (e.g., a location that includes a Wi-Fi signal that the computer system recognizes)) (e.g., information included in the fourth energy forecast corresponds to a respective electrical grid that services the respective location). In some examples, the computer system ceases to display the grid forecast location selection control in response to detecting the fourth input. In some examples, the computer system displays the grid forecast location selection control as overlaid on top of a respective user interface. In some examples, in response to detecting the input directed to the grid forecast location selection control, the computer system configures the fourth energy forecast to correspond to the fifth location and not the second current location of the computer system. Displaying the fifth energy forecast corresponding to a different location in response to detecting the fourth input provides the user with visual feedback regarding the state of the computer system (e.g., the computer system has detected the fourth input), thereby providing improved visual feedback.

In some examples, the computer system (e.g., 600 and/or 700) is a wearable computer system (e.g., a wearable device, a smartwatch, a head-mounted display device, and/or an activity tracker computer system).

In some examples, the first request (e.g., 605*a* and/or 605*d*) to display the first energy forecast user interface object (e.g., 626*a* and/or 626*b*) corresponds to a rotation of a rotatable input mechanism (e.g., a dial, a crown, and/or a knob). Displaying the first energy forecast user interface object in response to detecting the rotation of a rotatable input mechanism allows the user to control the display of the first energy forecast user interface object without requiring that the computer system display a respective control, thereby providing additional control options without cluttering the user interface with additional displayed controls.

In some examples, the first energy forecast user interface object (e.g., 742*a* and/or 752) corresponds to a watch complication (e.g., a digital watch complication, a user interface object that is displayed by a smartwatch on a respective user interface, a user interface object that includes one or more sets of information).

Note that details of the processes described above with respect to method 800 (e.g., FIG. 8) are also applicable in an analogous manner to other methods described herein. For example, method 900 optionally includes one or more of the characteristics of the various methods described above with reference to method 800. For example, energy forecast included in method 900 can be displayed on a landing page of an application. For brevity, these details are not repeated below.

FIG. 9 is a flow diagram illustrating a method (e.g., method 900) for selectively displaying one or more energy forecasts in accordance with some examples. Some operations in method 900 are, optionally, combined, the orders of some operations are, optionally, changed, and some operations are, optionally, omitted.

As described below, method 900 provides an intuitive way for selectively displaying one or more energy forecasts. Method 900 reduces the cognitive burden on a user for selectively displaying one or more energy forecasts, thereby creating a more efficient human-machine interface. For battery-operated computing devices, enabling a user to selectively display one or more energy forecasts faster and more efficiently conserves power and increases the time between battery charges.

In some examples, method 900 is performed at a computer system (e.g., 600) that is in communication with a display generation component (e.g., a display screen and/or a touch-sensitive display) and one or more input devices (e.g., a physical input mechanism (e.g., a hardware input mechanism, a rotatable input mechanism, a crown, a knob, a dial, a physical slider, and/or a hardware button), a camera, a touch-sensitive display, a microphone, and/or a button). In some examples, the computer system is a watch, a phone, a tablet, a processor, a head-mounted display (HMD) device, and/or a personal computing device.

At 902, the computer system detects, via the one or more input devices, a first input (e.g., 605*a* and/or 605*d*) (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) that corresponds to a selection of a user interface object (e.g., 632*c* and/or 610) (e.g., a user interface object that the computer system displays in a user interface (e.g., a user interface that the computer system displays when the computer system transitions from a locked state to an unlocked state, a user interface that the computer system displays when the computer system transitions from a sleep state to an active state, and/or a user interface that the computer system displays when the computer system is in a locked state, an unlocked state, a sleep state, and/or an active state) of the computer system and/or a user interface object that the computer system displays in response to the computer system launching an application that is installed on the computer system). In some examples, a user interface that includes the user interface object corresponds to a home application. In such examples, the user interface includes one or more controls corresponding to a respective accessory device (e.g., a control to change a state and/or send a communication to the respective accessory device) (e.g., a light, a fan, a speaker, a television, and/or a window) and/or one or more indications corresponding to the respective accessory device. In some examples, the user interface corresponding to the home application is a tab and/or separate user interface of the home application such that the user interface corresponds to energy and/or is navigated to within the home application via one or more inputs detected via the one or more input devices.

At 904, in response to detecting the first input, the computer system displays (906), via the display generation component, an energy user interface (e.g., 612 and/or 616), wherein in accordance with (908) a determination that the computer system (e.g., 600) is positioned at a first location (e.g., location of 600 at FIG. 6E) that corresponds to a first type of location (e.g., a home, main, and/or predefined location) of the computer system (e.g., the first type of location was previously assigned (via the computer system and/or a second computer system different from the computer system) as the first type of location of the computer system) (e.g., the first type of location corresponds to a location where the computer system is located at during the majority of time, days, and/or nights) (e.g., the first type of location includes one or more electronic devices that share a common ownership with the computer system), the energy user interface (e.g., 612 and/or 616) includes a first energy forecast user interface object (e.g., 626*b*) (e.g., as described above with respect to FIG. 8) and does not include a second energy forecast user interface object (e.g., 626*a*) (e.g., the second energy forecast user interface object is different and/or distinct from the first energy forecast user interface object) (e.g., a user interface object that indicates the time periods for when an electrical grid that corresponds to a second location is identified to output a first type of energy (e.g., as described above with respect to FIG. 8) and/or indicates time periods for when the electrical grid that corresponds to the second location is identified to not output the first type of energy) and in accordance with (910) a determination that the computer system (e.g., 600) is positioned at a second location (e.g., location of 600 at FIG. 6F) that does not correspond to the first type of location of the computer system (e.g., 600) (e.g., the second location was not previously assigned as the first type of location) (e.g., the second location corresponds to an electrical grid that does not service and/or correspond to the first location) (e.g., the second location is located in a different street, block, neighborhood, city, town, country and/or other division (either physical or imaginary) of an area in an environment than the first location) (e.g., the second location does not contain one or more electronic devices that share a common ownership with the computer system), the energy user interface (e.g., 612 and/or 616) includes the first energy forecast user interface object (e.g., 626*b*) and the second energy forecast user interface object (e.g., 626*a*). In some examples, the computer system does not display a respective energy forecast user interface object while the computer system displays the first energy forecast user interface object. In some examples, while the computer system displays the first energy forecast user interface object, the computer system ceases to display the second energy forecast user interface object and displays a third energy forecast user interface object in accordance a determination that the computer system transitions from the second location to a third location that corresponds to the third energy forecast user interface object. In some examples, the computer system ceases to display the second energy forecast user interface object and continues to display the first energy forecast user interface object in accordance with a determination that the computer system transitions from the second location to the first location. In some examples, the first location and the second location are in the same city, street, block, neighborhood, and/or town but correspond to different electrical grids. In some examples, while the computer system displays the first energy forecast user interface object, the computer system displays the second energy forecast user interface object in accordance with a determination that the position of the computer system transitions from the first location to the second location. In some examples, the first type of location contains one or more electronic devices that share a common ownership with the computer system. In some examples, the second location does not contain one or more electronic devices that share a common ownership with the computer system. In some examples, the first type of location corresponds to a first electrical grid that services the first location and does not service the second location. Displaying an energy user interface with the first energy forecast user interface object or with the first energy forecast user interface object and the second energy forecast interface object based on whether prescribed conditions are satisfied allows the computer system to automatically perform a display operation to indicate to a user that either the user is at a home location of the computer system or is away from a home location of the computer system, thereby performing an operation when a set of conditions has been met without requiring further user input. Displaying the energy user interface with the first energy forecast user interface object and the second energy forecast when a determination is made that the computer system is positioned at a second location that does not correspond to the first type of location provides the user with visual feedback regarding whether the location of the computer system corresponds to the first type of location, which provides present improved visual feedback.

In some examples, in accordance with a determination that the computer system (e.g., 600) is positioned at a current location (e.g., location of computer system 600 at FIG. 6B) and that a location is not assigned as the first type of location for the computer system (e.g., as discussed at FIG. 6B), the energy user interface (e.g., 612 and/or 616) includes a third energy forecast user interface object (e.g., 626*a*) (e.g., and does not include the first energy forecast user interface object and/or the second energy forecast user interface object) corresponding to the current location (e.g., the third energy forecast user interface includes information with respect to an electrical grid that services the current location) (e.g., and does not correspond to the first location and/or the second location). In some examples, in accordance with a determination that the computer system is positioned at a third location and in accordance with a determination that the computer system does not have a home location, the energy user interface does not include the first energy forecast user interface object and the second energy forecast user interface object. In some examples, the first type of location is a primary location of the computer system (e.g., a location where the computer system is positioned at the majority of the time, a location where the computer system is routinely charged, a location where the computer system is registered with, a location where the computer system recognizes one or more computer systems, a location where the computer system is authorized to use a Wi-Fi signal). In some examples, the first location corresponds to the first type of location because the first location is within the primary location of the computer system (e.g., the primary location encompasses the first location and/or the first location is a sub-location of the primary location). In some examples, the second location does not correspond to the first type of location because the second location is not within the primary location. Displaying the energy user interface object based on the location of the computer system allows a user to selectively control which energy forecast user interface objects are included within the energy user interface without displaying additional controls, thereby providing additional control options without cluttering the user interface with additional displayed controls. Displaying the energy user interface with a third energy forecast user interface object when a set of prescribed conditions are satisfied allows the computer system to automatically perform a display operation that indicates: (1) the location of the computer system; and (2) whether the computer system has been assigned to a home location, thereby performing an operation when a set of conditions has been met without requiring further user input.

In some examples, while displaying the energy user interface (e.g., 612 and/or 616) with the first energy forecast user interface object (e.g., 626*b*) and the second energy forecast user interface object (e.g., 626*a*) and in accordance with a determination that the computer system (e.g., 600) is positioned at the second location (e.g., location of 600 at FIG. 6B), the computer system displays an energy status user interface object (e.g., 632*c*, 624*b*, 632*c*1 and/or 632*c*2) (e.g., a graphical indication (e.g., a circle with a lightning bolt or a lightning bolt with stars and/or addition symbols) and/or a textual indication) that indicates an energy status corresponding the first location (e.g., that was previously output by the first electrical grid, that is currently output by the first electrical grid or that will be output by the first electrical grid) (e.g., without displaying an energy status user interface object that indicates an energy status corresponding to the second location). In some examples, the computer system changes the appearance of the energy status user interface object in real-time based on the output of the first electrical grid. In some examples, the category of the energy is clean (e.g., energy that is output by the first electrical grid is produced using renewable resources (e.g., sunlight, ocean current, and/or wind) and/or energy created from zero emission sources or less-clean energy) or less-clean energy that is output by the first electrical grid is produced using non-renewable energy. In some examples, the computer system displays the energy forecast user interface object in response to detecting the input that corresponds to selection of the user interface object. Displaying an energy status user interface object that indicates an energy status corresponding to the first location when at the second location provides a user with visual feedback regarding the energy status at the first type of location, thereby providing improved visual feedback.

In some examples, displaying the energy status user interface object (e.g., 632*c*, 624*b*, 632*c*1 and/or 632*c*2) includes displaying an indication (e.g., 632*c*, 632*c*2, and/or 624*b*) (e.g., a graphical indication (e.g., a clock and/or a countdown) and/or a textual indication) of a duration (e.g., 15-360 minutes) of time that (e.g., for the next 6 hours, or until 6:00 PM) the first location is identified to have the energy status (e.g., as discussed above at FIG. 6F). Displaying an energy status user interface object that includes an indication of a duration of how long a current energy status will be maintained provides a user with visual feedback regarding the present status and/or future status of the first electrical grid, thereby providing improved visual feedback.

In some examples, while displaying the energy user interface (e.g., 612 and/or 616) with the first energy forecast user interface object (e.g., 626*b*) and the second energy forecast user interface object (e.g., 626*a*), the computer system displays a location user interface object (e.g., 620) (e.g., an arrow, a bullseye and/or crosshairs) at a location corresponding to (e.g., on, within, inside of, and/or adjacent to) the second energy forecast user interface object without displaying a respective location user interface object at a location corresponding to the first energy forecast user interface object. In some examples, the location user interface object indicates a current location of the computer system. In some examples, the location user interface object indicates that the computer system is detecting a current location of the computer system. In some examples, the location user interface object indicates that the second energy forecast user interface object is based on a current location of the computer system. In some examples, the computer system ceases to display the location user interface object in accordance with a determination that a GPS setting of the computer system transitions from an active state to an inactive state. In some examples, the computer system displays the location user interface object in response to detecting the first input that corresponds to selection of the user interface object and in accordance with a determination that a location setting of the computer system is active. Displaying a location user interface object that corresponds to the second energy forecast without displaying a respective location user interface that corresponds to first energy forecast user interface object provides a user with visual feedback regarding the present location of the computer system, thereby providing improved visual feedback.

In some examples, the first energy forecast user interface object (e.g., 626*b*) corresponds to a second electrical grid (e.g., a network of one or more energy generators and consumers that are connected via transmission and/or distribution lines) (e.g., the first energy forecast user interface includes information (e.g., type of energy that the second electrical grid is outputting out and/or is identified to output, amount of energy that the second electrical grid is outputting and/or is identified to output) regarding the current status of the second electrical grid and/or the future status of the second electrical grid). In some examples, the second energy forecast user interface object (e.g., 626*a*) corresponds to a third electrical grid (e.g., the second energy forecast user interface includes information (e.g., type of energy that the third electrical grid is outputting out and/or is identified to output, amount of energy that the third electrical grid is outputting and/or is identified to output) regarding the current status of the third electrical grid and/or the future status of the third electrical grid). In some examples, the second electrical grid is different from the third electrical grid (e.g., as discussed above at FIG. 6F) (e.g., the second electrical grid is different and/or distinct from the third electrical grid (e.g., the second electrical grid supplies energy to the first location and the third electrical grid supplies energy to the second location)). Displaying an energy user interface with the first energy forecast user interface object that corresponds to a second electrical grid and the second energy forecast energy forecast user interface object that corresponds to a third electrical grid allows a user to concurrently view and analyze information regarding the present and/or future status of both the second electrical grid and the third electrical gird, thereby providing improved visual feedback.

In some examples, while displaying the energy user interface (e.g., 612 and/or 616) with the first energy forecast user interface object (e.g., 626*b*) and the second energy forecast user interface object (e.g., 626*a*), the computer system displays an indication (e.g., 618*b* at FIG. 6F) (e.g., a graphical indication and/or a textual indication) of a name assigned to (e.g., of) the first location (e.g., the home location that is set by the user or the computer system). In some examples, the name assigned to the first location is a user-selected name of the first location. In some examples, the name assigned to the first location is set by a user. In some examples, the name assigned to the first location is not set by a user. Displaying an indication of the name of the first location that corresponds to the first type of location provides a user with visual feedback with respect to which location the content included in the first energy forecast user interface object corresponds to, thereby providing improved visual feedback.

In some examples, while displaying the energy user interface (e.g., 612 and/or 616) with the first energy forecast user interface object (e.g., 626*b*) and without the second energy forecast user interface object (e.g., 626*a*), the computer system displays a first geographic indicator (e.g., 618*b* at FIG. 6E) (e.g., a graphical geographical indicator and/or a textual geographical indicator) that corresponds (e.g., the name of the city, town, and/or country of the first location, a picture of the first location, a flag of the city, down, and/or country of the first location and/or a nickname of the city, town, and/or country of the first location) to the first location (e.g., without displaying an indication of a name assigned to the first location). Displaying the first geographic indicator corresponding to the first location provides a user with visual feedback with respect to which location the content included in the first energy forecast user interface object corresponds to, thereby providing improved visual feedback.

In some examples, while displaying the energy user interface (e.g., 612 and/or 616) with the first energy forecast user interface object (e.g., 626*b*) and the second energy forecast user interface object (e.g., 626*a*), the computer system displays a second geographic indicator (e.g., 618*a*) (e.g., a graphical geographical indicator and/or a textual geographical indicator) that corresponds (e.g., the name of the city, town, and/or country of the first location, a picture of the first location, a flag of the city, down, and/or country of the first location and/or a nickname of the city, town, and/or country of the first location) to the second location within the second energy forecast user interface object. Displaying the second geographic indication that corresponds to the second location provides a user with visual feedback with respect to which location the content included in the second energy forecast user interface object corresponds to, thereby providing improved visual feedback.

In some examples, while displaying the energy user interface (e.g., 612 and/or 616) with the first energy forecast user interface object (e.g., 626*b*) and the second energy forecast user interface object (e.g., 626*a*), the computer system concurrently displays, via the display generation component, a first energy notification user interface object (e.g., 622*b*) (e.g., a control (e.g., affordance) that is shaped like a bell, an indication of a first type of energy, and/or a timer) that corresponds to the first energy forecast user interface object and a second energy notification user interface object (e.g., 622*a*), different from the first energy notification user interface object, that corresponds to the second energy forecast user interface object (e.g., the first energy notification user interface object and the second energy notification user interface object have the same appearance (e.g., same color, same size, and/or same shape) or the different appearances (e.g., different colors, different sizes, and/or different shapes)). In some examples, the computer system displays the first energy notification user interface object within the first energy forecast user interface object. In some examples, the computer system displays the second energy notification user interface object within the second energy forecast user interface object.

In some examples, the first energy forecast user interface object (e.g., 626*b*) corresponds to a fourth electrical grid at the first location (e.g., location of 600 at FIG. 6E). In some examples, the second energy forecast user interface object (e.g., 626*a*) corresponds to a fifth electrical grid at the second location (e.g., location of 600 at FIG. 6B), and wherein the fifth electrical grid is different from the fourth electrical grid. In some examples, while the computer system (e.g., 600) displays the first energy notification user interface object (e.g., 622*b*) and the second energy notification user interface object (e.g., 622*a*), the computer system detects a set of one or more inputs (e.g., 605*o*, 605*p*, 605*m*, and/or 605*l*) (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction). In some examples, in response to detecting the set of one or more inputs and in accordance with a determination that the set of one or more inputs corresponds to selection of the first energy notification user interface object (e.g., 622*b*) (e.g., is detected on the display of the computer system at a location that corresponds to the first energy notification, is detected while the first energy notification is targeted, includes an identifier of the first energy notification) (e.g., the set of one or more inputs detected at a location of a display of the computer system that corresponds to the location of the display of the first energy notification and/or the first energy notification is visually emphasized while the computer system detects), the computer system configures (e.g., enable and/or set up) itself to output a notification (e.g., 652, 654*a*, 654*b*, and/or 656) (e.g., a one-time notification or an ongoing notification) (e.g., a visual notification, an audio notification, and/or a haptic notification) that indicates that the fourth electrical grid is identified to output a first type of energy (e.g., clean energy (e.g., energy that is created from renewable sources, energy created from natural sources, energy created from processes that are replenished (e.g., sunlight, ocean current, and/or wind) and/or energy created from zero emission sources or less-clean energy (e.g., energy generated by non-renewable sources))) (e.g., the fourth electrical grid is identified to have begun outputting clean energy or the fourth electrical grid is identified to begin outputting clean energy within a time period (e.g., 1-60 minutes) (e.g., the time period has begun or the time period will begin within a time period (e.g., 1-60 minutes))) for a first time period (e.g., 15-360 minutes) and in accordance with a determination that the set of one or more inputs corresponds to selection of the second energy notification user interface object (622*a*) (e.g., is detected on the display of the computer system at a location that corresponds to the first energy notification, is detected while the first energy notification is targeted, includes an identifier of the first energy notification), the computer system configures (e.g., enable and/or set up) itself to output a notification (e.g., 652, 654*a*, 654*b*, and/or 656) that indicates that the fifth electrical grid is identified to output the first type of energy (e.g., energy that is created from renewable sources, energy created from natural sources, energy created from processes that are replenished (e.g., sunlight, ocean current, and/or wind) and/or energy created from zero emission sources) for a second time period (e.g., 15-360 minutes). In some examples, the set of one or more inputs corresponds to a selection of a notification control. In some examples, the computer system displays the notification control with a first appearance before detecting the set of one or more inputs and the computer system displays the notification control with a second appearance, that is different than the first appearance, in response to detecting the set of one or more inputs. Configuring the computer system to output a notification for either a fourth electrical grid or a fifth electrical grid allows the computer system to selectively configure itself to alert a user which electrical grid is outputting energy of a certain type and for how long, thereby performing an operation when a set of conditions has been met without requiring further user input. Outputting a respective notification when either the fourth electrical grid outputs energy of a first type or when the fifth electrical grid outputs energy of the first type allows the computer system to output a notification based on a status of either the fourth electrical grid or the fifth electrical grid, thereby providing additional control options without cluttering the user interface with additional displayed controls.

In some examples, the computer system (e.g., 600 and/or 700) is a wearable computer system (e.g., a wearable device, a smartwatch, a head-mounted display device, and/or an activity tracker computer system).

In some examples, the first input (e.g., 605*a* and/or 605*d*) that corresponds to selection of the user interface object (e.g., 632*c* and/or 610) is a rotation of a rotatable input mechanism (e.g., a dial, a crown, and/or a knob). Displaying the energy user interface in response to detecting the rotation of a rotatable input mechanism allows the user to control the display of the energy user interface without requiring that the computer system display a respective control, thereby providing additional control options without cluttering the user interface with additional displayed controls.

Note that details of the processes described above with respect to method 900 (e.g., FIG. 9) are also applicable in an analogous manner to other methods described herein. For example, method 10000 optionally includes one or more of the characteristics of the various methods described above with reference to method 900. For example, the process described in method 900 to configure the computer system to output a notification can be used to configure the computer system in method 1000 to output a notification. For brevity, these details are not repeated below.

FIG. 10 is a flow diagram illustrating a method (e.g., method 1000) for outputting an energy notification in accordance with some examples. Some operations in method 1000 are, optionally, combined, the orders of some operations are, optionally, changed, and some operations are, optionally, omitted.

As described below, method 1000 provides an intuitive way for outputting an energy notification. Method 1000 reduces the cognitive burden on a user for outputting an energy notification, thereby creating a more efficient human-machine interface. For battery-operated computing devices, enabling a user to output an energy notification faster and more efficiently conserves power and increases the time between battery charges.

In some examples, method 1000 is performed at a computer system (e.g., 600) that is in communication with an output component (e.g., a display generation component, an audio output component, a haptic output component, a display screen and/or a touch-sensitive display) and one or more input devices (e.g., a physical input mechanism (e.g., a hardware input mechanism, a rotatable input mechanism, a crown, a knob, a dial, a physical slider, and/or a hardware button), a camera, a touch-sensitive display, a microphone, and/or a button). In some examples, the computer system is a watch, a phone, a tablet, a processor, a head-mounted display (HMD) device, and/or a personal computing device.

At 1002, the computer system detects, via the one or more input devices, a first set of one or more inputs (e.g., 605*l*, 605*m*, 605*o*, and/or 605*p*) (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) including an input (e.g., 605*l*, 605*m*, 605*o*, and/or 605*p*) that corresponds to selection of a user interface object (622*a*, 622*b*, 626*a*, and/or 626*b*) (e.g., the user interface object is displayed with an energy forecast user interface object (as described above with respect to method 800) and/or the user interface object is displayed within a settings menu).

At 1004, in response to detecting the first set of one or more inputs (e.g., 605*l*, 605*m*, 605*o*, and/or 605*p*), the computer system configures (e.g., enabling, activating, and/or setting up) itself (e.g., 600) to output a first energy notification (e.g., 652, 678, 654*b*, and/or 654*a*) (e.g., a one-time notification or an ongoing notification) that corresponds to a respective location (e.g., the notification indicates a time period, multiple periods of time and/or a discreet time when an electrical grid that corresponds to the respective location is identified to output a first type of energy) (e.g., a location that corresponds to the location of the computer system or a location that corresponds to a type of location (e.g., a home location (e.g., a location that was previously assigned as the home location of the computer system by a user or the computer system), a main location, and/or predefined location of the computer system)).

At 1006, while the computer system (e.g., 600) is configured to output the first energy notification (e.g., 652, 678, 654*b*, and/or 654*a*) and in accordance with a determination that a first set of one or more criteria is satisfied, the computer system outputs, via the output component, the first energy notification (e.g., 652, 678, 654*b*, and/or 654*a*) indicating a beginning of an energy window for the respective location, wherein the energy window corresponds to a first type of energy (e.g., as discussed at FIG. 6R) (e.g., the energy window for the location has begun or the energy window for the location will begin in a predetermined amount of time (e.g., 1-60 minutes) or at a particular time (e.g., at 9:32 pm)) (e.g., an electrical grid that corresponds to the location is identified to output a first type of energy (e.g., energy that is created from renewable sources, energy created from natural sources, energy created from processes that are replenished (e.g., sunlight, ocean current, and/or wind) and/or energy created from zero emission sources) for a time period (e.g., 1-24 hours)). In some examples, the computer system does not output the notification in accordance with a determination that the set of one or more criteria is not satisfied (e.g., the electrical grid is not identified to output the first type of energy during the energy window, the computer system is in a respective state where the computer system does not output notifications (e.g., a do-not-disturb state, a silent state, and/or a sleep state)). In some examples, the computer system does not output the notification while the computer system is not configured to output the first energy notification. In some examples, the computer system does not output a notification in accordance with a determination that the electrical grid outputs a second type of energy during the energy window. In some examples, the computer system does not output the notification in accordance with a determination that the electrical grid is identified to output the first type of energy during the energy window for less than a predetermined amount of time (e.g., 1-15 minutes). In some examples, the computer system outputs the first energy notification in accordance with a determination that the set of one or more criteria is satisfied and in accordance with a determination that the electrical grid that corresponds to the first location is identified to output the first type of energy for a period of time. In some examples, in accordance with a determination that the set of one or more criteria is not satisfied, the computer system forgoes outputting the first energy notification that indicates the beginning of the energy window for the location. In some examples, the first energy notification is a visual notification, audio notification, and/or a haptic notification. In some examples, the first energy notification is selectable. In some examples, the computer system displays an energy forecast user interface object (as described above with respect to method 800) in response to detecting an input (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) that corresponds to selection of the first energy notification. In some examples, the computer system displays the first energy notification while displaying a respective notification that does not correspond to the energy window (e.g., a respective notification corresponding to a different function, feature, and/or application, such as a respective notification indicating receipt of a text message, a respective notification indicating an event on a calendar is about to occur, and/or a respective notification indicating that an event occurred with respect to an application). Outputting the first energy notification based on whether one or more criteria is satisfied allows the computer system to perform a display operation based on whether an energy window will begin at a respective location without displaying additional controls, thereby providing additional control options without cluttering the user interface with additional displayed controls. Outputting the first energy notification provides a user with sensory feedback (e.g., audio feedback, tactile feedback and/or visual feedback) that indicates that an energy window for a first location has begun or will begin, thereby providing improved sensory feedback.

In some examples, the first set of one or more criteria includes a first criterion that is satisfied when the computer system (e.g., 600) is identified to be positioned at a first location that is assigned as a first type of location (e.g., the position of computer system 600 at FIG. 6D) (e.g., a home location (e.g., the computer system corresponds to a user account that is associated with a home location and/or the computer system is designated to correspond to the home location) (e.g., the computer system and/or a user previously designated a home location to the computer system) (e.g., the computer system recognizes one or more computer systems that are located at the home location and/or one or more computer systems that are located at the home location and the computer system have a common ownership) and/or primary location) (e.g., a location that includes one or more accessories (e.g., television, smart speaker, thermostat, ceiling fan, and/or one or more lights) (e.g., one or more accessories that correspond to a common user account of the computer system) (e.g., one or more accessories that recognize a common Wi-Fi signal that the computer system recognizes) assigned to a respective location such the computer system displays one or more user interface elements that, when selected, cause the computer system to alter an operating state of the one or more accessories) (e.g., a location that includes a Wi-Fi signal that the computer system recognizes) (e.g., a location that is user defined as the primary residence and/or secondary residence of the user). Outputting the first energy notification when the computer system is identified to be positioned at a first location that is assigned as the first type of location provides a user with sensory feedback (e.g., audio feedback, tactile feedback and/or visual feedback) regarding the location of the computer system, thereby providing improved feedback. Outputting the first energy notification based on the location allows the computer system to automatically perform an operation that indicates to a user the location of the computer system, thereby performing an operation when a set of conditions has been met without requiring further user input.

In some examples, while the computer system (e.g., 600) is configured to output a second energy notification (e.g., 652, 678, 654*b*, and/or 654*a*) and while the computer system is positioned at a second location (e.g., position of computer system 600 at FIG. 6F) (e.g., the second location corresponds to an electrical grid that does not service and/or correspond to the respective location) (e.g., the second location is located in a different street, block, neighborhood, city, town, country and/or other division (either physical or imaginary) of an area in an environment than the respective location) of a second type of location (e.g., the second type of location does is not registered with the computer system, the second type of location does not contain one or more computer systems that share a common ownership with the computer system, the second type of location includes one or more computer systems that are not registered with the computer system, and/or the second type of location includes one or more computer systems that the computer system does not recognize) in accordance with a determination that a second set of one or more criteria is satisfied, wherein the second set of one or more criteria includes a criterion that is satisfied when a set of one or more criteria (e.g., the energy window for the location has begun or the energy window for the second location will begin in a predetermined amount of time (e.g., 1-60 minutes) or at a particular time (e.g., at 9:32 pm)) (e.g., an electrical grid that corresponds to the second location outputs a first type of energy (e.g., energy that is created from renewable sources, energy created from natural sources, and/or energy created from processes that are replenished (e.g., sunlight, ocean current, and/or wind) and/or energy created from zero emission sources) for a time period (e.g., 1-24 hours)) for outputting the second energy notification at a location different from the second location is satisfied (e.g., 638*c* and/or 646*c* is activated), the computer system forgoes outputting, via the output component, the second energy notification indicating a beginning of an energy window for the second location and in accordance with a determination that a third set of one or more criteria is satisfied, wherein the third set of one or more criteria includes a criterion that is satisfied when a set of one or more criteria (e.g., the energy window for the location has begun or the energy window for the second location will begin in a predetermined amount of time (e.g., 1-60 minutes) or at a particular time (e.g., at 9:32 pm)) (e.g., an electrical grid that corresponds to the second location outputs a first type of energy (e.g., energy that is created from renewable, energy created from natural sources, energy created from processes that are replenished (e.g., sunlight, ocean current, and/or wind), and/or energy created from zero emission sources) for a time period (e.g., 1-24 hours)) for outputting the second energy notification agnostic to a current location of the computer system is satisfied (e.g., 638*b* and/or 646*b* is active), the computer system outputs, via the output component, the second energy notification (e.g., that is the same type of notification as the first energy notification or is a different type of notification than the first energy notification) indicating a beginning of a third energy window for the second location. In some examples, the computer system changes the appearance of a respective control as a part of deactivating the setting of the computer system. In some examples, the computer system displays a user interface object as a part of outputting the second energy notification. In some examples, the computer system concurrently displays the first energy notification and the second energy notification. In some examples, the computer system provides audio, visual, and haptic outputs as a part of outputting the second energy notification. Outputting the second energy notification while the computer system is located at a second type of location provides a user with sensory feedback (e.g., audio feedback, tactile feedback and/or visual feedback) regarding both the location of the computer system and which settings of the computer system are disabled, thereby providing improved sensory feedback. Outputting the second energy notification when prescribed conditions are met allows the computer system to automatically indicate to a user the type of energy a respective electrical grid is outputting and/or is identified to output, thereby performing an operation when a set of conditions has been met without requiring further user input.

In some examples, while the computer system (e.g., 600) is configured to output a third energy notification (e.g., 652, 678, 654*b*, and/or 654*a*), the computer system detects a second input (e.g., 605*w* and/or 605*l*) (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) that corresponds to selection of the user interface object (e.g., 622*a*, 622*b*, 646*b*, and/or 638*b*). In some examples, in response to detecting the second input that corresponds to selection of the user interface object, the computer system configures itself to not output the third energy notification. In some examples, the computer system displays the user interface object with a first appearance while the user interface object is selected (e.g., the computer system is configured to output an energy notification) and the computer system displays the user interface object with a second appearance that is different from the first appearance while the user interface object is deselected (e.g., the computer system is configured to not output an energy notification). In some examples, the computer system changes the appearance of the user interface object as a part of the computer system outputting the notification. In some examples, the first set of one or more criteria includes a second criterion that is satisfied when a notification setting for an application that displays the user interface objects is activated. In some examples, the second criterion is not satisfied when the notification setting for the application is not activated (e.g., the application is prevented from providing notifications to the computer system (e.g., while the application is not in a foreground of the computer system)). Configuring the computer system to not output the third energy notification when detecting the second input corresponding to selection of the user interface object while the computer system is configured to output a third energy notification provides a user with sensory feedback (e.g., audio feedback, tactile feedback and/or visual feedback) with respect to whether a setting that corresponds to the user interface object is active of inactive, thereby providing improved sensory feedback.

In some examples, the computer system (e.g., 600) outputs the first energy notification (e.g., 652, 678, 654*b*, and/or 654*a*) while the computer system is in a locked state (e.g., 600 at FIG. 6R) (e.g., a state where the functionalities of the computer system are reduced, a state where various applications and functions of the computer system are inaccessible and/or restricted, a state that the computer system enters (e.g., automatically enters or enters in response to detecting an input) after a time period (e.g., 0-120 seconds) of inactivity). Outputting the first energy notification while the computer system is in a locked state provides a user with sensory feedback (e.g., audio feedback, tactile feedback and/or visual feedback) with respect to the status of the computer system (e.g., whether the computer system is locked or not locked), thereby providing improved sensory feedback.

In some examples, after (and/or in response to) outputting the first energy notification (e.g., 652, 678, 654*b*, and/or 654*a*), the computer system configures itself (e.g., 600) to not output an energy notification (e.g., automatically (e.g., without intervening user input) or unconfiguring based on the detection of an input). In some examples, while the computer system is not configured to output an energy notification and in accordance with a determination that the first set of one or more criteria is satisfied, the computer system forgoes outputting the first energy notification (e.g., as discussed at FIG. 6S). In some examples, the computer system changes an appearance of a respective user interface object as a part of configuring the computer system to not output the first energy notification. In some examples, the computer system is reconfigured to output an energy notification after the computer system is configured to not output an energy notification. In some examples, the computer system is configured to not output an energy notification in response to the computer system outputting the first energy notification.

In some examples, after the computer system (e.g., 600) outputs the first energy notification (e.g., 652, 678, 654*b*, and/or 654*a*) and while the computer system is at a third location (e.g., location of 600 at FIG. 6O and/or location of 600 at FIG. 6W) (e.g., the third location is different (e.g., the respective location is located in a different city, country, town, street, and/or block than the second location) and/or distinct from the respective location) (e.g., the respective location corresponds to a respective electrical grid that is different and/or distinct from the respective electrical grid that the first respective location corresponds to) that is different from the respective location, the computer system detects, via the one or more input devices, a second set of one or more inputs (e.g., 605*o*, 605*v*, 605*w*, and/or 605*p*) (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) including an input (e.g., 605*w*) (e.g., a tap input, a swipe input, and/or a long press (e.g., a press and hold)) (e.g., an input that corresponds to selection of a respective user interface object, a voice command, an air gesture, and/or a rotation of a rotatable input mechanism) that corresponds to selection of a second user interface object (e.g., 646*b* and/or 638*b*). In some examples, in response to detecting the second set of one or more inputs, the computer system configures itself to output a fourth energy notification (e.g., 652, 678, 654*b*, and/or 654*a*) (e.g., the fourth energy notification and the first energy notification are the same or the fourth energy notification (e.g., includes the same content and/or are the same type of notification) and the first energy notification are different (e.g., includes different content and/or are different types of content)) that corresponds to the third location. In some examples, the computer system changes the appearance of the second user interface object as a part of configuring itself to output the fourth energy notification. In some examples, the computer system is concurrently configured to output the first energy notification and the fourth energy notification. In some examples, the computer system ceases to be configured to output the first energy notification while the computer system is configured to output the fourth energy notification. In some examples, the computer system changes the appearance of the second user interface object as a part and/or as a result of outputting the fourth energy notification.

In some examples, the computer system (e.g., 600) outputs the first energy notification (e.g., 652, 678, 654*b*, and/or 654*a*) while the computer system is at the respective location.

In some examples, after outputting the first energy notification (e.g., 652, 678, 654*b*, and/or 654*a*), the computer system configures (enable and/or set up) itself (e.g., 600) to output a fifth energy notification (e.g., 652, 678, 654*b*, and/or 654*a*) (e.g., the computer system is automatically (e.g., without intervening user input) configured to output the fifth energy notification, the computer system is configured to output the fifth energy notification in response to detecting an input (e.g., one or more tap inputs and/or, in some examples, one or more non-tap inputs, such as air inputs (e.g., pointing air gestures, tapping air gestures, swiping air gestures, and/or a moving air gestures), gaze inputs, gaze-and-hold inputs, mouse clicks, mouse click-and-drags, voice commands, selection inputs, and/or inputs that move the computer system in a particular direction) that corresponds to selection of a respective user interface object and/or the computer system is configured to output the fifth energy notification in response to detecting a voice command). In some examples, while the computer system is configured to output the fifth energy notification and in accordance with a determination that the first set of one or more criteria is satisfied, the computer system outputs, via the output component, the fifth energy notification (e.g., 652, 678, 654*b*, and/or 654*a*), wherein the fifth energy notification and the first energy notification (e.g., 652, 678, 654*b*, and/or 654*a*) are the same types of notifications (e.g., as explained at FIG. 6S) (e.g., the fifth energy notification and the first energy notification include the same information, the fifth energy notification and the first energy notification are in the same classification of notifications (e.g., both notifications deal with a type of energy or are output in the same way)). In some examples, the computer system displays the first energy notification and the fifth energy notification on a common user interface or at a same location on the display of the computer system. In some examples, the computer system outputs the fifth notification while the computer system outputs the first notification. In some examples, the computer system ceases to output the first notification as part of outputting the fifth notification. In some examples, the computer system is configured to output the fifth energy notification in response to the computer system outputting the first energy notification. Outputting the fifth energy notification in accordance with a determination that the first set of one or more criteria is satisfied automatically allows the computer system to perform a display operation that indicates the present state and/or the future state of a respective electrical grid, thereby performing an operation when a set of conditions has been met without requiring further user input. Outputting the fifth energy notification in accordance with a determination that the first set of one or more criteria is satisfied provides a user with feedback (e.g., audio feedback, tactile feedback and/or visual feedback) with respect to whether the first set of one or more criteria is satisfied, thereby providing improved feedback.

In some examples, the first location corresponds to a first electrical grid (e.g., a network of one or more energy generators and/or consumers that are connected via transmission and/or distribution lines) (e.g., the electrical grid corresponds to a first location (e.g., a set of one or more: streets, blocks, neighborhoods, cities, states, countries, and/or other division (either physical or imaginary) of an area in an environment)). In some examples, displaying the first energy notification (e.g., 652, 678, 654*b*, and/or 654*a*) includes displaying a first indication of a first duration of time (e.g., 25-24 hours) that the first electrical grid is identified to output a type of energy (e.g., as discussed at FIG. 6R). Displaying a first indication of a duration of time of how long the first electrical grid is identified to output a type of energy provides a user with sensory feedback (e.g., audio feedback, tactile feedback and/or visual feedback) with respect to the present status and/or future status of the first electrical grid, thereby providing improved sensory feedback.

In some examples, the first energy notification (e.g., 652, 678, 654*b*, and/or 654*a*) includes a second indication that a second electrical grid (e.g., a network of one or more energy generators and/or consumers that are connected via transmission and/or distribution lines) (e.g., the electrical grid corresponds to a first location (e.g., a set of one or more: streets, blocks, neighborhoods, cities, states, countries, and/or other division (either physical or imaginary) of an area in an environment)) is identified to output a second type of energy (e.g., energy that is created from renewable sources, energy created from natural sources, energy created from processes that are replenished (e.g., sunlight, ocean current, and/or wind) and/or energy created from zero emission sources) for a first time period (e.g., as discussed at FIG. 6R) (e.g., 15-360 minutes). In some examples, after outputting the first energy notification (e.g., and/or while the computer system displays the first energy notification or after the computer cease to display the first energy notification) and, in accordance with a determination that the second electrical grid is identified to output the second type of energy for a second time period that is different (e.g., the second time period is longer than the first time period or the second time period is shorter than the first time period) than the first time period, the computer system outputs, via the output component, a sixth energy notification (e.g., 656) (e.g., the sixth energy notification is different and/or distinct from the first energy notification). In some examples, the sixth energy notification and the first energy notification are the same type of notification. In some examples, the sixth energy notification and the first energy notification are different types of notifications. In some examples, the computer system ceases to display the first energy notification as part of displaying the sixth energy notification. In some examples, the computer system concurrently displays the first energy notification and the sixth energy notification. Outputting a sixth energy notification when prescribed conditions are met allows the computer system to automatically perform a display operation to indicate to a user that the duration for when the second electrical grid is identified to output the second type of energy has changed, thereby performing an operation when a set of conditions has been without requiring further user input. Outputting a sixth energy notification provides a user with sensory feedback (e.g., audio feedback, tactile feedback and/or visual feedback) regarding the present state and/or the future state of the second electrical grid, thereby providing improved sensory feedback.

In some examples, outputting the sixth energy notification (e.g., 656) includes displaying a third indication (e.g., a graphical indication and/or a textual indication) of a second time period when (e.g., 1-600 minutes) the second electrical grid is identified to output the second type of energy (e.g., as described at FIG. 6T). Displaying an indication of the second time period provides a user with sensory feedback (e.g., audio feedback, tactile feedback and/or visual feedback) with respect to how long the second electrical grid is identified to output the second type of energy, thereby providing improved sensory feedback.

In some examples, the first energy notification (e.g., 652, 678, 654*b*, and/or 654*a*) and the sixth energy notification (e.g., 656) are the same types of notifications (e.g., both the first energy notification and the sixth energy notification are visual notifications, haptic notifications, and/or visual notifications) (e.g., both the first energy notification and sixth energy notification include the same information or correspond to the same occurrence (e.g., a respective electrical grid outputting a type of energy and/or a respective electrical grid outputting an amount of energy that is above a threshold)). In some examples, the first energy notification and the sixth energy notification are different types of notifications (e.g., the first energy notification is a visual notification and the second energy notification is an audible notification).

In some examples, in accordance with a determination that a location is not assigned as a third type of location (e.g., a home location (e.g., the computer system corresponds to a user account that is associated with a home location and/or the computer system is designated to correspond to the home location) (e.g., the computer system and/or a user previously designated a home location to the computer system) (e.g., the computer system recognizes one or more computer systems that are located at the home locations and/or one or more computer systems that are located at the home location and the computer system have a common ownership)) for the computer system (e.g., 600), the first energy notification (e.g., 652, 678, 654*b*, and/or 654*a*) corresponds to a current location (e.g., the present location, the past location, a location derived from location data of the computer system, or a future location) of the computer system (e.g., 600) (e.g., the information included in the notification corresponds to the location of the computer system and/or the information included in the notification corresponds to an electrical grid at the location of the computer system) (e.g., as described at FIG. 6R). Displaying the first energy notification that corresponds to the location of the computer when prescribed conditions are met allows the computer system to automatically perform a display operation that indicates to a user whether a home location is assigned to the computer system, thereby performing an operation when a set of conditions has been without requiring further user input.

In some examples, the computer system (e.g., 600 and/or 700) is a wearable computer system (e.g., a wearable device, a smartwatch, a head-mounted display device, and/or an activity tracker computer system).

In some examples, the computer system (e.g., 600) outputs a visual output (e.g., 652, 678, 654*b*, and/or 654*a*) (e.g., a graphical element and/or a textual element) and a haptic output (e.g., 746) (e.g., a series of discrete haptic outputs or a continuous haptic output) as part of outputting the first energy notification (e.g., 652, 678, 654*b*, and/or 654*a*). In some examples, the computer system outputs the visual output before the computer system outputs the haptic output or vice versa. In some examples, the computer system outputs the visual output and the haptic output at the same time. Outputting a combination of a visual output and a haptic output as part of outputting the first energy notification allows the user to receive and evaluate the first energy notification using a number of senses of the user, thereby providing improved visual feedback.

Note that details of the processes described above with respect to method 1000 (e.g., FIG. 10) are also applicable in an analogous manner to the methods described herein. For example, method 800 optionally includes one or more of the characteristics of the various methods described above with reference to method 1000. For example, the computer system in method 800 can output a type of notification described in method 1000 when energy of a certain type is output. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery of information to users any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted energy forecast that is of greater interest to the user. Accordingly, use of such personal information data enables users to have access to personalized energy forecasts. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of energy providers, the present technology can be configured to allow users to select to "opt in" or "opt out" of participation in the collection of personal information data during registration for services or anytime thereafter. In another example, users can select not to provide location data for targeted energy forecasts. In yet another example, users can select to limit the length of time location data is maintained or entirely prohibit the development of a baseline location profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, energy forecasts can be delivered to users by inferring a location of the user based on non-personal information data or a bare minimum amount of personal information, such as the content being requested by the device associated with a user, other non-personal information available to the energy providers, or publicly available information.

What is claimed is:

1. A method, comprising:

at a computer system that is in communication with one or more output components and one or more input devices:

displaying, via the one or more output components, a user interface element for a respective location, wherein the user interface element includes:

an energy forecast user interface object indicating one or more types of energy forecast to be output at the respective location during a time period; and a notification control;

detecting, via the one or more input devices, a first set of one or more inputs including an input that corresponds to selection of the notification control;

in response to detecting the first set of one or more inputs, configuring the computer system to output a first energy notification that corresponds to the respective location; and while the computer system is configured to output the first energy notification and in accordance with a determination that a first set of one or more criteria is satisfied, outputting, via the one or more output components, the first energy notification indicating a beginning of an energy window for the respective location, wherein the energy window corresponds to a first type of energy.

2. The method of claim 1, wherein the first set of one or more criteria includes a first criterion that is satisfied when the computer system is identified to be positioned at a first location that is assigned as a first type of location.

3. The method of claim 1, further comprising:

while the computer system is configured to output a second energy notification and while the computer system is positioned at a second location of a second type of location:

in accordance with a determination that a second set of one or more criteria is satisfied, wherein the second set of one or more criteria includes a criterion that is satisfied when a set of one or more criteria for outputting the second energy notification at a location different from the second location is satisfied, forgoing outputting, via the one or more output components, the second energy notification indicating a beginning of an energy window for the second location; and in accordance with a determination that a third set of one or more criteria is satisfied, wherein the third set of one or more criteria includes a criterion that is satisfied when a set of one or more criteria for outputting the second energy notification agnostic to a current location of the computer system is satisfied, outputting, via the one or more output components, the second energy notification indicating a beginning of a third energy window for the second location.

4. The method of claim 1, further comprising:

while the computer system is configured to output a third energy notification, detecting a second input that corresponds to selection of the notification control; and in response to detecting the second input that corresponds to selection of the notification control, configuring the computer system to not output the third energy notification.

5. The method of claim 1, wherein the computer system outputs the first energy notification while the computer system is in a locked state.

6. The method of claim 1, further comprising:

after outputting the first energy notification, configuring the computer system to not output an energy notification; and while the computer system is not configured to output an energy notification and in accordance with a determination that the first set of one or more criteria is satisfied, forgoing outputting the first energy notification.

7. The method of claim 1, further comprising:

after the computer system outputs the first energy notification and while the computer system is at a third location that is different from the respective location, detecting, via the one or more input devices, a second set of one or more inputs including an input that corresponds to selection of a second notification control; and in response to detecting the second set of one or more inputs, configuring the computer system to output a fourth energy notification that corresponds to the third location.

8. The method of claim 7, wherein the computer system outputs the first energy notification while the computer system is at the respective location, the method further comprising:

while the computer system is at the respective location, while the computer system is configured to output the fourth energy notification, and in accordance with a determination that a third set of one or more criteria is satisfied outputting, via the one or more output components, the fourth energy notification.

9. The method of claim 1, further comprising:

after outputting the first energy notification, configuring the computer system to output a fifth energy notification; and while the computer system is configured to output the fifth energy notification and in accordance with a determination that the first set of one or more criteria is satisfied, outputting, via the one or more output components, the fifth energy notification, wherein the fifth energy notification and the first energy notification are the same types of notifications.

10. The method of claim 1, wherein the respective location corresponds to a first electrical grid, and wherein displaying the first energy notification includes displaying a first indication of a first duration of time that the first electrical grid is identified to output a type of energy.

11. The method of claim 1, further comprising:

in accordance with a determination that a fourth set of one or more criteria is satisfied, outputting, via the one or more output components, a first notification corresponding to an energy event, wherein the first notification is a different type of notification than the first energy notification.

12. The method of claim 1, wherein the first energy notification includes a second indication that a second electrical grid is identified to output a second type of energy for a first time period, the method further comprising:

after outputting the first energy notification:

in accordance with a determination that the second electrical grid is identified to output the second type of energy for a second time period that is different than the first time period, outputting, via the one or more output components, a sixth energy notification.

13. The method of claim 12, wherein outputting the sixth energy notification includes displaying a third indication of a second time period when the second electrical grid is identified to output the second type of energy.

14. The method of claim 12, wherein the first energy notification and the sixth energy notification are the same types of notifications.

15. The method of claim 1, wherein, in accordance with a determination that a location is not assigned as a third type of location for the computer system, the first energy notification corresponds to a current location of the computer system.

16. The method of claim 1, wherein the computer system is a wearable computer system.

17. The method of claim 1, wherein the computer system outputs a visual output and a haptic output as part of outputting the first energy notification.

18. The method of claim 1, further comprising:

while outputting the first energy notification indicating the beginning of the energy window for the respective location, detecting, via the one or more input devices, an input corresponding to the first energy notification indicating the beginning of the energy window for the respective location; and in response to detecting the input corresponding to the first energy notification indicating the beginning of the energy window for the respective location, displaying, via the one or more output components, the user interface element for the respective location.

19. The method of claim 1, wherein the notification control has a first set of one or more visual characteristics while detecting the first set of one or more inputs, the method further comprising:

in response to detecting the first set of one or more inputs, changing display of the notification control to have a second set of one or more visual characteristics different from the first set of one or more visual characteristics.

20. The method of claim 1, wherein the energy window for the respective location is a first energy window for the respective location, the method further comprising:

in response to outputting the first energy notification indicating the beginning of the first energy window for the respective location, configuring the computer system to forgo output of a seventh energy notification indicating a beginning of a second energy window for the respective location, wherein the second energy window for the respective location is different from the first energy window for the respective location; and while the computer system is configured to forgo output of the seventh energy notification indicating the beginning of the second energy window for the respective location and in accordance with a determination that the first set of one or more criteria is satisfied, forgoing output of the seventh energy notification indicating the beginning of the second energy window for the respective location, wherein the second energy window corresponds to the first type of energy.

21. A non-transitory computer-readable storage medium storing one or more programs configured to be executed by one or more processors of a computer system that is in communication with one or more output components and one or more input devices, the one or more programs including instructions for:

displaying, via the one or more output components, a user interface element for a respective location, wherein the user interface element includes:

an energy forecast user interface object indicating one or more types of energy forecast to be output at the respective location during a time period; and a notification control;

detecting, via the one or more input devices, a first set of one or more inputs including an input that corresponds to selection of the notification control;

in response to detecting the first set of one or more inputs, configuring the computer system to output a first energy notification that corresponds to the respective location; and while the computer system is configured to output the first energy notification and in accordance with a determination that a first set of one or more criteria is satisfied, outputting, via the one or more output components, the first energy notification indicating a beginning of an energy window for the respective location, wherein the energy window corresponds to a first type of energy.

22. The non-transitory computer-readable storage medium of claim 21, wherein the first set of one or more criteria includes a first criterion that is satisfied when the computer system is identified to be positioned at a first location that is assigned as a first type of location.

23. The non-transitory computer-readable storage medium of claim 21, the one or more programs including instructions for:

while the computer system is configured to output a second energy notification and while the computer system is positioned at a second location of a second type of location:

in accordance with a determination that a second set of one or more criteria is satisfied, wherein the second set of one or more criteria includes a criterion that is satisfied when a set of one or more criteria for outputting the second energy notification at a location different from the second location is satisfied, forgoing outputting, via the one or more output components, the second energy notification indicating a beginning of an energy window for the second location; and in accordance with a determination that a third set of one or more criteria is satisfied, wherein the third set of one or more criteria includes a criterion that is satisfied when a set of one or more criteria for outputting the second energy notification agnostic to a current location of the computer system is satisfied, outputting, via the one or more output components, the second energy notification indicating a beginning of a third energy window for the second location.

24. The non-transitory computer-readable storage medium of claim 21, the one or more programs including instructions for:

while the computer system is configured to output a third energy notification, detecting a second input that corresponds to selection of the notification control; and in response to detecting the second input that corresponds to selection of the notification control, configuring the computer system to not output the third energy notification.

25. The non-transitory computer-readable storage medium of claim 21, wherein the computer system outputs the first energy notification while the computer system is in a locked state.

26. The non-transitory computer-readable storage medium of claim 21, the one or more programs including instructions for:

after outputting the first energy notification, configuring the computer system to not output an energy notification; and while the computer system is not configured to output an energy notification and in accordance with a determination that the first set of one or more criteria is satisfied, forgoing outputting the first energy notification.

27. The non-transitory computer-readable storage medium of claim 21, the one or more programs including instructions for:

after the computer system outputs the first energy notification and while the computer system is at a third location that is different from the respective location, detecting, via the one or more input devices, a second set of one or more inputs including an input that corresponds to selection of a second notification control; and in response to detecting the second set of one or more inputs, configuring the computer system to output a fourth energy notification that corresponds to the third location.

28. The non-transitory computer-readable storage medium of claim 27, wherein the computer system outputs the first energy notification while the computer system is at the respective location, the one or more programs including instructions for:

while the computer system is at the respective location, while the computer system is configured to output the fourth energy notification, and in accordance with a determination that a third set of one or more criteria is satisfied outputting, via the one or more output components, the fourth energy notification.

29. The non-transitory computer-readable storage medium of claim 21, the one or more programs including instructions for:

after outputting the first energy notification, configuring the computer system to output a fifth energy notification; and while the computer system is configured to output the fifth energy notification and in accordance with a determination that the first set of one or more criteria is satisfied, outputting, via the one or more output components, the fifth energy notification, wherein the fifth energy notification and the first energy notification are the same types of notifications.

30. The non-transitory computer-readable storage medium of claim 21, wherein the respective location corresponds to a first electrical grid, and wherein displaying the first energy notification includes displaying a first indication of a first duration of time that the first electrical grid is identified to output a type of energy.

31. The non-transitory computer-readable storage medium of claim 21, the one or more programs including instructions for:

in accordance with a determination that a fourth set of one or more criteria is satisfied, outputting, via the one or more output components, a first notification corresponding to an energy event, wherein the first notification is a different type of notification than the first energy notification.

32. The non-transitory computer-readable storage medium of claim 21, wherein the first energy notification includes a second indication that a second electrical grid is identified to output a second type of energy for a first time period, the one or more programs including instructions for:

after outputting the first energy notification:

in accordance with a determination that the second electrical grid is identified to output the second type of energy for a second time period that is different than the first time period, outputting, via the one or more output components, a sixth energy notification.

33. The non-transitory computer-readable storage medium of claim 32, wherein outputting the sixth energy notification includes displaying a third indication of a second time period when the second electrical grid is identified to output the second type of energy.

34. The non-transitory computer-readable storage medium of claim 32, wherein the first energy notification and the sixth energy notification are the same types of notifications.

35. The non-transitory computer-readable storage medium of claim 21, wherein, in accordance with a determination that a location is not assigned as a third type of location for the computer system, the first energy notification corresponds to a current location of the computer system.

36. The non-transitory computer-readable storage medium of claim 21, wherein the computer system is a wearable computer system.

37. The non-transitory computer-readable storage medium of claim 21, wherein the computer system outputs a visual output and a haptic output as part of outputting the first energy notification.

38. The non-transitory computer-readable storage medium of claim 21, the one or more programs including instructions for:

while outputting the first energy notification indicating the beginning of the energy window for the respective location, detecting, via the one or more input devices, an input corresponding to the first energy notification indicating the beginning of the energy window for the respective location; and in response to detecting the input corresponding to the first energy notification indicating the beginning of the energy window for the respective location, displaying, via the one or more output components, the user interface element for the respective location.

39. The non-transitory computer-readable storage medium of claim 21, wherein the notification control has a first set of one or more visual characteristics while detecting the first set of one or more inputs, the one or more programs including instructions for:

in response to detecting the first set of one or more inputs, changing display of the notification control to have a second set of one or more visual characteristics different from the first set of one or more visual characteristics.

40. The non-transitory computer-readable storage medium of claim 21, wherein the energy window for the respective location is a first energy window for the respective location, the one or more programs including instructions for:

in response to outputting the first energy notification indicating the beginning of the first energy window for the respective location, configuring the computer system to forgo output of a seventh energy notification indicating a beginning of a second energy window for the respective location, wherein the second energy window for the respective location is different from the first energy window for the respective location; and while the computer system is configured to forgo output of the seventh energy notification indicating the beginning of the second energy window for the respective location and in accordance with a determination that the first set of one or more criteria is satisfied, forgoing output of the seventh energy notification indicating the beginning of the second energy window for the respective location, wherein the second energy window corresponds to the first type of energy.

41. A computer system that is in communication with one or more output components and one or more input devices, comprising:

one or more processors; and memory storing one or more programs configured to be executed by the one or more processors, the one or more programs including instructions for:

displaying, via the one or more output components, a user interface element for a respective location, wherein the user interface element includes:

an energy forecast user interface object indicating one or more types of energy forecast to be output at the respective location during a time period; and a notification control;

detecting, via the one or more input devices, a first set of one or more inputs including an input that corresponds to selection of the notification control;

in response to detecting the first set of one or more inputs, configuring the computer system to output a first energy notification that corresponds to the respective location; and while the computer system is configured to output the first energy notification and in accordance with a determination that a first set of one or more criteria is satisfied, outputting, via the one or more output components, the first energy notification indicating a beginning of an energy window for the respective location, wherein the energy window corresponds to a first type of energy.

42. The computer system of claim 41, wherein the first set of one or more criteria includes a first criterion that is satisfied when the computer system is identified to be positioned at a first location that is assigned as a first type of location.

43. The computer system of claim 41, the one or more programs including instructions for:

while the computer system is configured to output a second energy notification and while the computer system is positioned at a second location of a second type of location:

in accordance with a determination that a second set of one or more criteria is satisfied, wherein the second set of one or more criteria includes a criterion that is satisfied when a set of one or more criteria for outputting the second energy notification at a location different from the second location is satisfied, forgoing outputting, via the one or more output components, the second energy notification indicating a beginning of an energy window for the second location; and in accordance with a determination that a third set of one or more criteria is satisfied, wherein the third set of one or more criteria includes a criterion that is satisfied when a set of one or more criteria for outputting the second energy notification agnostic to a current location of the computer system is satisfied, outputting, via the one or more output components, the second energy notification indicating a beginning of a third energy window for the second location.

44. The computer system of claim 41, the one or more programs including instructions for:

while the computer system is configured to output a third energy notification, detecting a second input that corresponds to selection of the notification control; and in response to detecting the second input that corresponds to selection of the notification control, configuring the computer system to not output the third energy notification.

45. The computer system of claim 41, wherein the computer system outputs the first energy notification while the computer system is in a locked state.

46. The computer system of claim 41, the one or more programs including instructions for:

after outputting the first energy notification, configuring the computer system to not output an energy notification; and while the computer system is not configured to output an energy notification and in accordance with a determination that the first set of one or more criteria is satisfied, forgoing outputting the first energy notification.

47. The computer system of claim 41, the one or more programs including instructions for:

after the computer system outputs the first energy notification and while the computer system is at a third location that is different from the respective location, detecting, via the one or more input devices, a second set of one or more inputs including an input that corresponds to selection of a second notification control; and in response to detecting the second set of one or more inputs, configuring the computer system to output a fourth energy notification that corresponds to the third location.

48. The computer system of claim 47, wherein the computer system outputs the first energy notification while the computer system is at the respective location, the one or more programs including instructions for:

while the computer system is at the respective location, while the computer system is configured to output the fourth energy notification, and in accordance with a determination that a third set of one or more criteria is satisfied outputting, via the one or more output components, the fourth energy notification.

49. The computer system of claim 41, the one or more programs including instructions for:

after outputting the first energy notification, configuring the computer system to output a fifth energy notification; and while the computer system is configured to output the fifth energy notification and in accordance with a determination that the first set of one or more criteria is satisfied, outputting, via the one or more output components, the fifth energy notification, wherein the fifth energy notification and the first energy notification are the same types of notifications.

50. The computer system of claim 41, wherein the respective location corresponds to a first electrical grid, and wherein displaying the first energy notification includes displaying a first indication of a first duration of time that the first electrical grid is identified to output a type of energy.

51. The computer system of claim 41, the one or more programs including instructions for:

in accordance with a determination that a fourth set of one or more criteria is satisfied, outputting, via the one or more output components, a first notification corresponding to an energy event, wherein the first notification is a different type of notification than the first energy notification.

52. The computer system of claim 41, wherein the first energy notification includes a second indication that a second electrical grid is identified to output a second type of energy for a first time period, the one or more programs including instructions for:

after outputting the first energy notification:

in accordance with a determination that the second electrical grid is identified to output the second type of energy for a second time period that is different than the first time period, outputting, via the one or more output components, a sixth energy notification.

53. The computer system of claim 52, wherein outputting the sixth energy notification includes displaying a third indication of a second time period when the second electrical grid is identified to output the second type of energy.

54. The computer system of claim 52, wherein the first energy notification and the sixth energy notification are the same types of notifications.

55. The computer system of claim 41, wherein, in accordance with a determination that a location is not assigned as a third type of location for the computer system, the first energy notification corresponds to a current location of the computer system.

56. The computer system of claim 41, wherein the computer system is a wearable computer system.

57. The computer system of claim 41, wherein the computer system outputs a visual output and a haptic output as part of outputting the first energy notification.

58. The computer system of claim 41, the one or more programs including instructions for:

while outputting the first energy notification indicating the beginning of the energy window for the respective location, detecting, via the one or more input devices, an input corresponding to the first energy notification indicating the beginning of the energy window for the respective location; and in response to detecting the input corresponding to the first energy notification indicating the beginning of the energy window for the respective location, displaying, via the one or more output components, the user interface element for the respective location.

59. The computer system of claim 41, wherein the notification control has a first set of one or more visual characteristics while detecting the first set of one or more inputs, the one or more programs including instructions for:

in response to detecting the first set of one or more inputs, changing display of the notification control to have a second set of one or more visual characteristics different from the first set of one or more visual characteristics.

60. The computer system of claim 41, wherein the energy window for the respective location is a first energy window for the respective location, the one or more programs including instructions for:

in response to outputting the first energy notification indicating the beginning of the first energy window for the respective location, configuring the computer system to forgo output of a seventh energy notification indicating a beginning of a second energy window for the respective location, wherein the second energy window for the respective location is different from the first energy window for the respective location; and while the computer system is configured to forgo output of the seventh energy notification indicating the beginning of the second energy window for the respective location and in accordance with a determination that the first set of one or more criteria is satisfied, forgoing output of the seventh energy notification indicating the beginning of the second energy window for the respective location, wherein the second energy window corresponds to the first type of energy.

* * * * *